United States Patent [19]

Hata

[11] Patent Number: 5,009,491
[45] Date of Patent: Apr. 23, 1991

[54] COMPACT ZOOM LENS SYSTEM
[75] Inventor: Kazuyoshi Hata, Osaka, Japan
[73] Assignee: Minolta Camera Kabushiki Kaisha, Osaka, Japan
[21] Appl. No.: 230,173
[22] Filed: Aug. 8, 1988
[30] Foreign Application Priority Data

| Aug. 7, 1987 | [JP] | Japan | 62-198369 |
| Aug. 17, 1987 | [JP] | Japan | 62-204933 |
| Aug. 17, 1987 | [JP] | Japan | 62-204934 |
| Aug. 22, 1987 | [JP] | Japan | 62-208508 |

[51] Int. Cl.$^5$ ............................................. G02B 15/14
[52] U.S. Cl. .................................................... 350/427
[58] Field of Search ................................. 350/427, 423

[56] References Cited

U.S. PATENT DOCUMENTS 4,107,402 10/1979 Nakagawa .

FOREIGN PATENT DOCUMENTS

| 45-2784 | 9/1970 | Japan . |
| 51-88243 | 8/1976 | Japan . |
| 58-143311 | 8/1983 | Japan . |
| 60-35651 | 8/1985 | Japan . |
| 63-135913 | 6/1988 | Japan . |

Primary Examiner—Bruce Y. Arnold
Assistant Examiner—Rebecca D. Gass
Attorney, Agent, or Firm—Price, Gess & Ubell

[57] ABSTRACT

A compact zoom lens system comprising from the object side to the image side, a first lens unit of a negative refractive power having a cemented lens component consisting of a negative lens element and a positive lens element cemented with each other, said first lens unit being shiftable along an optical axis of the lens system in zooming operation, a second lens unit of a positive refractive power having two positive lens components, at least one of which consists of a positive lens element and a negative lens element cemented with each other, said second lens unit being shiftable along the optical axis of the lens system in the zooming operation and a third lens unit of a positive refractive power having from the object side, a front lens component of a negative refractive power and a rear lens component of a positive refractive power, said third lens being stationary along the optical axis of the lens system in the zooming operation, in order to realize a zooming ratio of about two or three, a very short overall length and a light weight while having a large aperture by a configuration with a small number of lens elements.

29 Claims, 43 Drawing Sheets

F 1.68
— d
--- SC
SPHERICAL ABERRATION & SINE CONDITION

Y' 4.1
--- DM
— DS
ASTIGMATISM

Y' 4.1
DISTORTION(%)

F 1.62
— d
--- SC
SPHERICAL ABERRATION & SINE CONDITION

Y' 4.1
--- DM
— DS
ASTIGMATISM

Y' 4.1
DISTORTION(%)

F 1.62
— d
--- SC
SPHERICAL ABERRATION & SINE CONDITION

Y' 4.1
--- DM
— DS
ASTIGMATISM

Y' 4.1
DISTORTION(%)

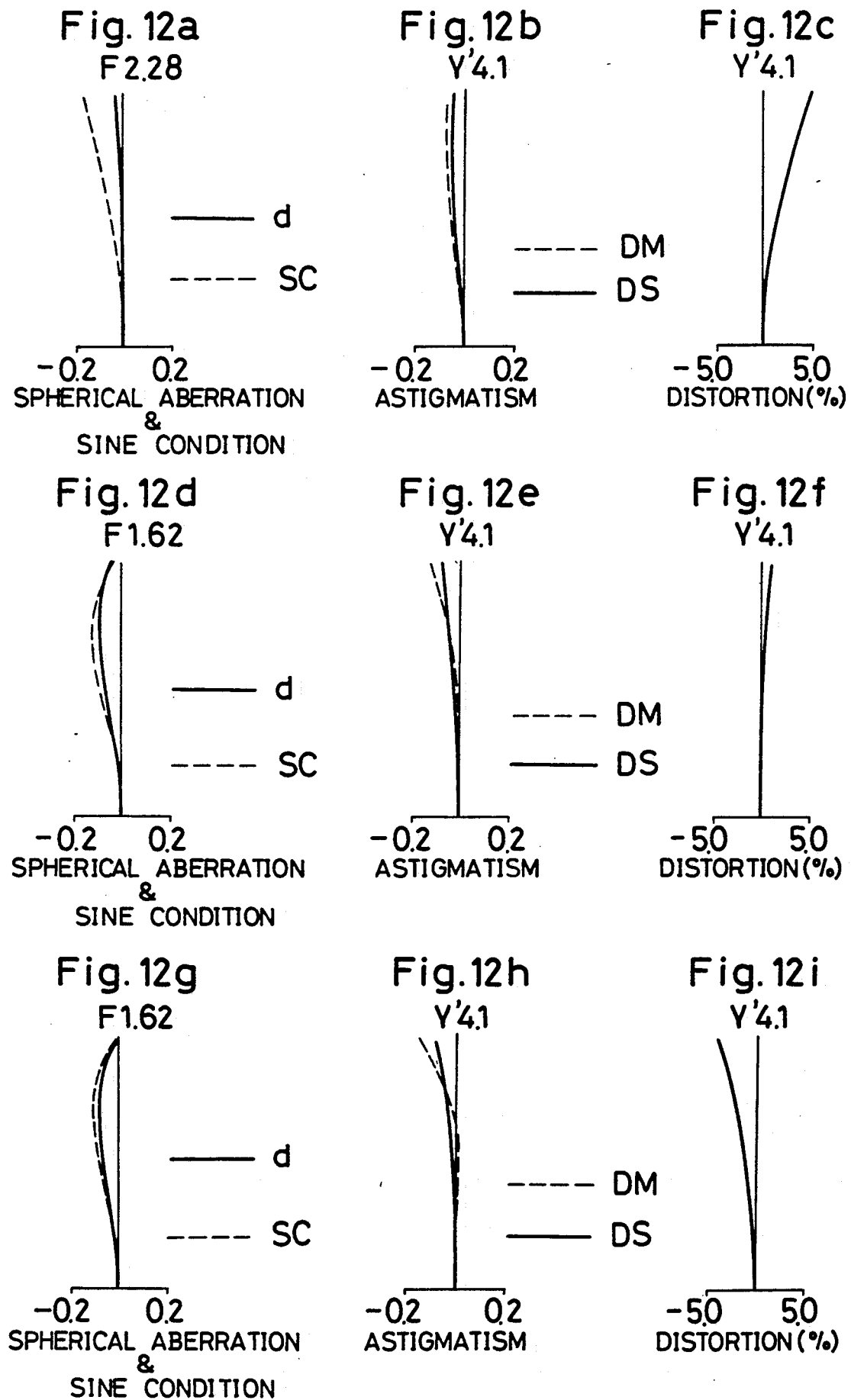

F 1.63

-0.2  0.2
SPHERICAL ABERRATION
&
SINE CONDITION

— d
---- SC

Y'4.1

-0.2  0.2
ASTIGMATISM

---- DM
— DS

Y'4.1

-5.0  5.0
DISTORTION (%)

F 1.63

-0.2  0.2
SPHERICAL ABERRATION
&
SINE CONDITION

— d
---- SC

Y'4.1

-0.2  0.2
ASTIGMATISM

---- DM
— DS

Y'4.1

-5.0  5.0
DISTORTION (%)

F 1.63

-0.2  0.2
SPHERICAL ABERRATION
&
SINE CONDITION

— d
---- SC

Y'4.1

-0.2  0.2
ASTIGMATISM

---- DM
— DS

Y'4.1

-5.0  5.0
DISTORTION (%)

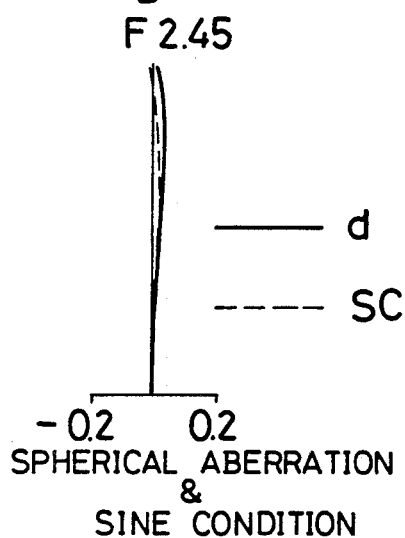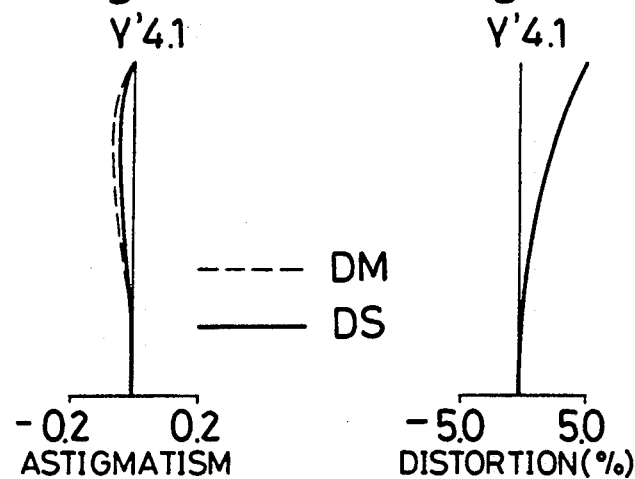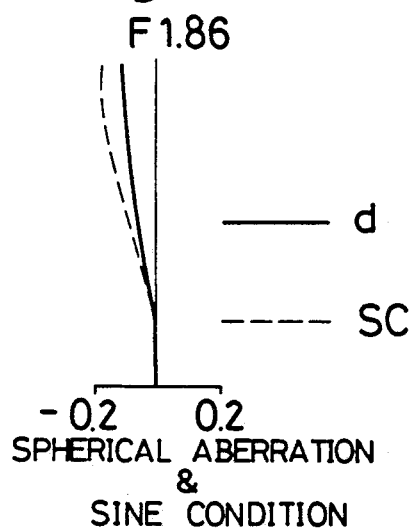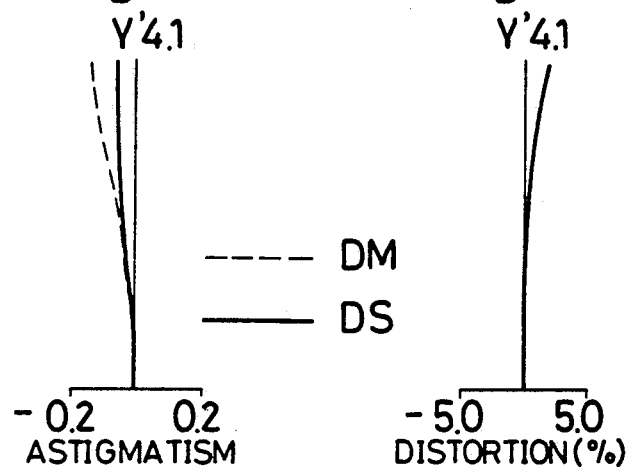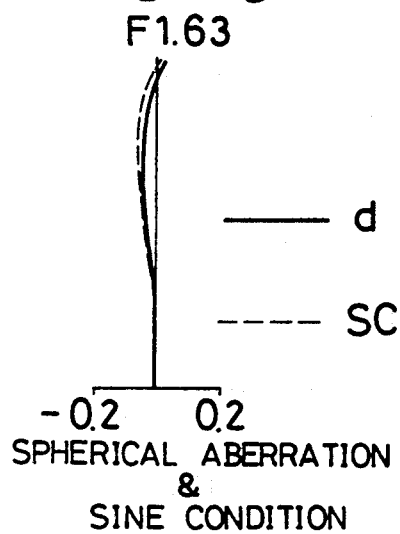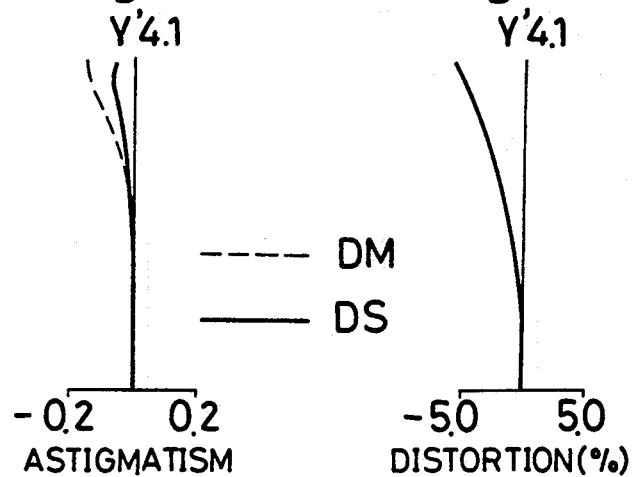

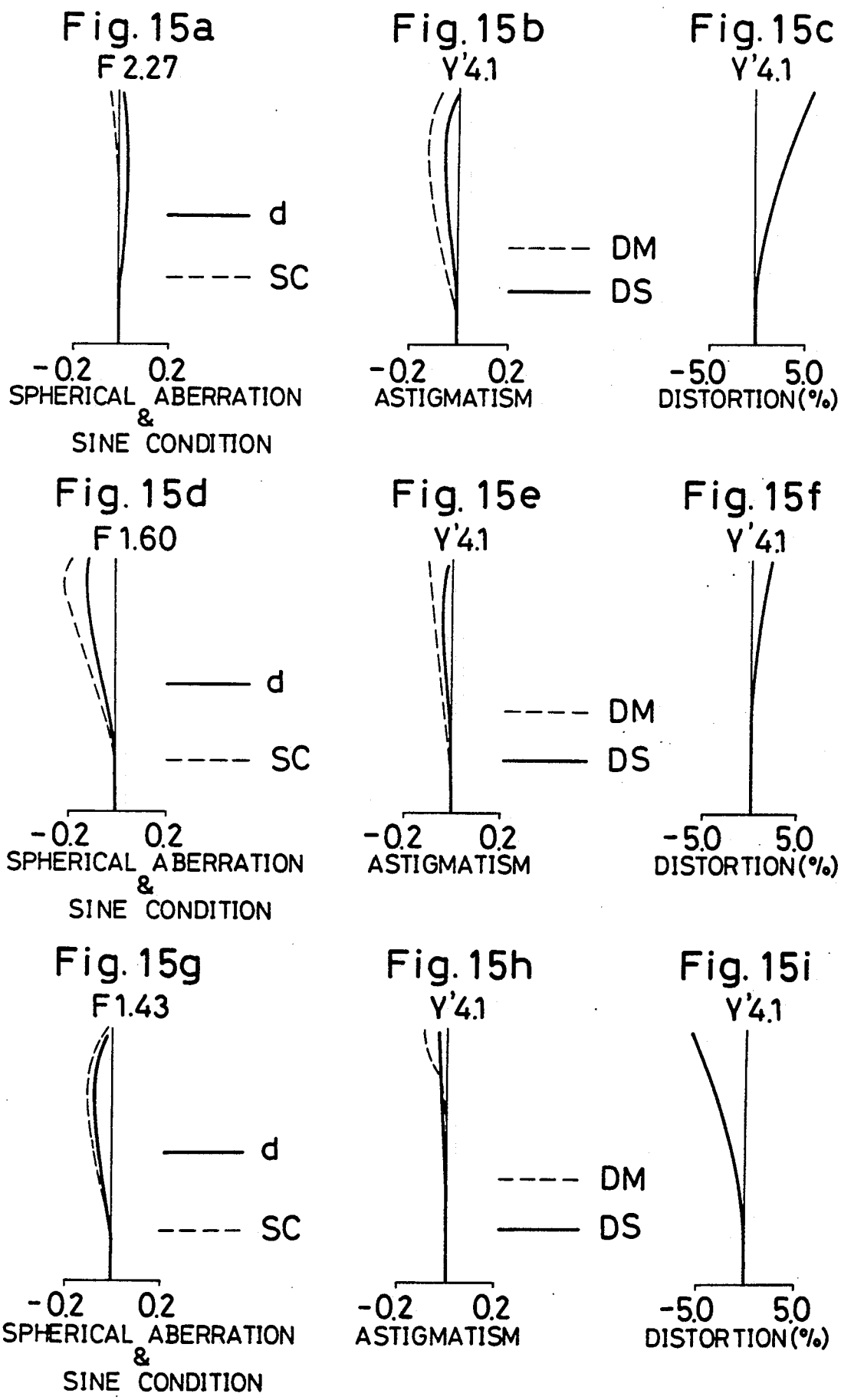

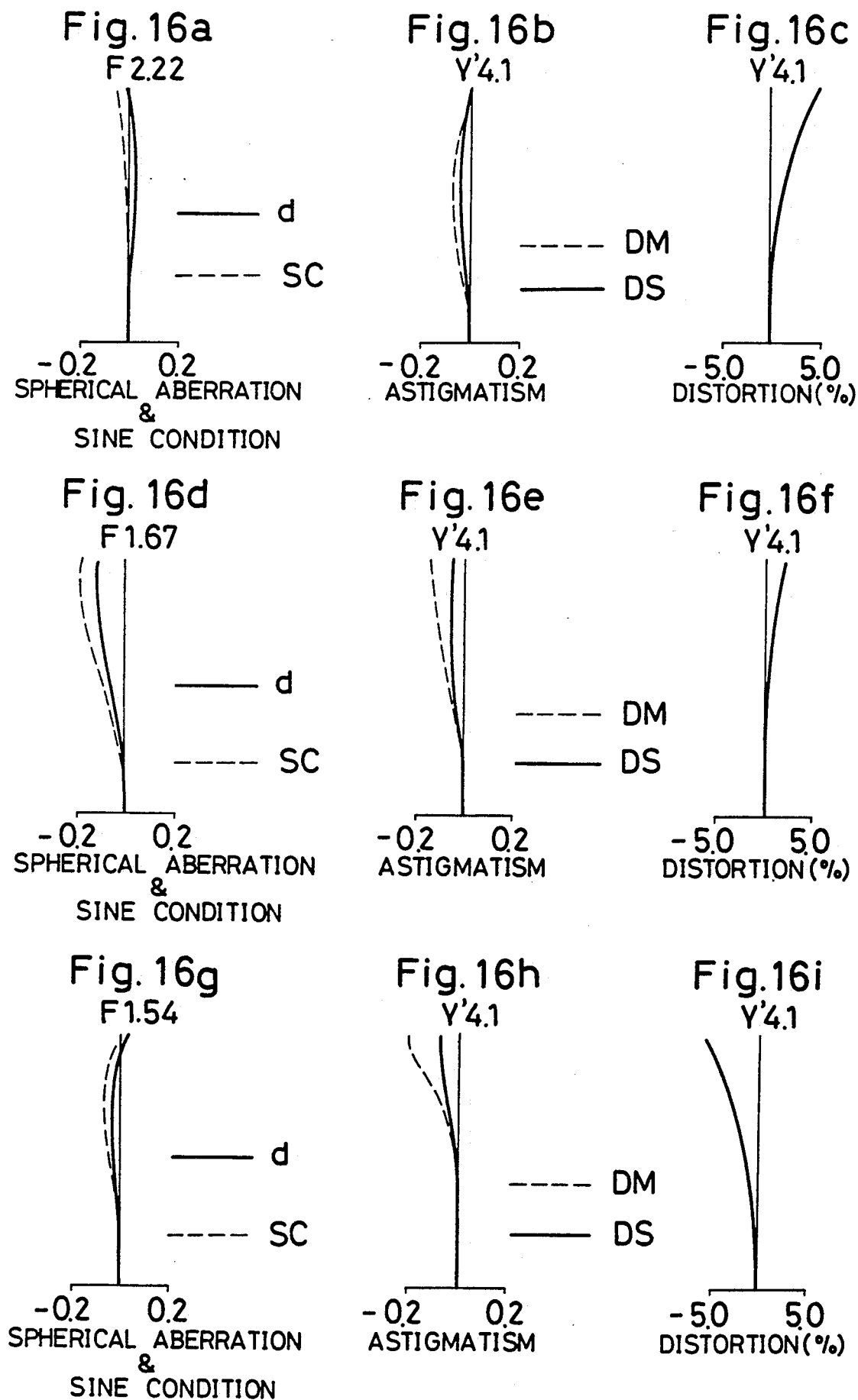

F 2.23

Y' 4.1

Y' 4.1

F 1.69

Y' 4.1

Y' 4.1

F 1.43

Y' 4.1

Y' 4.1

F 2.11
—— d
---- SC
SPHERICAL ABERRATION & SINE CONDITION

Y' 4.1
---- DM
—— DS
ASTIGMATISM

Y' 4.1
DISTORTION(%)

F 1.63
—— d
---- SC
SPHERICAL ABERRATION & SINE CONDITION

Y' 4.1
---- DM
—— DS
ASTIGMATISM

Y' 4.1
DISTORTION(%)

F 1.43
—— d
---- SC
SPHERICAL ABERRATION & SINE CONDITION

Y' 4.1
---- DM
—— DS
ASTIGMATISM

Y' 4.1
DISTORTION(%)

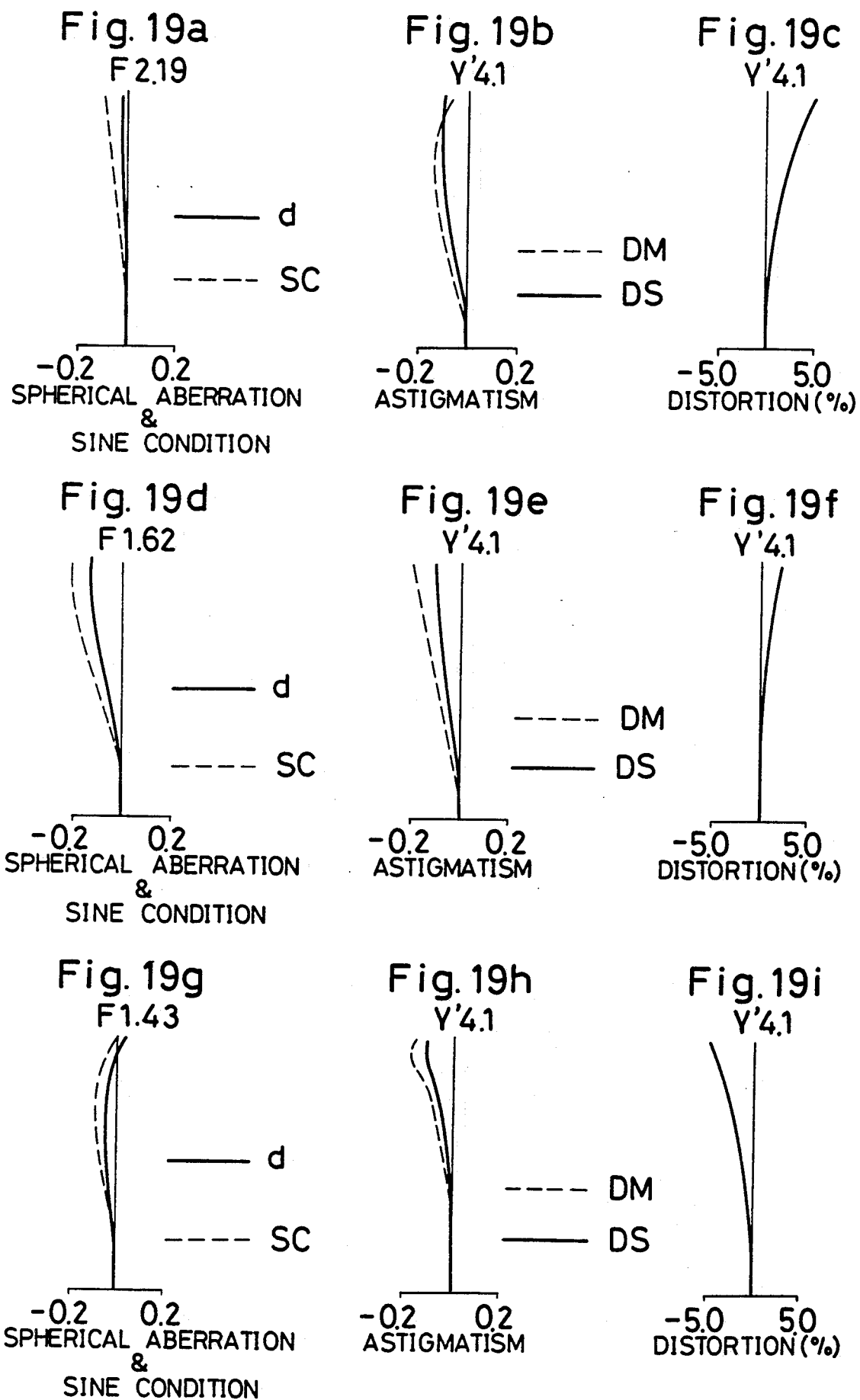

F 2.30

SPHERICAL ABERRATION
& SINE CONDITION

— d
---- SC

Y' 4.1

ASTIGMATISM

---- DM
— DS

Y' 4.1

DISTORTION(%)

F 1.65

SPHERICAL ABERRATION
& SINE CONDITION

— d
---- SC

Y' 4.1

ASTIGMATISM

---- DM
— DS

Y' 4.1

DISTORTION(%)

F 1.43

SPHERICAL ABERRATION
& SINE CONDITION

— d
---- SC

Y' 4.1

ASTIGMATISM

---- DM
— DS

Y' 4.1

DISTORTION(%)

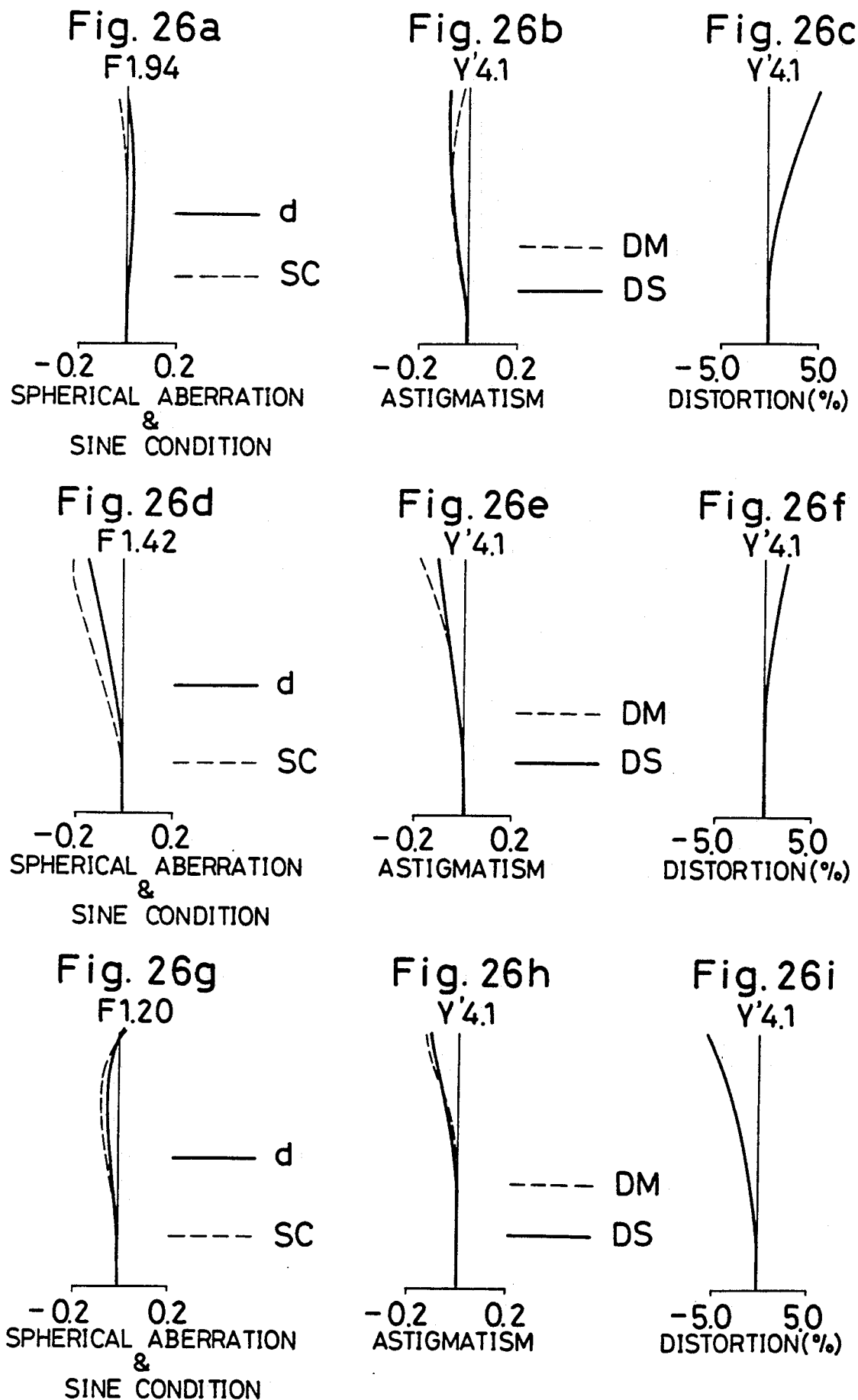

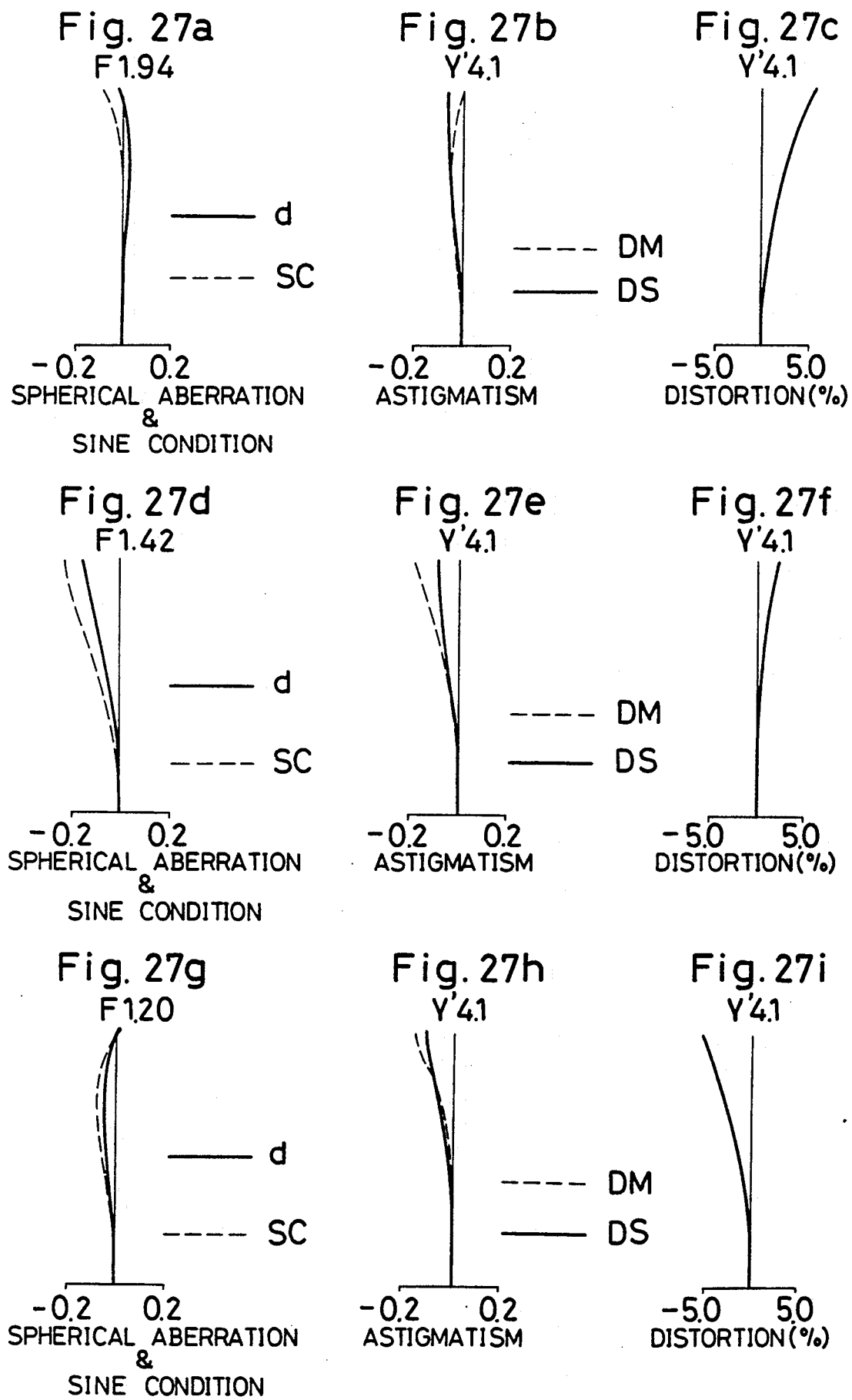

F 2.05

— d
--- SC

-0.2  0.2
SPHERICAL ABERRATION
&
SINE CONDITION

Y' 4.1

--- DM
— DS

-0.2  0.2
ASTIGMATISM

Y' 4.1

-5.0  5.0
DISTORTION(%)

F 1.48

— d
--- SC

-0.2  0.2
SPHERICAL ABERRATION
&
SINE CONDITION

Y' 4.1

--- DM
— DS

-0.2  0.2
ASTIGMATISM

Y' 4.1

-5.0  5.0
DISTORTION(%)

F 1.23

— d
--- SC

-0.2  0.2
SPHERICAL ABERRATION
&
SINE CONDITION

Y' 4.1

--- DM
— DS

-0.2  0.2
ASTIGMATISM

Y' 4.1

-5.0  5.0
DISTORTION(%)

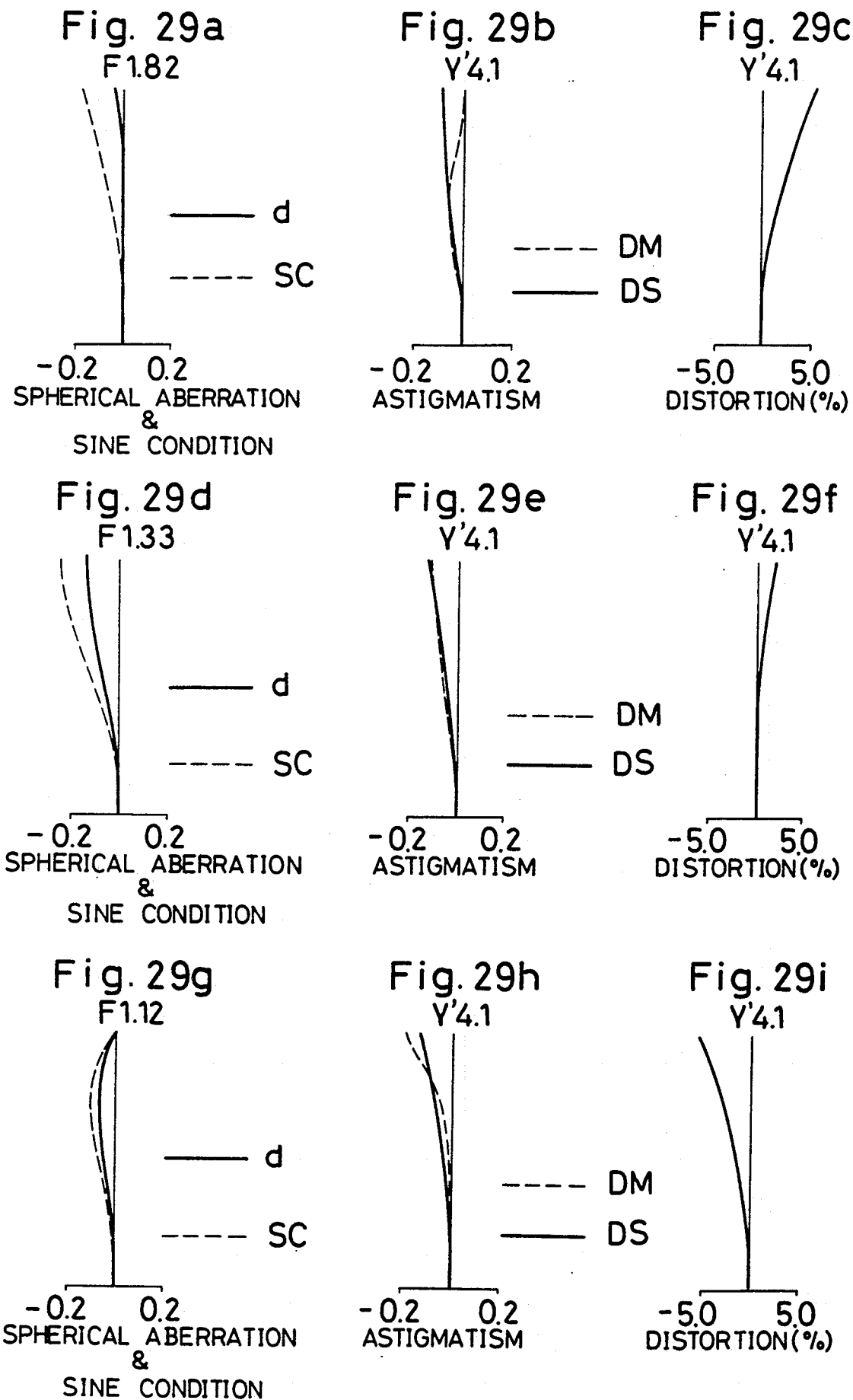

F 1.71

—— d
---- SC

-0.2   0.2
SPHERICAL ABERRATION
&
SINE CONDITION

Y' 4.1

---- DM
—— DS

-0.2   0.2
ASTIGMATISM

Y' 4.1

-5.0   5.0
DISTORTION(%)

F 1.24

—— d
---- SC

-0.2   0.2
SPHERICAL ABERRATION
&
SINE CONDITION

Y' 4.1

---- DM
—— DS

-0.2   0.2
ASTIGMATISM

Y' 4.1

-5.0   5.0
DISTORTION(%)

F 1.03

—— d
---- SC

-0.2   0.2
SPHERICAL ABERRATION
&
SINE CONDITION

Y' 4.1

---- DM
—— DS

-0.2   0.2
ASTIGMATISM

Y' 4.1

-5.0   5.0
DISTORTION(%)

F 1.76
—— d
---- SC
SPHERICAL ABERRATION
& SINE CONDITION

Y' 4.1
---- DM
—— DS
ASTIGMATISM

Y' 4.1
DISTORTION (%)

F 1.24
—— d
---- SC
SPHERICAL ABERRATION
& SINE CONDITION

Y' 4.1
---- DM
—— DS
ASTIGMATISM

Y' 4.1
DISTORTION (%)

F 1.03
—— d
---- SC
SPHERICAL ABERRATION
& SINE CONDITION

Y' 4.1
---- DM
—— DS
ASTIGMATISM

Y' 4.1
DISTORTION (%)

F1.70
— d
--- SC
-0.2  0.2
SPHERICAL ABERRATION
&
SINE CONDITION

Y'4.1
--- DM
— DS
-0.2  0.2
ASTIGMATISM

Y'4.1
-5.0  5.0
DISTORTION (%)

F1.23
— d
--- SC
-0.2  0.2
SPHERICAL ABERRATION
&
SINE CONDITION

Y'4.1
--- DM
— DS
-0.2  0.2
ASTIGMATISM

Y'4.1
-5.0  5.0
DISTORTION (%)

F1.03
— d
--- SC
-0.2  0.2
SPHERICAL ABERRATION
&
SINE CONDITION

Y'4.1
--- DM
— DS
-0.2  0.2
ASTIGMATISM

Y'4.1
-5.0  5.0
DISTORTION (%)

F1.75

SPHERICAL ABERRATION
&
SINE CONDITION

Y'4.1

ASTIGMATISM

Y'4.1

DISTORTION(%)

F1.23

SPHERICAL ABERRATION
&
SINE CONDITION

Y'4.1

ASTIGMATISM

Y'4.1

DISTORTION(%)

F1.01

SPHERICAL ABERRATION
&
SINE CONDITION

Y'4.1

ASTIGMATISM

Y'4.1

DISTORTION(%)

F1.69

— d
--- SC

-0.2  0.2
SPHERICAL ABERRATION
&
SINE CONDITION

Y'4.1

---- DM
— DS

-0.2  0.2
ASTIGMATISM

Y'4.1

-5.0  5.0
DISTORTION(%)

F1.18

— d
--- SC

-0.2  0.2
SPHERICAL ABERRATION
&
SINE CONDITION

Y'4.1

---- DM
— DS

-0.2  0.2
ASTIGMATISM

Y'4.1

-5.0  5.0
DISTORTION(%)

F0.97

— d
--- SC

-0.2  0.2
SPHERICAL ABERRATION
&
SINE CONDITION

Y'4.1

---- DM
— DS

-0.2  0.2
ASTIGMATISM

Y'4.1

-5.0  5.0
DISTORTION(%)

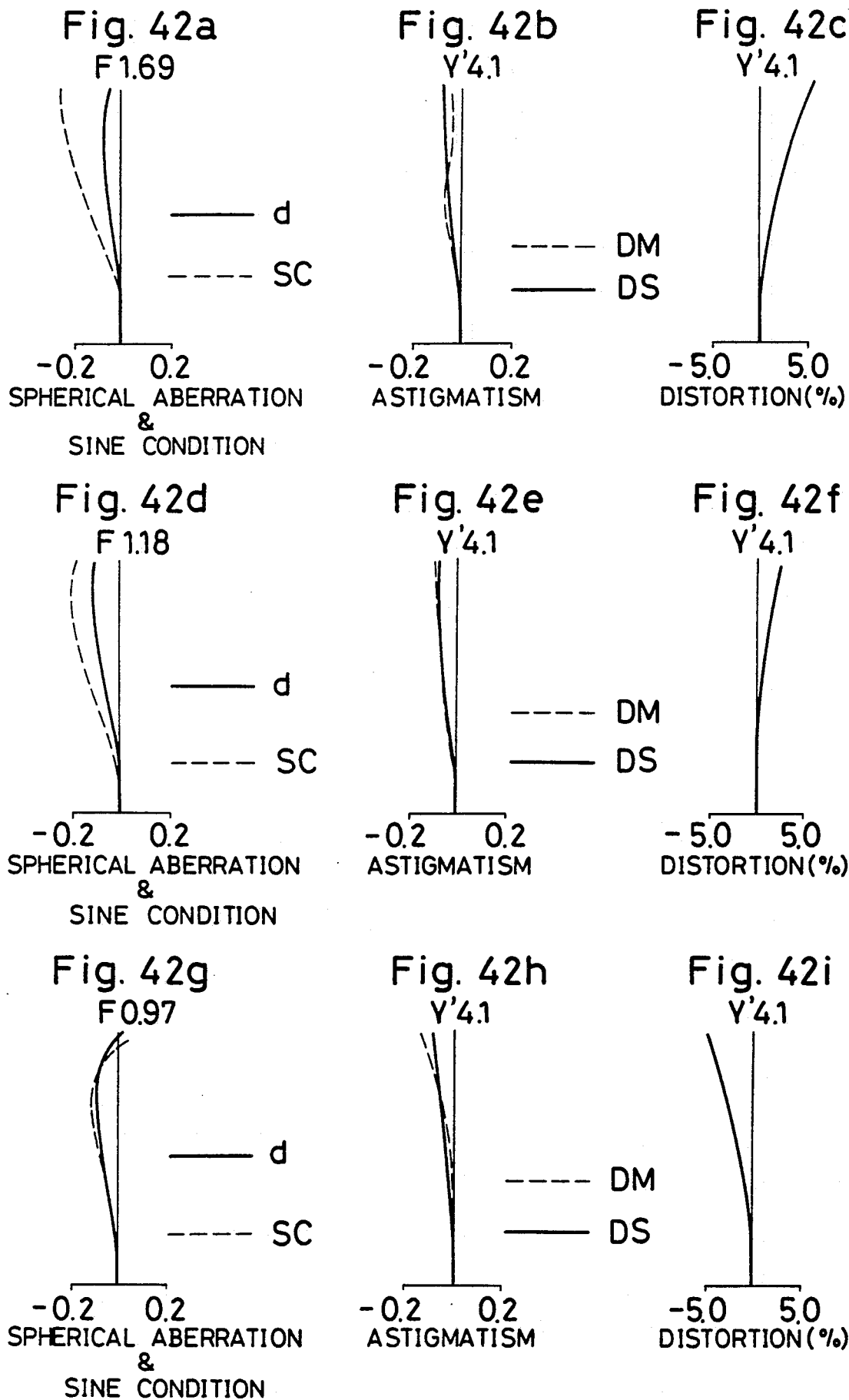

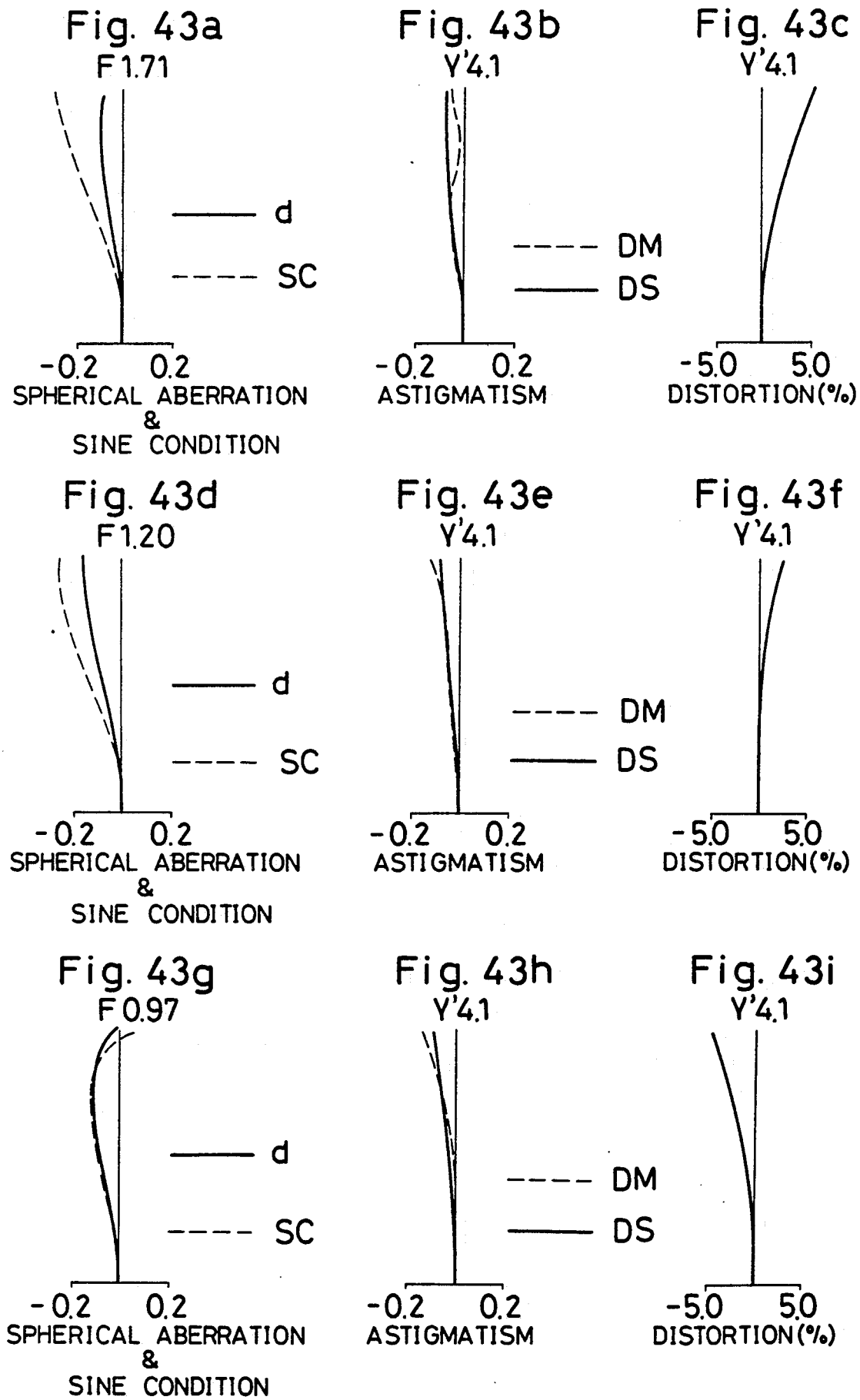

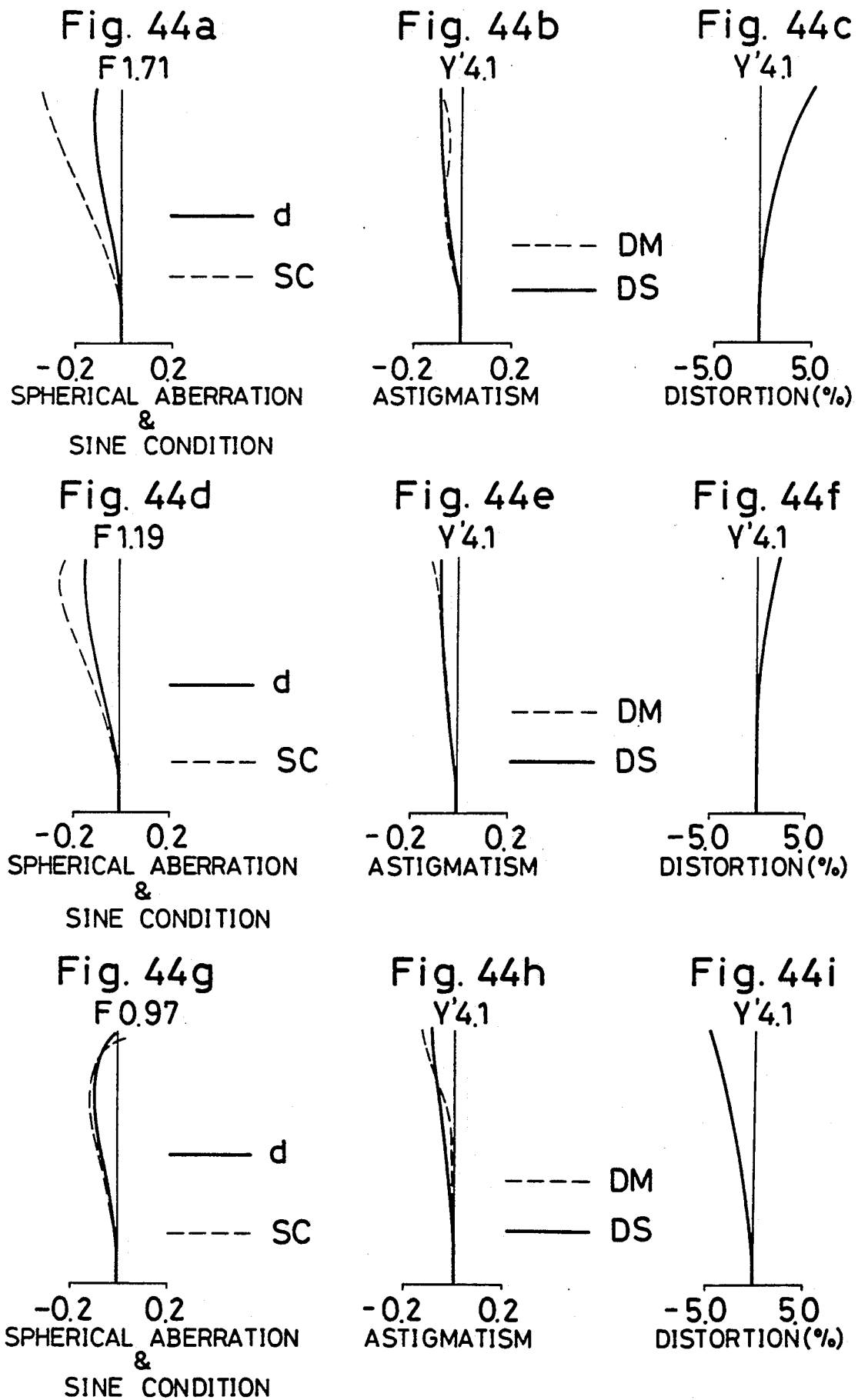

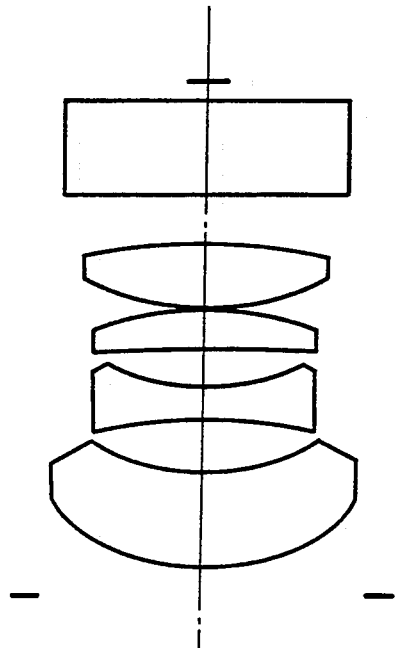
Fig. 48
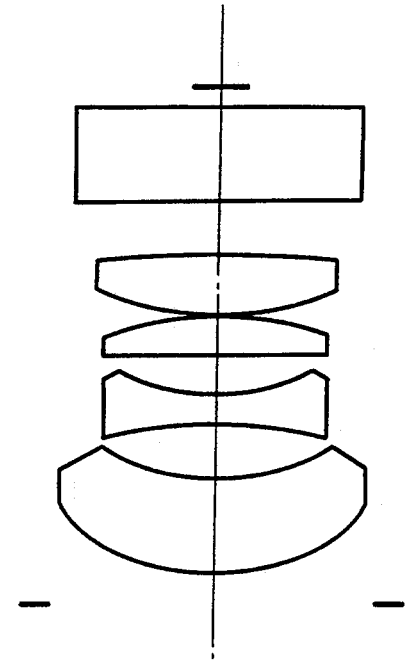
Fig. 49
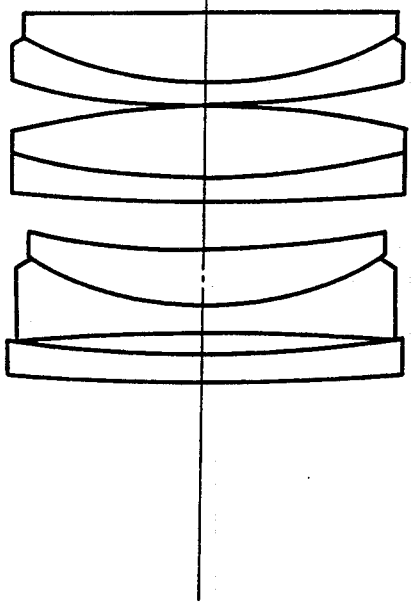
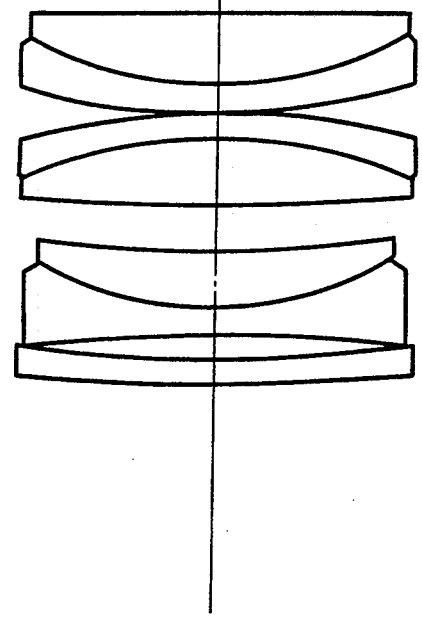

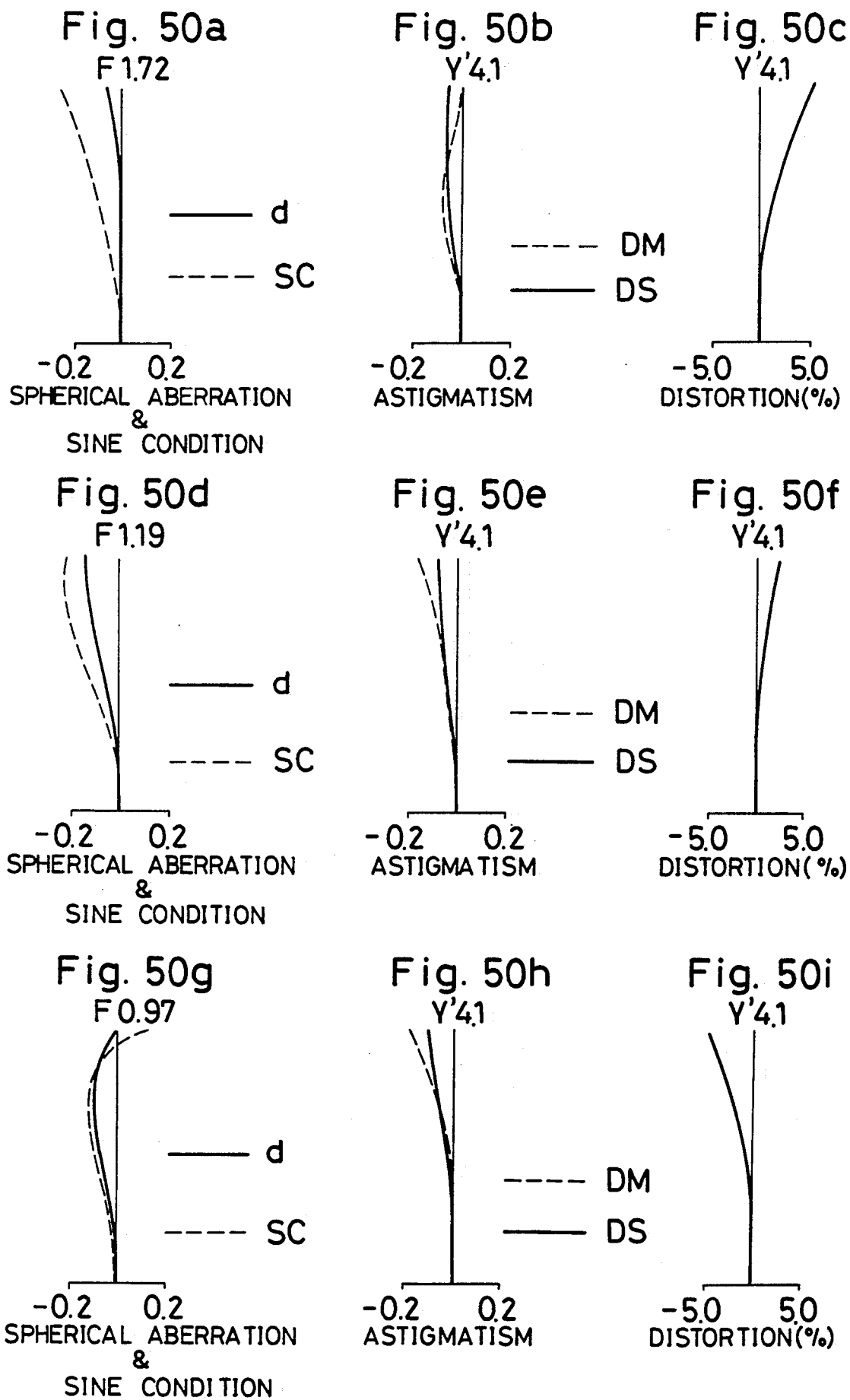

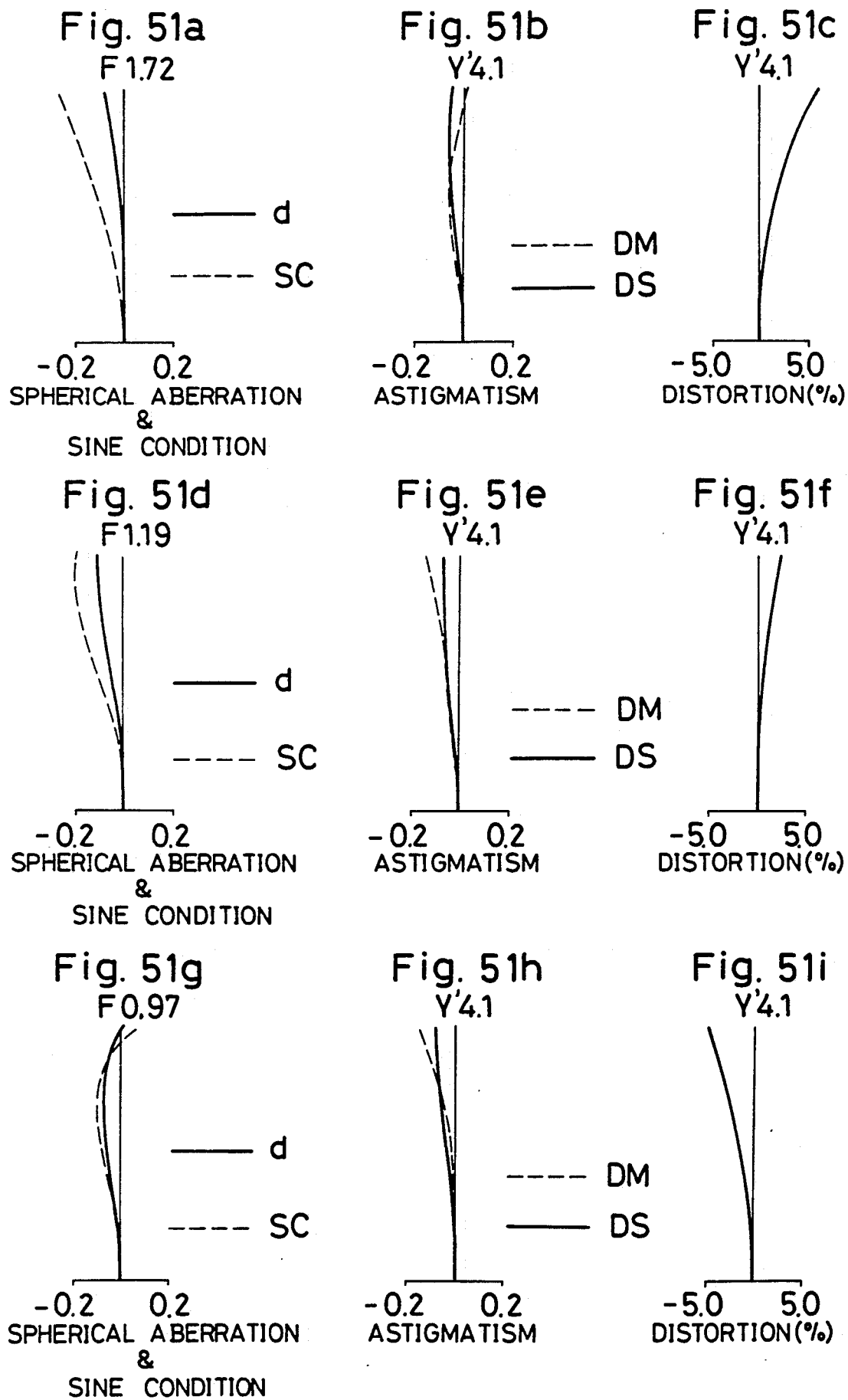

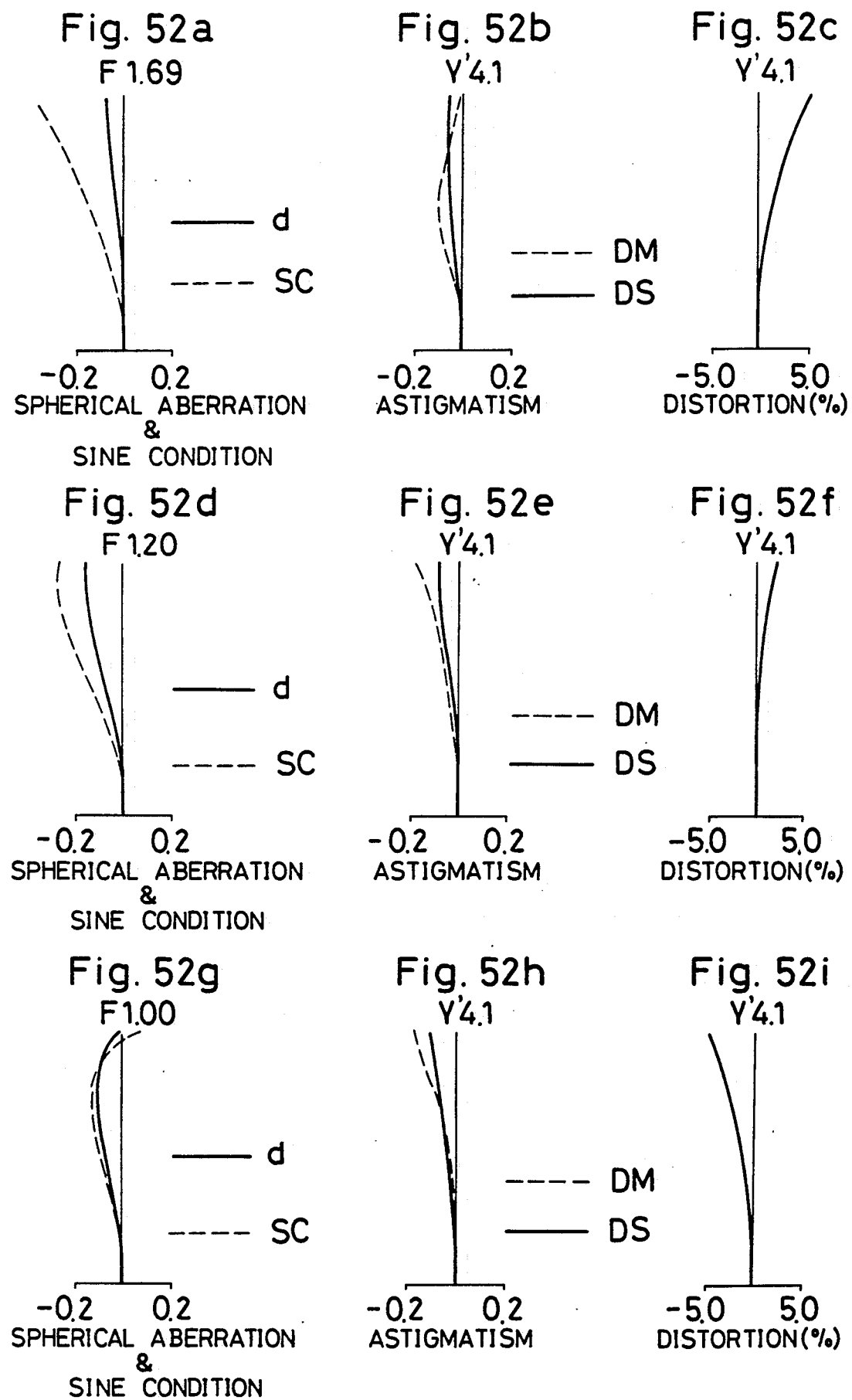

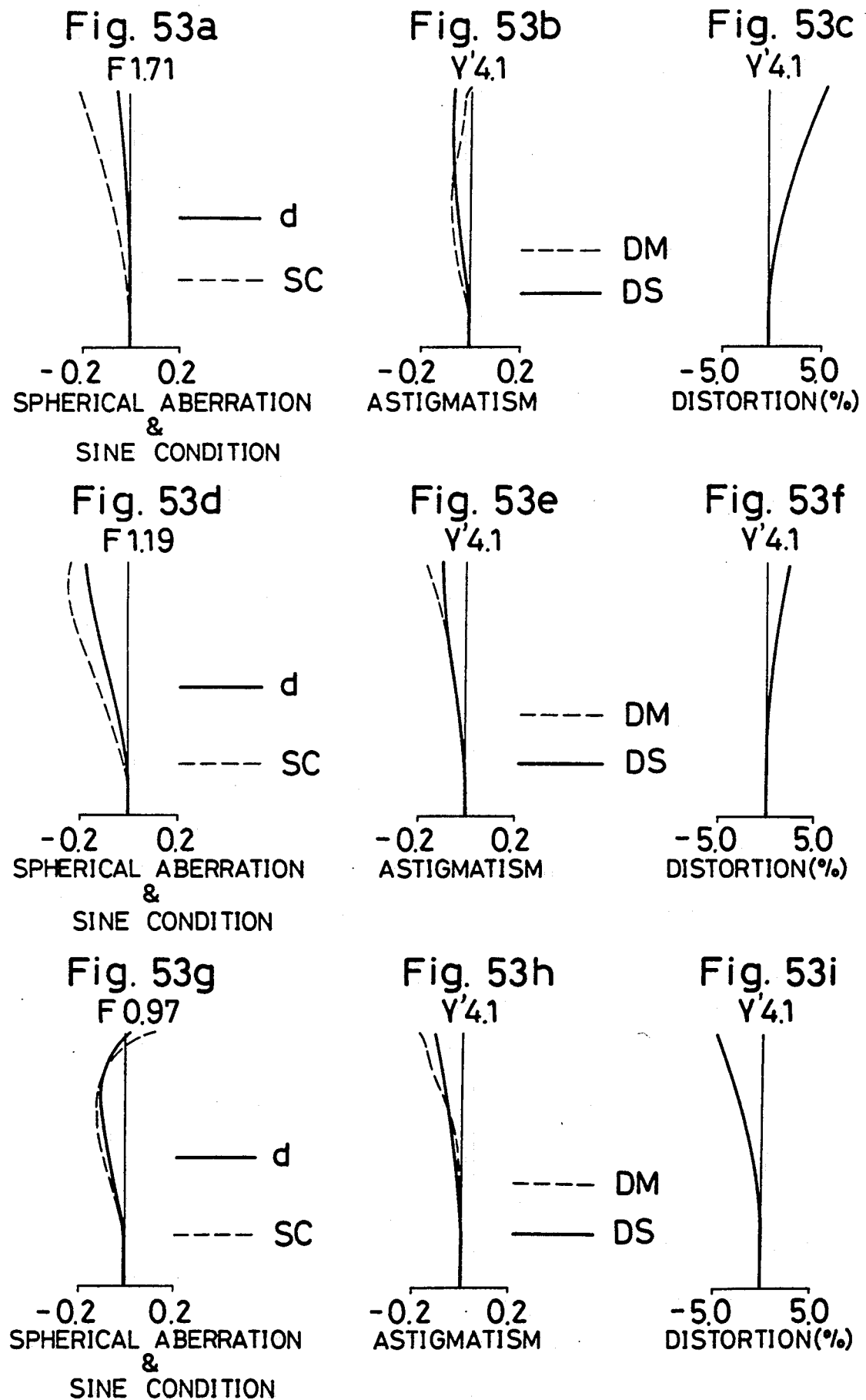

F 1.71
— d
---- SC
SPHERICAL ABERRATION & SINE CONDITION

Y' 4.1
---- DM
—— DS
ASTIGMATISM

Y' 4.1
DISTORTION(%)

F 1.19
— d
---- SC
SPHERICAL ABERRATION & SINE CONDITION

Y' 4.1
---- DM
—— DS
ASTIGMATISM

Y' 4.1
DISTORTION(%)

F 0.97
— d
---- SC
SPHERICAL ABERRATION & SINE CONDITION

Y' 4.1
---- DM
—— DS
ASTIGMATISM

Y' 4.1
DISTORTION(%)

COMPACT ZOOM LENS SYSTEM

BACKGROUND OF THE INVENTION

1. Field of the Invention

The present invention relates to a compact zoom lens system and more particularly to a compact zoom lens system applicable to small-sized cameras such as video cameras and electronic still cameras.

2. Description of the Prior Art

In recent years, since packaging of electronic components has been improved increasingly and the rate of integration thereof has also been improved, the volume and weight of a lens system occupying in the main unit of a video camera or the like has become relatively large. Also, as to the cost, the lens system has become a bottleneck of overall reduction in the cost. In the case of the present-state video cameras and the like, smaller size, lighter weight and lower cost are absolute requirements, and how to miniaturize the lens system and how to configurate it more economically are important to realize the above-mentioned. There are many examples wherein as a result of pursuing the above, use of a zoom lens is given up and a fixed focal length lens system is adopted. However, this is sure to be able to realize the smaller size, lighter weight and lower cost, but the charm as a commodity is greatly reduced because of a fixed focal length. Needless to say, a focal length of a lens system can be altered by using a converter or an attachment, but such a thing has to be carried separately besides the camera, and further considering the whole including the camera and such an attachment, it is hard to be said that the smaller size, lighter weight and lower cost have been realized. Also, in recent years a system wherein a converter is incorporated in the camera main unit and the focal length is changed-over by a simple operation has been sometimes adopted for compact cameras and the like. However, considering the whole system, this also can never be said to be smaller in size, lighter in weight and lower in cost, and only a ratio of variation of the focal length of about two or less can be realized, and in photographing a moving picture, continuous change-over cannot be made during photographing, and therefore this also lacks the charm as a commodity.

Then, after all, the zoom lens system is considered to be applied, but the conventional ones offer aimed at a high zooming ratio, and therefore they were large in size and very high in cost. Among them, for a zoom lens system wherein the zooming ratio is reduced to about three and thereby compactness and cost reduction are pursued, the ones as disclosed in the Japanese Patent Laid-Open No. 261712/1986 and the Japanese Patent Laid-Open No. 21113/1987 can be enumerated, but the former is configurated with 11 lens elements, and thus the number of lenses is reduced, but the F number is as large as 2.8, while the latter has a F number of as small as 1.3, but has a configuration of 12 lens elements. Thus both are still large and heavy, and are hard to be said that the compactness and cost reduction have been satisfactorily attained. Furthermore, for an example wherein the zooming ratio is reduced to about two and thereby the cost reduction and compactness are pursued extremely, the one as disclosed in the Japanese Patent Laid-Open No. 143311/1983 is cited, but this system cannot be put in practical use in performance because of insufficient compensation of chromatic aberration. Also, from the viewpoint of chromatic aberration, the zooming ratio cannot be taken larger than that value. On the other hand, a system employing a lens for silver nitrate film such as a single-lens reflex lens is shown in the Japanese Patent Publication No. 27849/1970, but this is very large in F number, and therefore cannot be applied to the fields such as video cameras where a bright lens is required.

Particularly, in the field such as video cameras, there are many opportunities of photographing in the very dark state without using an auxiliary light such as a flash, and the minimum F number of lens system is a very important factor along with the sensitivity of the photographing device.

The smaller minimum F number and the compactness and low cost are requirements contrary to each other, and at the present state, a compact zoom lens system satisfactorily meeting the both requirements is not yet provided.

SUMMARY OF THE INVENTION

An object of the present invention is to provide a compact zoom lens system which realizes a zoom lens system having a zooming ratio of about two or three, a very short overall length and a light weight while having a large aperture by a configuration with a small number of lens elements, and further can obtain a high performance in the whole zooming region.

Another object of the present invention is to provide a compact zoom lens system which meets requirements contrary to each other such as a small minimum F number and compactness, light weight and low cost.

Still another object of the present invention is to provide a compact zoom lens system which realizes a zoom lens system having a zooming ratio of about three, a minimum F number smaller than about 1.2, a short overall length and a light weight by a configuration with a small number of lens elements, and can obtain a high performance in the whole zooming region.

Still another object of the present invention is to provide a large-aperture-ratio compact zoom lens system which realizes a zoom lens system having a zooming ratio of about three, a very short overall length and a light weight by a configuration with a small number of lens elements while having a large aperture ratio such that the minimum F number is about 1.0, and further can obtain a high performance in the whole zooming region.

According to the present invention, a compact zoom lens system comprises from the object side to the image side, a first lens unit of a negative refractive power having a cemented lens component consisting of a negative lens element and a positive lens element cemented with each other, said first lens unit being shiftable along an optical axis of the lens system in a zooming operation, a second lens unit of a positive refractive power having two positive lens components, at least one of which consists of a positive lens element and a negative lens element cemented with each other, said second lens unit being shiftable along the optical axis of the lens system in the zooming operation, and a third lens unit of a positive refractive power having, from the object side, a front lens component of a negative refractive power and a rear lens component of a positive refractive power, said third lens unit being stationary along the optical axis of the lens system in the zooming operation.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIGS. 12a to 12c represent the aberration curves of the second embodiment for the shortest focal length;

FIGS. 12d to 12f represent the aberration curves of the second embodiment for a medium focal length;

FIGS. 12g to 12i represent the aberration curves of the second embodiment for the longest focal length;

FIGS. 14a to 14c represent the aberration curves of the fourth embodiment for the shortest focal length;

FIGS. 14d to 14f represent the aberration curves of the fourth embodiment for a medium focal length;

FIGS. 14g to 14i represent the aberration curves of the fourth embodiment for the longest focal length;

FIGS. 15a to 15c represent the aberration curves of the fifth embodiment for the shortest focal length;

FIGS. 15d to 15f represent the aberration curves of the fifth embodiment for a medium focal length;

FIGS. 15g to 15i represent the aberration curves of the fifth embodiment for the longest focal length;

FIGS. 16a to 16c represent the aberration curves of the sixth embodiment for the shortest focal length;

FIGS. 16d to 16f represent the aberration curves of the sixth embodiment for a medium focal length;

FIGS. 16g to 16i represent the aberration curves of the sixth embodiment for the longest focal length;

FIGS. 19a to 19c represent the aberration curves of the ninth embodiment for the shortest focal length;

FIGS. 19d to 19f represent the aberration curves of the ninth embodiment for a medium focal length;

FIGS. 19g to 19i represent the aberration curves of the ninth embodiment for the longest focal length;

FIGS. 26a to 26c represent the aberration curves of the eleventh embodiment for the shortest focal length;

FIGS. 26d to 26f represent the aberration curves of the eleventh embodiment for a medium focal length;

FIGS. 26g to 26i represent the aberration curves of the eleventh embodiment for the longest focal length;

FIGS. 27a to 27c represent the aberration curves of the twelfth embodiment for the shortest focal length;

FIGS. 27d to 27f represent the aberration curves of the twelfth embodiment for a medium focal length;

FIGS. 27g to 27i represent the aberration curves of the twelfth embodiment for the longest focal length;

FIGS. 29a to 29c represent the aberration curves of the fourteenth embodiment for the shortest focal length;

FIGS. 29d to 29f represent the aberration curves of the fourteenth embodiment for a medium focal length;

FIGS. 29g to 29i represent the aberration curves of the fourteenth embodiment for the longest focal length;

FIGS. 42a to 42c represent the aberration curves of the twentieth embodiment for the shortest focal length;

FIGS. 42d to 42f represent the aberration curves of the twentieth embodiment for a medium focal length;

FIGS. 42g to 42i represent the aberration curves of the twentieth embodiment for the longest focal length;

FIGS. 43a to 43c represent the aberration curves of the twenty-first embodiment for the shortest focal length;

FIGS. 43d to 43f represent the aberration curves of the twenty-first embodiment for a medium focal length;

FIGS. 43g to 43i represent the aberration curves of the twenty-first embodiment for the longest focal length;

FIGS. 44a to 44c represent the aberration curves of the twenty-second embodiment for the shortest focal length;

FIGS. 44d to 44f represent the aberration curves of the twenty-second embodiment for a medium focal length;

FIGS. 44g to 44i represent the aberration curves of the twenty-second embodiment for the longest focal length;

FIG. 48 represents a cross sectional view of the lens system according to a twenty-sixth embodiment of the present invention for the shortest focal length;

FIG. 49 represents a cross sectional view of the lens system according to a twenty-seventh embodiment of the present invention for the shortest focal length;

FIGS. 50a to 50c represent the aberration curves of the twenty-third embodiment for the shortest focal length;

FIGS. 50d to 50f represent the aberration curves of the twenty-third embodiment for a medium focal length;

FIGS. 50g to 50i represent the aberration curves of the twenty-third embodiment for the longest focal length;

FIGS. 51a to 51c represent the aberration curves of the twenty-fourth embodiment for the shortest focal length;

FIGS. 51d to 51f represent the aberration curves of the twenty-fourth embodiment for a medium focal length;

FIGS. 51g to 51i represent the aberration curves of the twenty-fourth embodiment for the longest focal length;

FIGS. 52a to 52c represent the aberration curves of the twenty-fifth embodiment for the shortest focal length;

FIGS. 52d to 52f represent the aberration curves of the twenty-fifth embodiment for a medium focal length;

FIGS. 52g to 52i represent the aberration curves of the twenty-fifth embodiment for the longest focal length;

FIGS. 53a to 53c represent the aberration curves of the twenty-sixth embodiment for the shortest focal length;

FIGS. 53d to 53f represent the aberration curves of the twenty-sixth embodiment for a medium focal length;

FIGS. 53g to 53i represent the aberration curves of the twenty-sixth embodiment for the longest focal length;

DETAILED DESCRIPTION OF THE PREFERRED EMBODIMENTS

Figure 1:
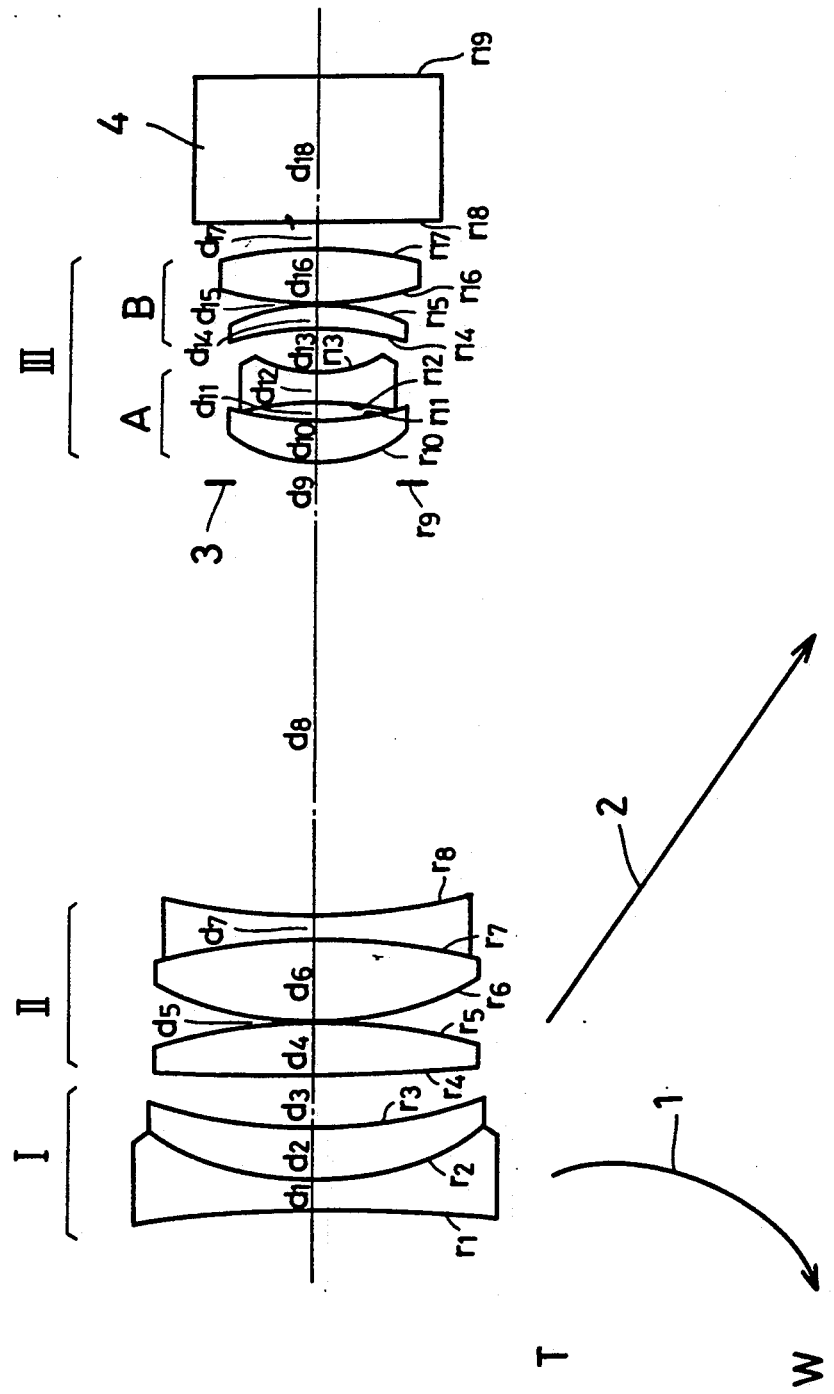
FIG. 1 represents a cross sectional view of the lens system according to a first embodiment of the present invention for the shortest focal length.
Figure 2:
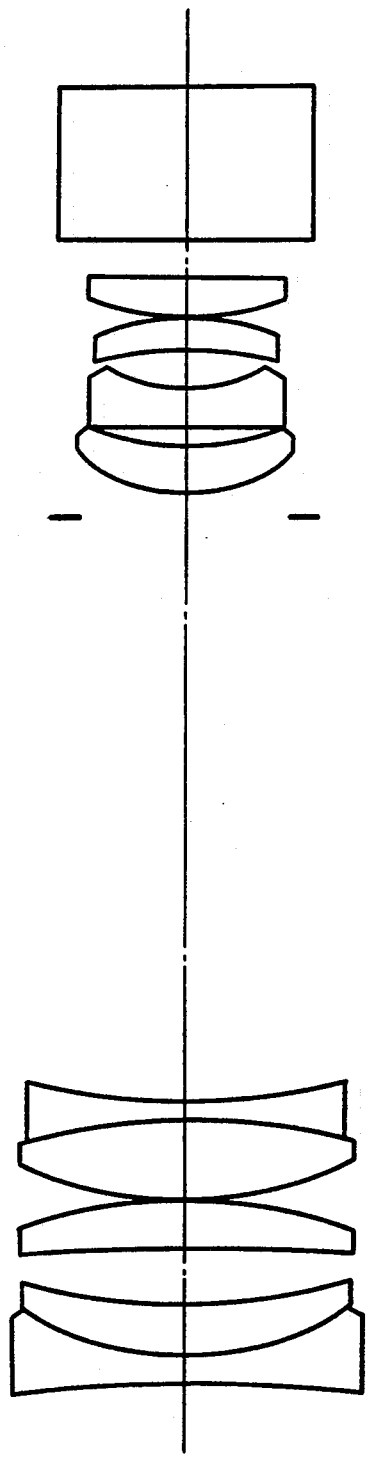
FIG. 2 represents a cross sectional view of the lens system according to a second embodiment of the present invention for the shortest focal length.
Figure 3:
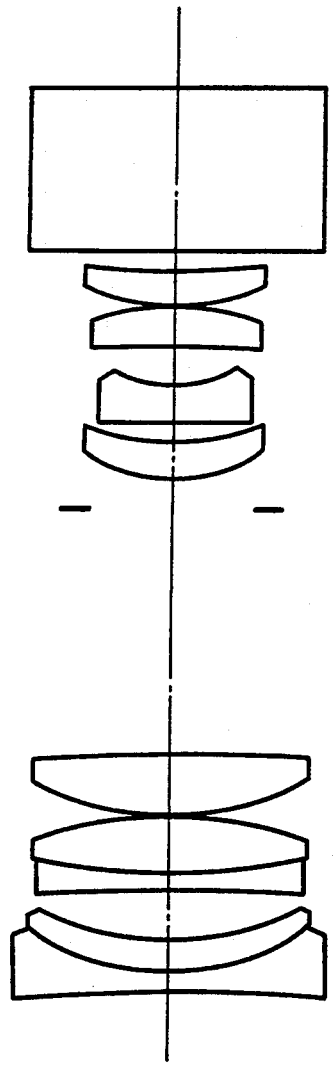
FIG. 3 represents a cross sectional view of the lens system according to a third embodiment of the present invention for the shortest focal length.
Figure 4:
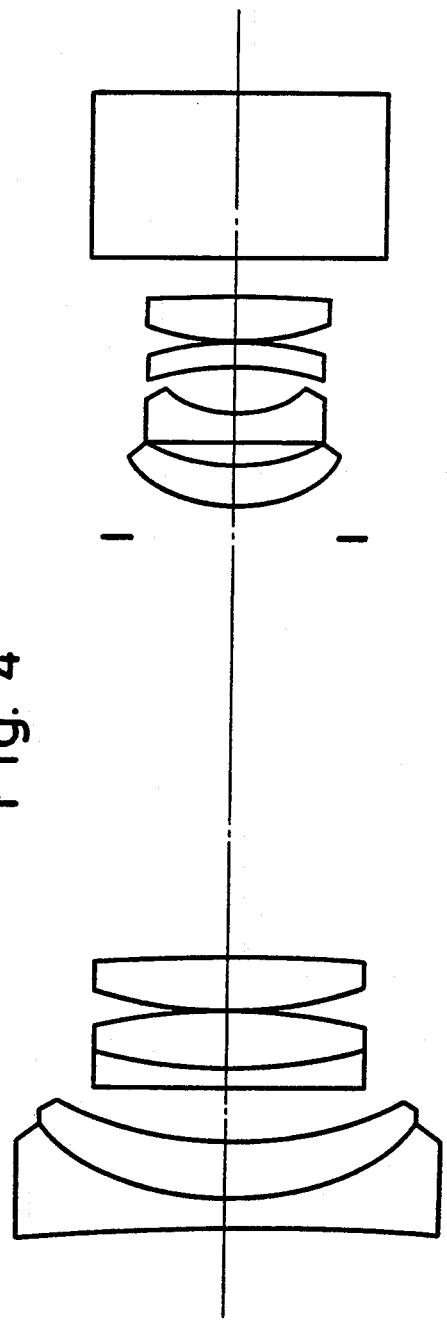
FIG. 4 represents a cross sectional view of the lens system according to a fourth embodiment of the present invention for the shortest focal length.
Figure 5:
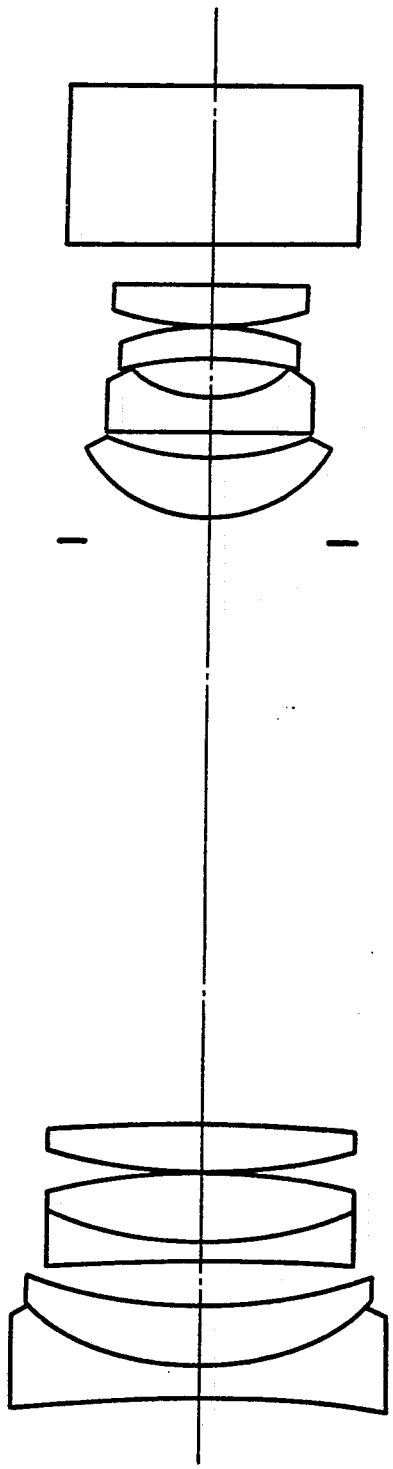
FIG. 5 represents a cross sectional view of the lens system according to a fifth embodiment of the present invention for the shortest focal length.
Figure 6:
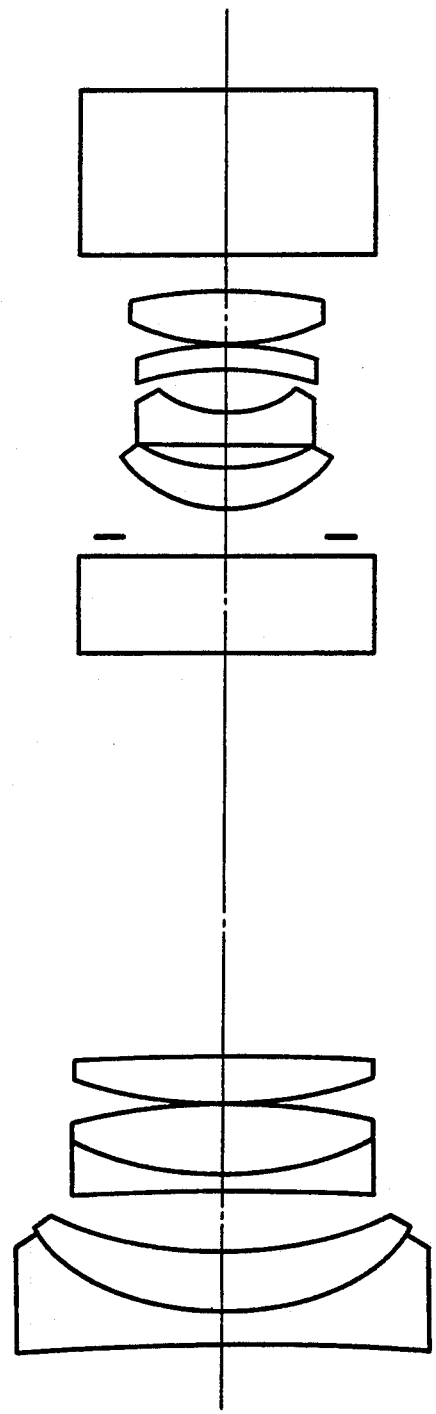
FIG. 6 represents a cross sectional view of the lens system according to a sixth embodiment of the present invention for the shortest focal length.
Figure 7:
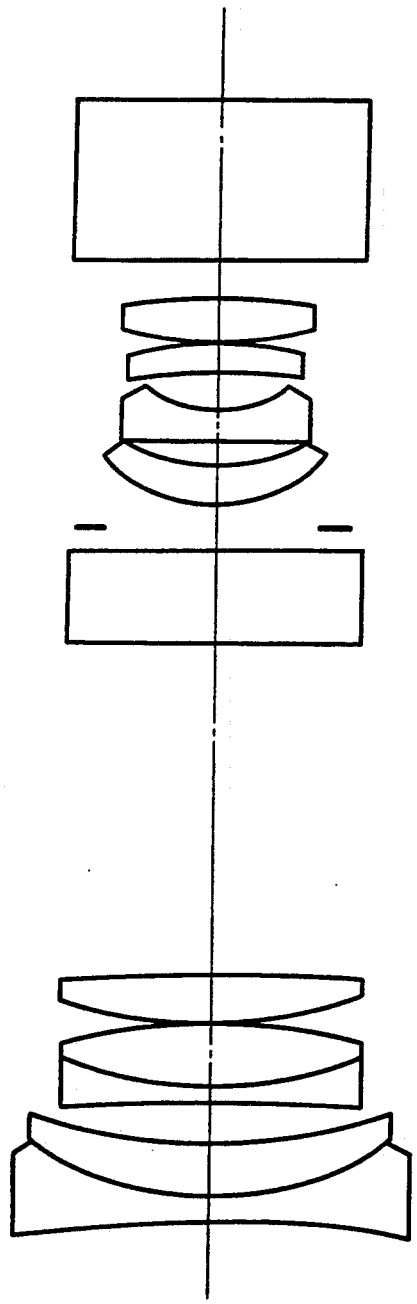
FIG. 7 represents a cross sectional view of the lens system according to a seventh embodiment of the present invention for the shortest focal length.
Figure 8:
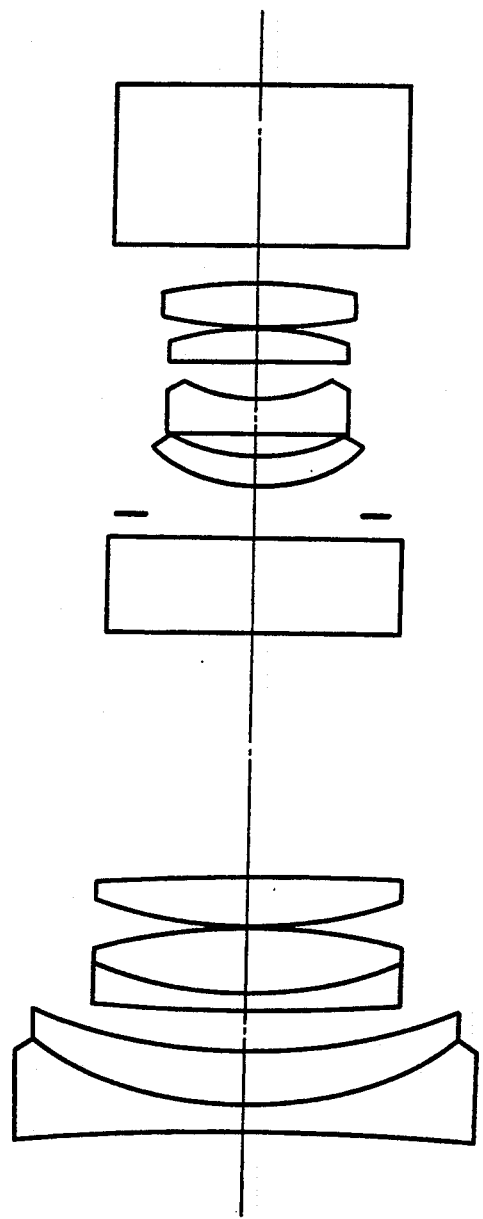
FIG. 8 represents a cross sectional view of the lens system according to a eighth embodiment of the present invention for the shortest focal length.
Figure 9:
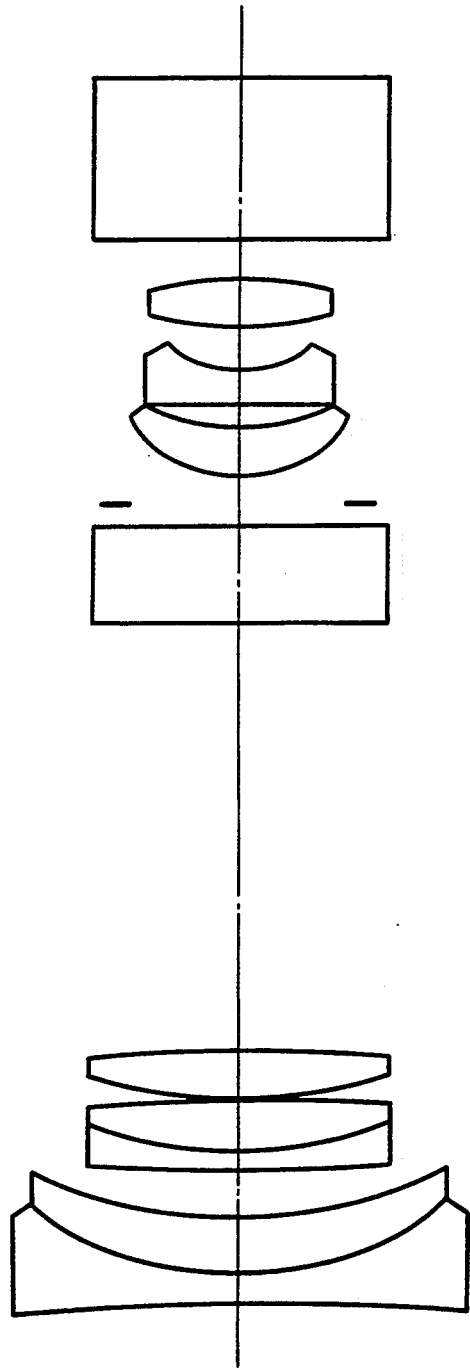
FIG. 9 represents a cross sectional view of the lens system according to a ninth embodiment of the present invention for the shortest focal length.
Figure 10:
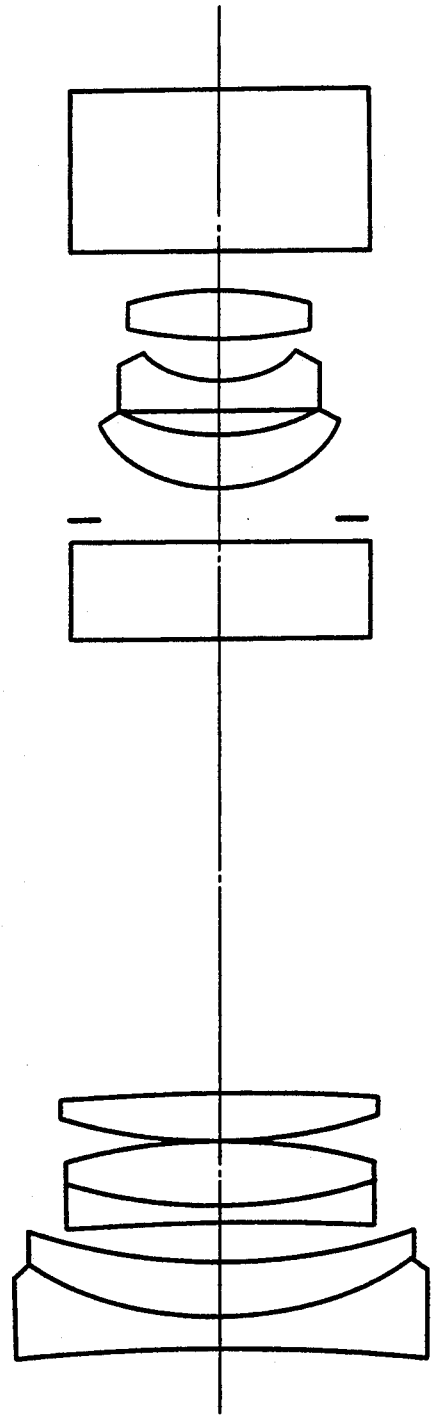
FIG. 10 represents a cross sectional view of the lens system according to a tenth embodiment of the present invention for the shortest focal length.
Figure 11A:
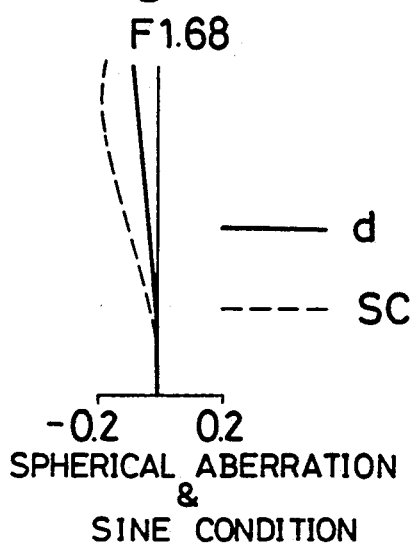
FIGS. 11a to 11c represent the aberration curves of the first embodiment for the shortest focal length.
Figure 11B:
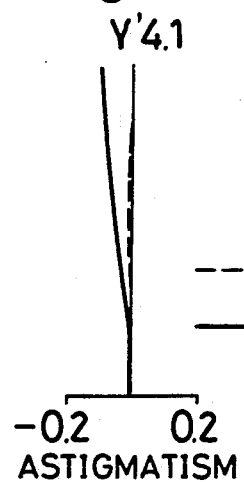
Figure 11C:
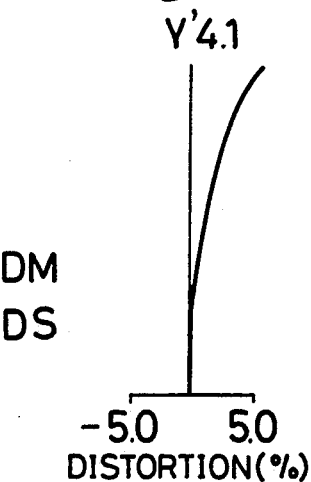
Figure 11D:
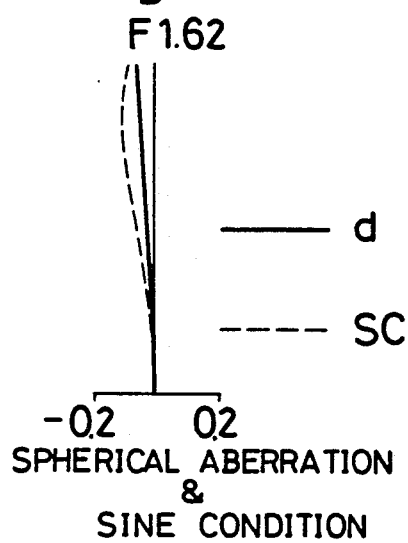
FIGS. 11d to 11f represent the aberration curves of the first embodiment for a medium focal length.
Figure 11E:
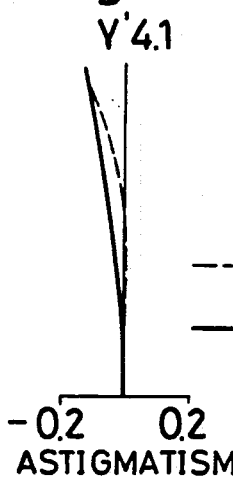
Figure 11F:
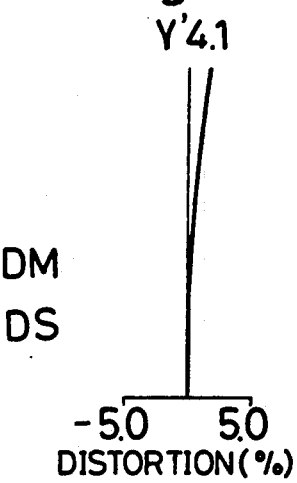
Figure 11G:
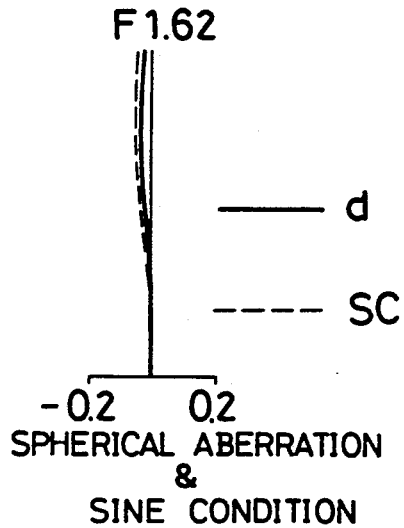
FIGS. 11g to 11i represent the aberration curves of the first embodiment for the longest focal length.
Figure 11H:
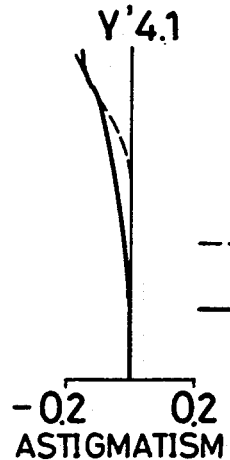
Figure 11I:
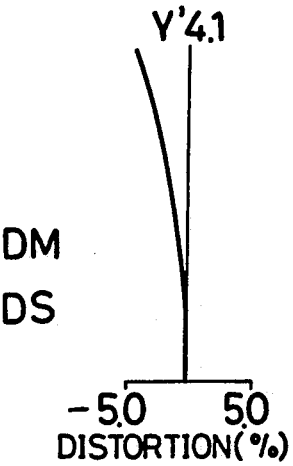
Figure 13A:
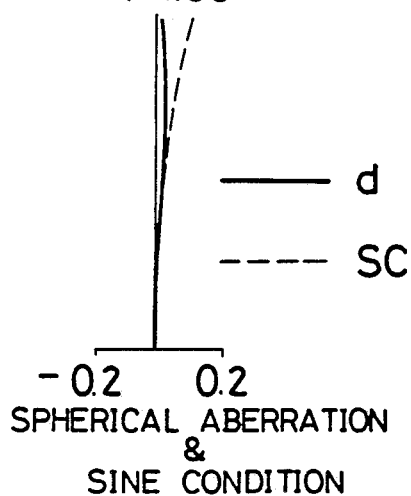
FIGS. 13a to 13c represent the aberration curves of the third embodiment for the shortest focal length.
Figure 13B:
Figure 13C:
Figure 13D:
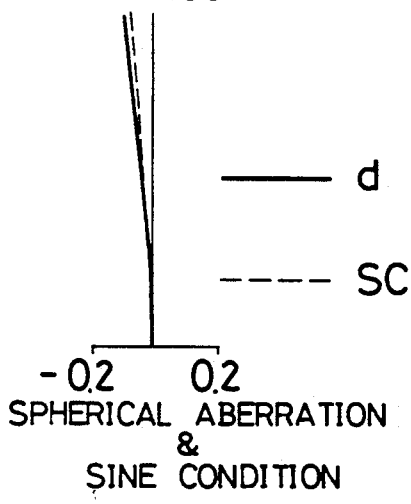
FIGS. 13d to 13f represent the aberration curves of the third embodiment for a medium focal length.
Figure 13E:
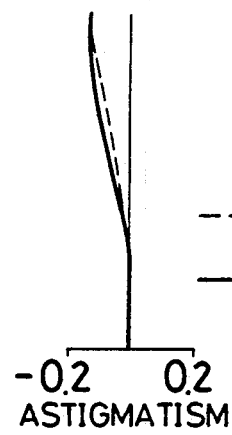
Figure 13F:
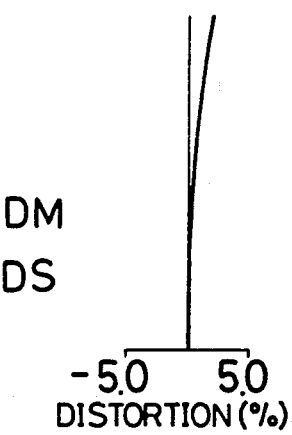
Figure 13G:
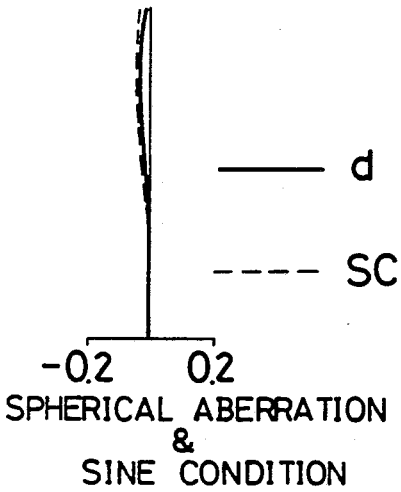
FIGS. 13g to 13i represent the aberration curves of the third embodiment for the longest focal length.
Figure 13H:
Figure 13I:
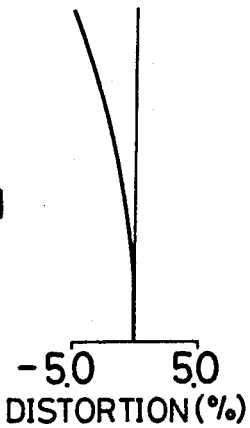
Figure 17A:
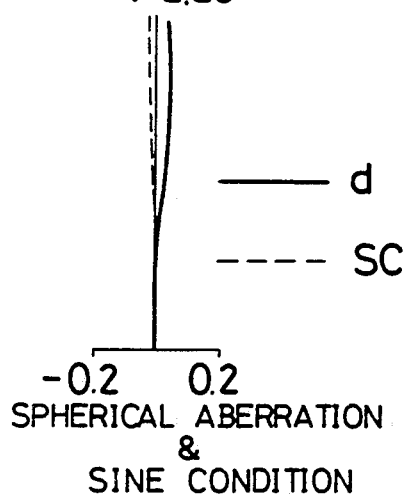
FIGS. 17a to 17c represent the aberration curves of the seventh embodiment for the shortest focal length.
Figure 17B:
Figure 17C:
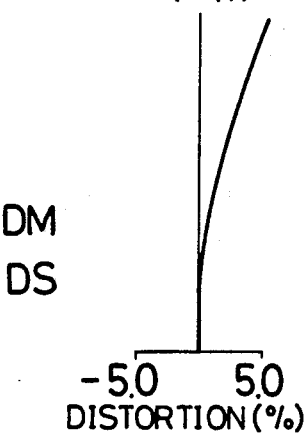
Figure 17D:
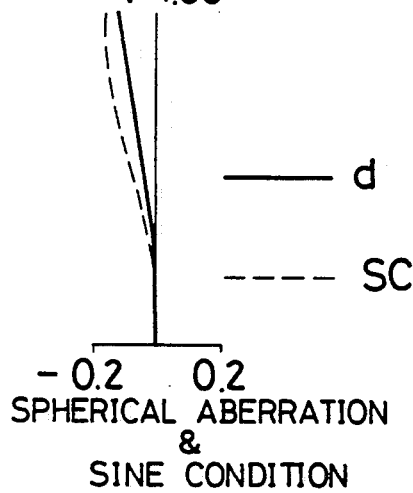
FIGS. 17d to 17f represent the aberration curves of the seventh embodiment for a medium focal length.
Figure 17E:
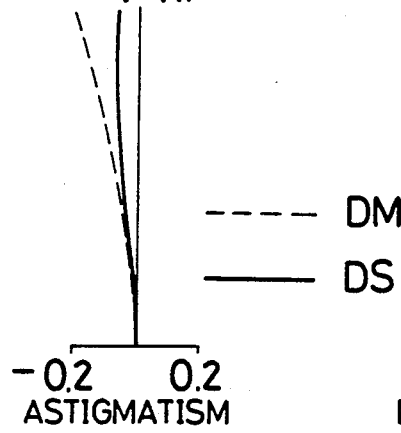
Figure 17F:
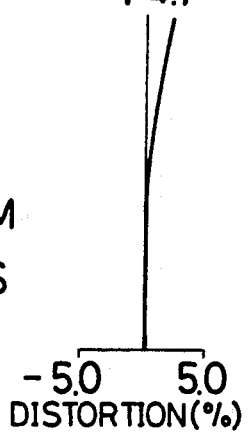
Figure 17G:
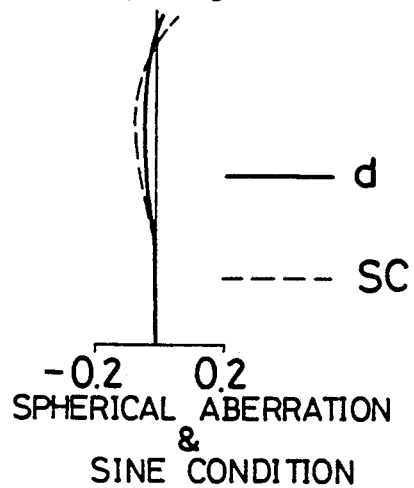
FIGS. 17g to 17i represent the aberration curves of the seventh embodiment for the longest focal length.
Figure 17H:
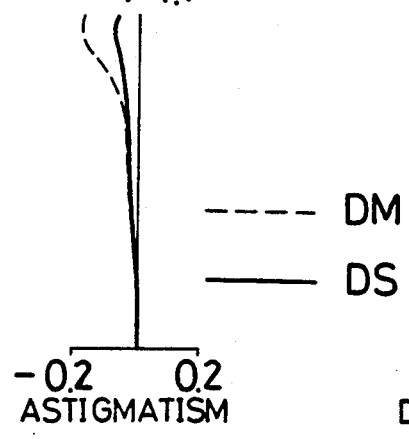
Figure 17I:
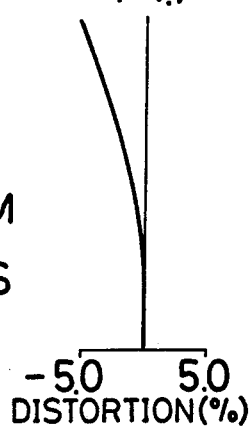
Figure 18A:
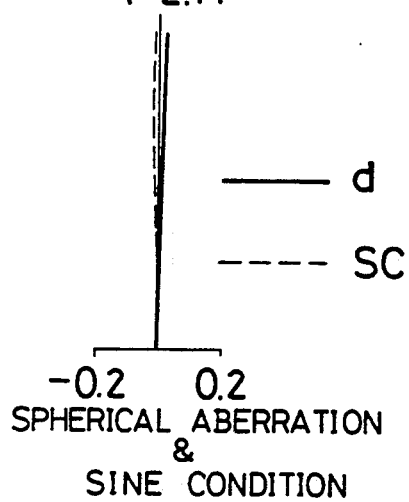
FIGS. 18a to 18c represent the aberration curves of the eighth embodiment for the shortest focal length.
Figure 18B:
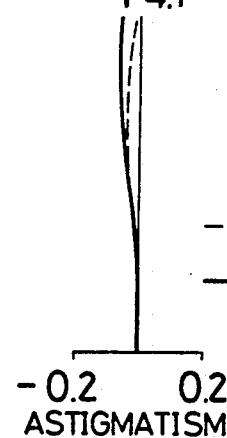
Figure 18C:
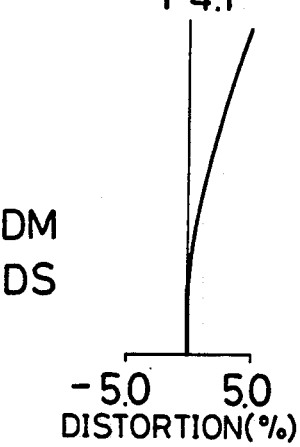
Figure 18D:
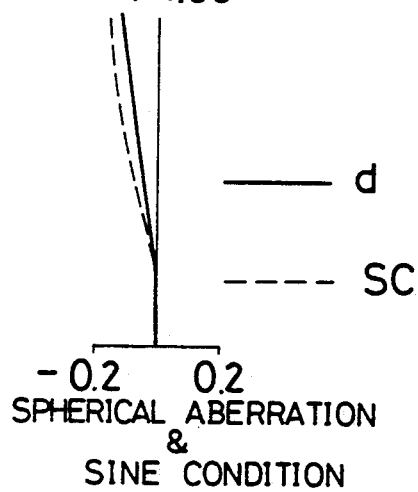
FIGS. 18d to 18f represent the aberration curves of the eighth embodiment for a medium focal length.
Figure 18E:
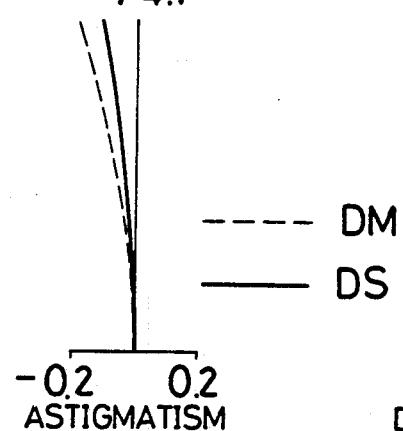
Figure 18F:
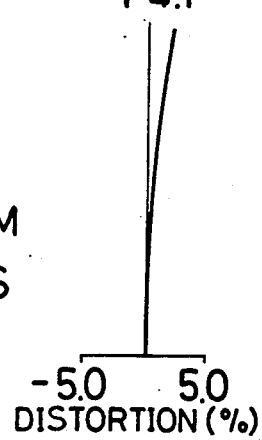
Figure 18G:
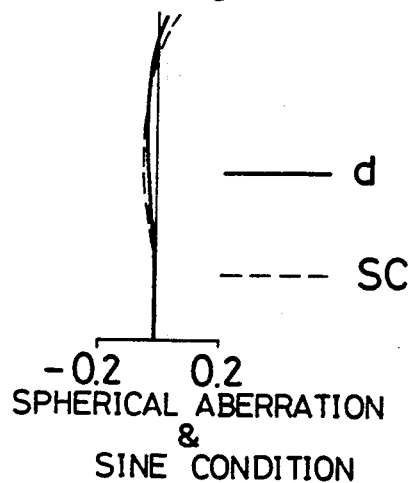
FIGS. 18g to 18i represent the aberration curves of the eighth embodiment for the longest focal length.
Figure 18H:
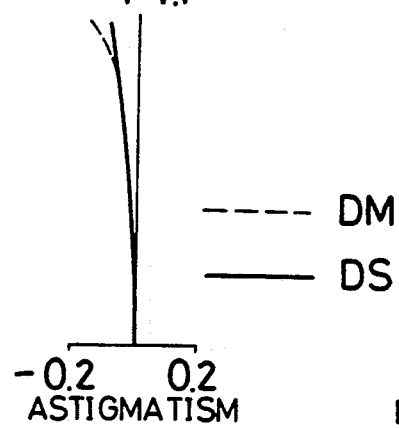
Figure 18I:
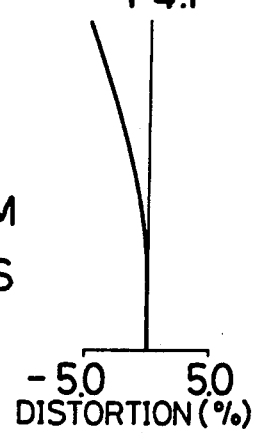
Figure 20A:
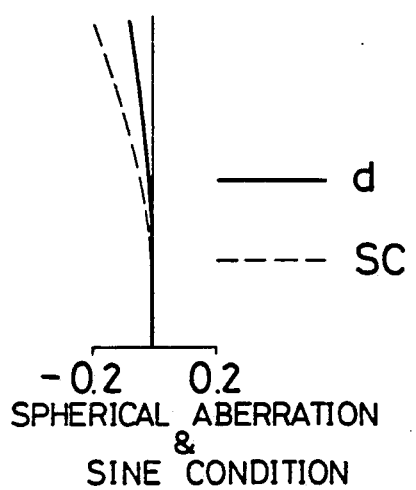
FIGS. 20a to 20c represent the aberration curves of the tenth embodiment for the shortest focal length.
Figure 20B:
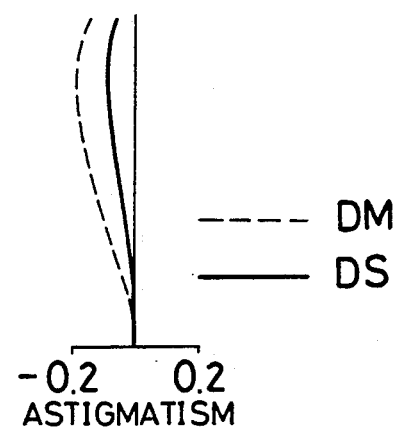
Figure 20C:
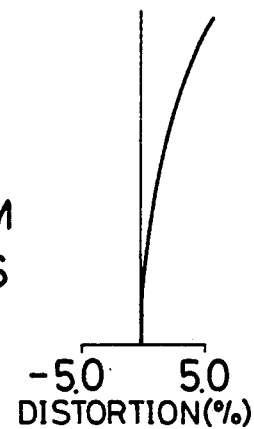
Figure 20D:
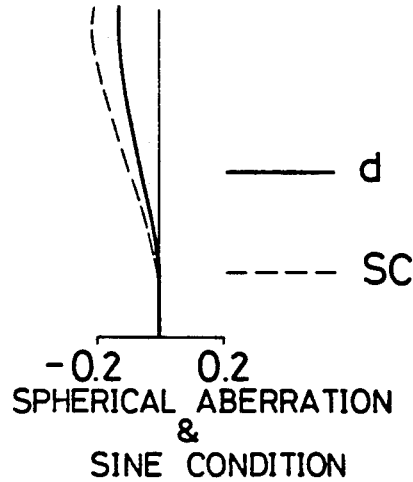
FIGS. 20d to 20f represent the aberration curves of the tenth embodiment for a medium focal length.
Figure 20E:
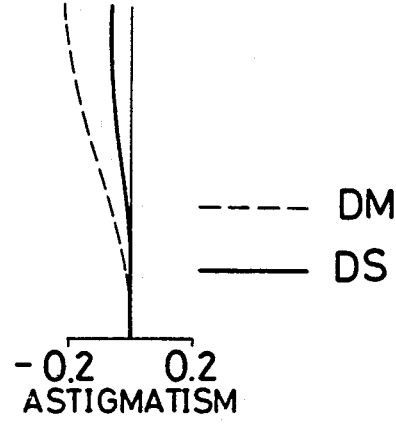
Figure 20F:
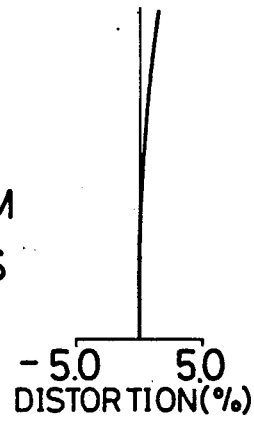
Figure 20G:
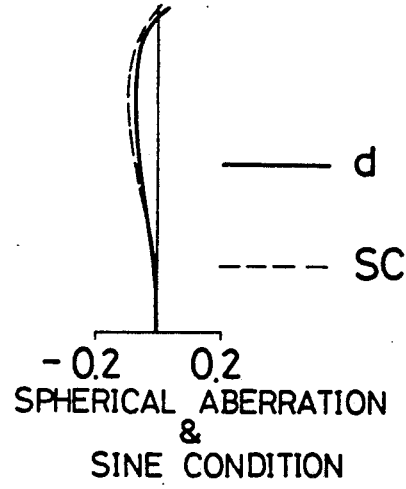
FIGS. 20g to 20i represent the aberration curves of the tenth embodiment for the longest focal length.
Figure 20H:
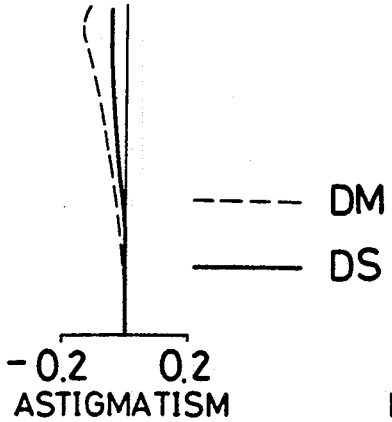
Figure 20I:
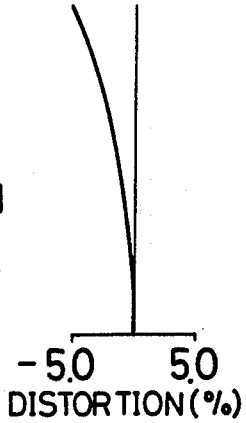
Figure 21:
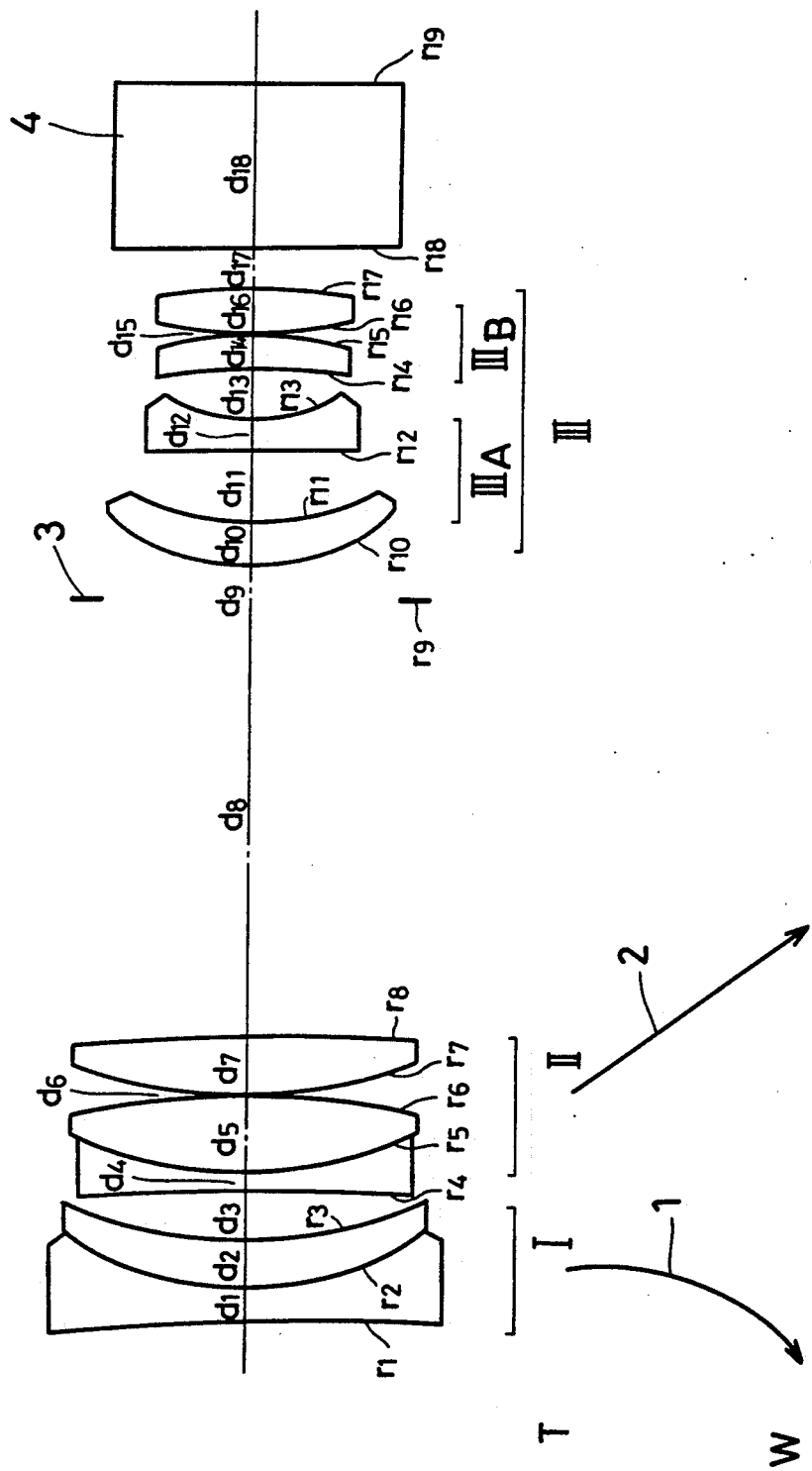
FIG. 21 represents a cross sectional view of the lens system according to a eleventh embodiment of the present invention for the shortest focal length.
Figure 22:
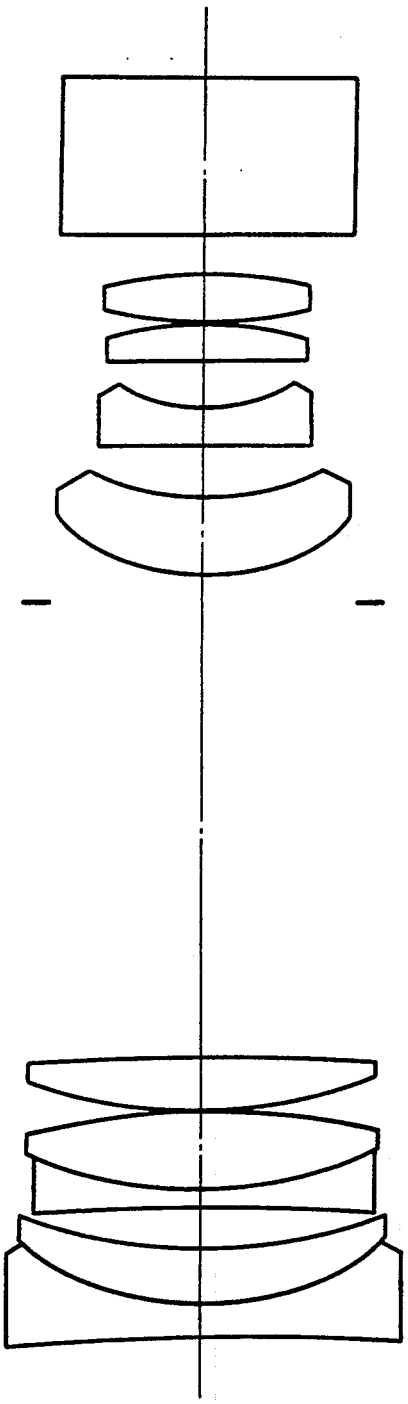
FIG. 22 represents a cross sectional view of the lens system according to a twelfth embodiment of the present invention for the shortest focal length.
Figure 23:
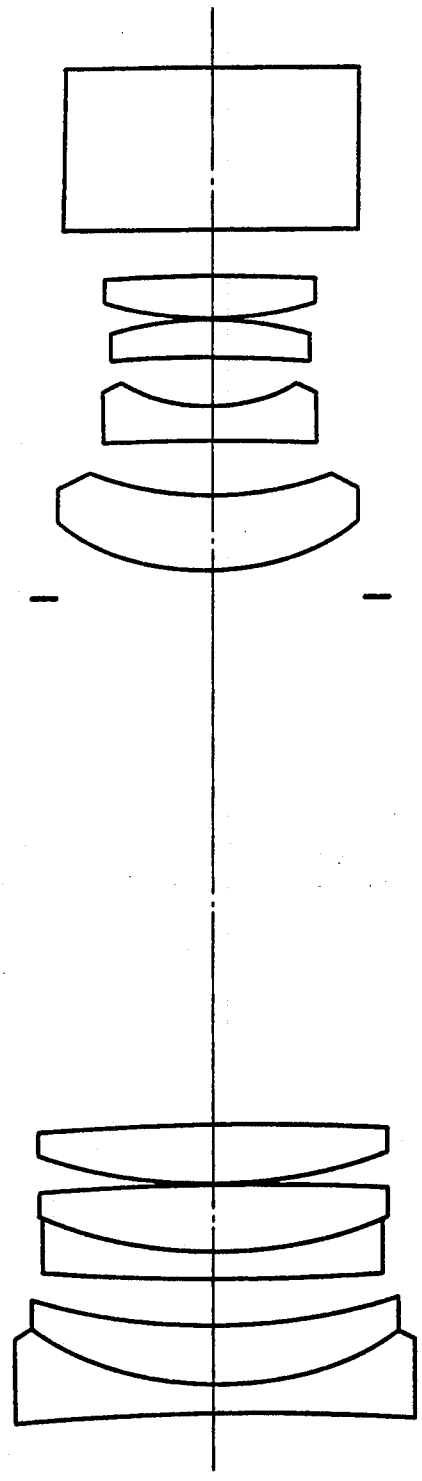
FIG. 23 represents a cross sectional view of the lens system according to a thirteenth embodiment of the present invention for the shortest focal length.
Figure 24:
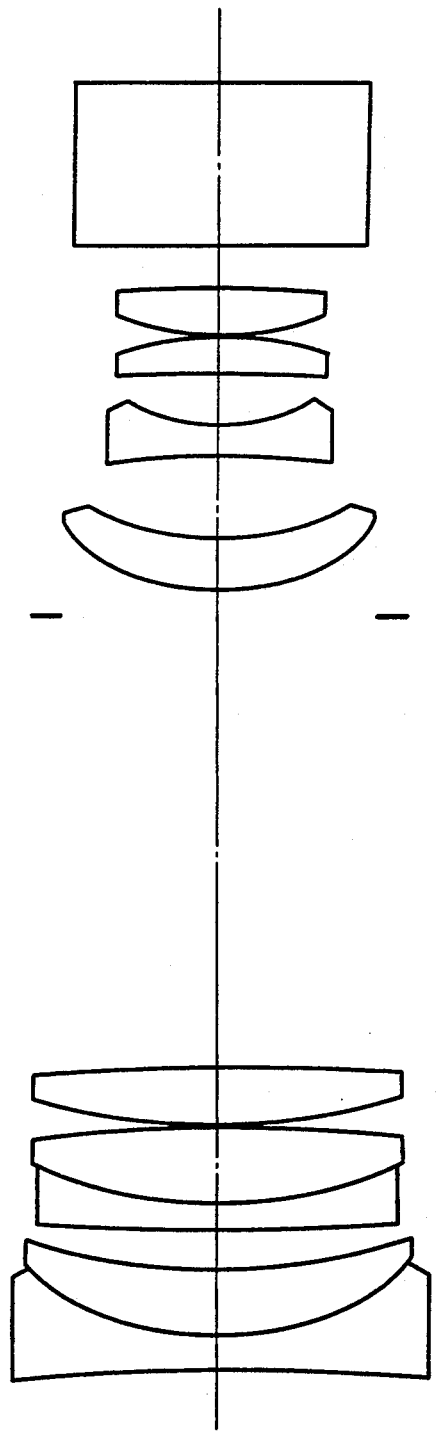
FIG. 24 represents a cross sectional view of the lens system according to a fourteenth embodiment of the present invention for the shortest focal length.
Figure 25:
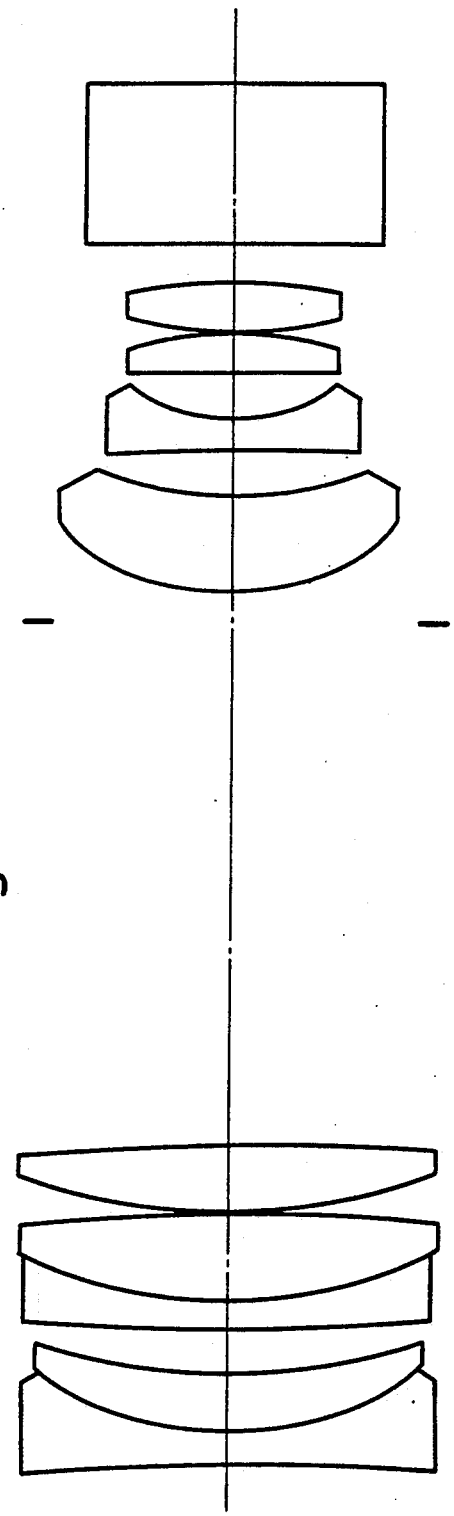
FIG. 25 represents a cross sectional view of the lens system according to a fifteenth embodiment of the present invention for the shortest focal length.
Figure 28A:
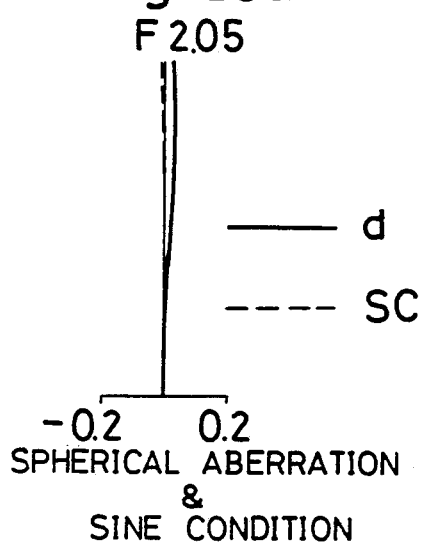
FIGS. 28a to 28c represent the aberration curves of the thirteenth embodiment for the shortest focal length.
Figure 28B:
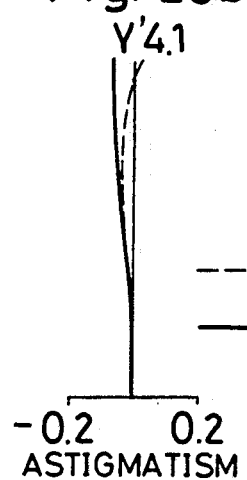
Figure 28C:
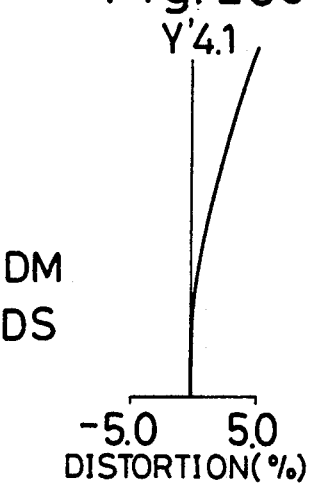
Figure 28D:
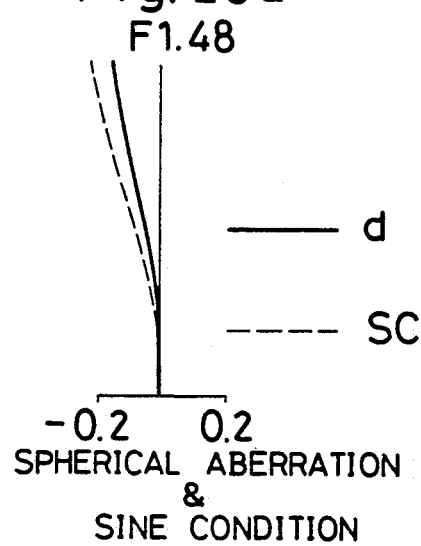
FIGS. 28d to 28f represent the aberration curves of the thirteenth embodiment for a medium focal length.
Figure 28E:
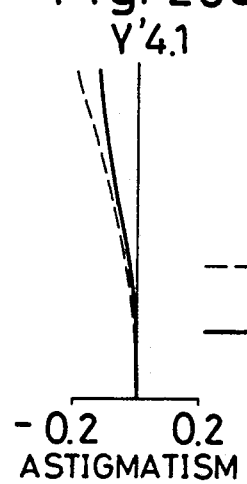
Figure 28F:
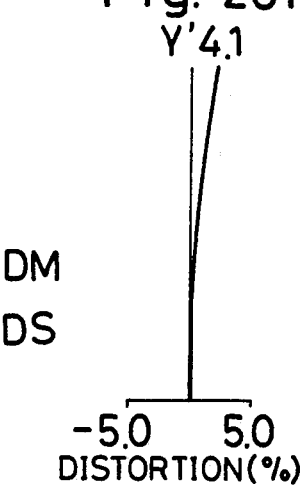
Figure 28G:
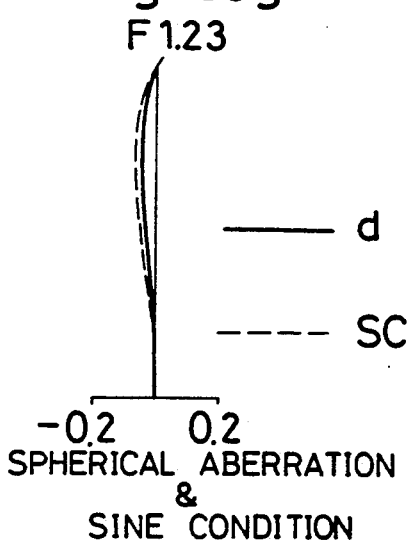
FIGS. 28g to 28i represent the aberration curves of the thirteenth embodiment for the longest focal length.
Figure 28H:
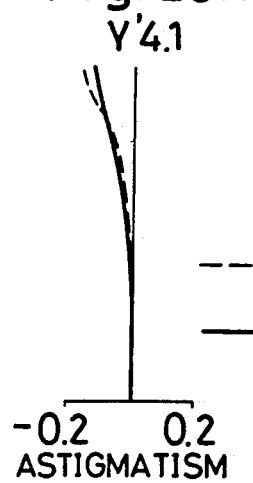
Figure 28I:
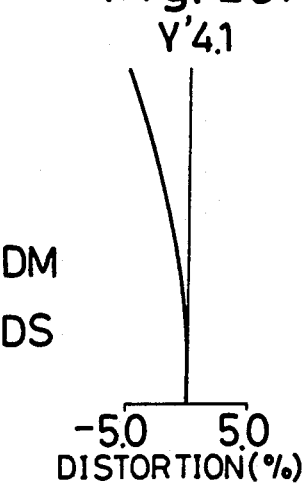
Figure 30A:
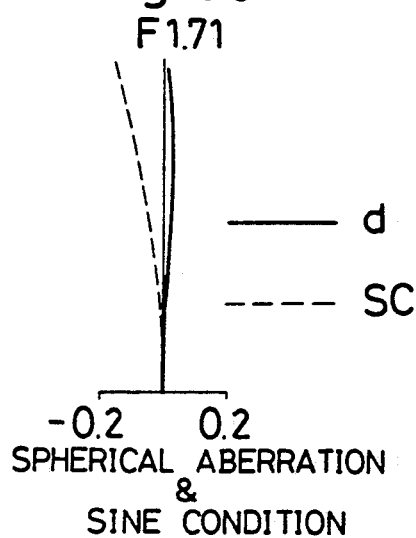
FIGS. 30a to 30c represent the aberration curves of the fifteenth embodiment for the shortest focal length.
Figure 30B:
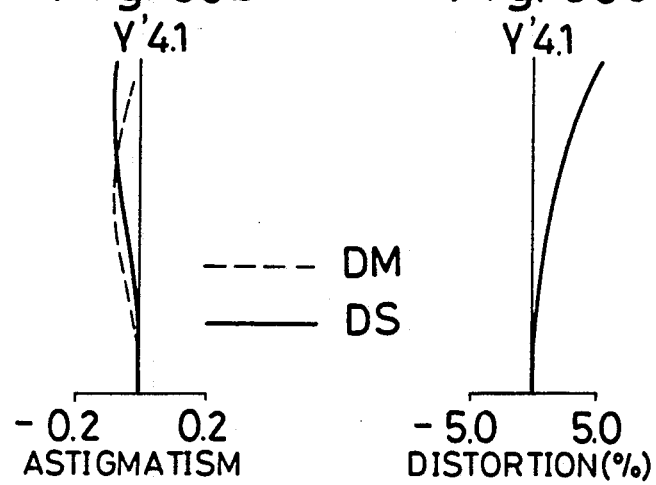
Figure 30C:
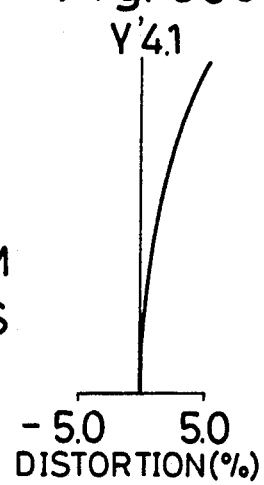
Figure 30D:
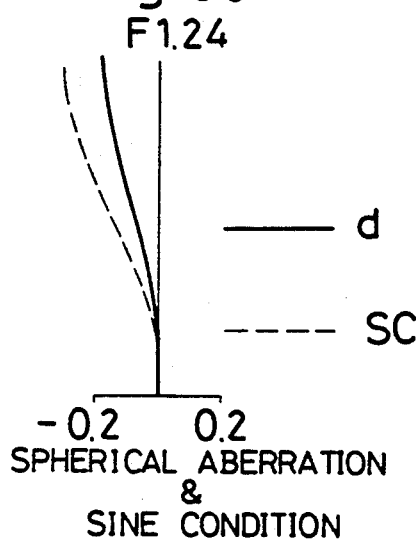
FIGS. 30d to 30f represent the aberration curves of the fifteenth embodiment for a medium focal length.
Figure 30E:
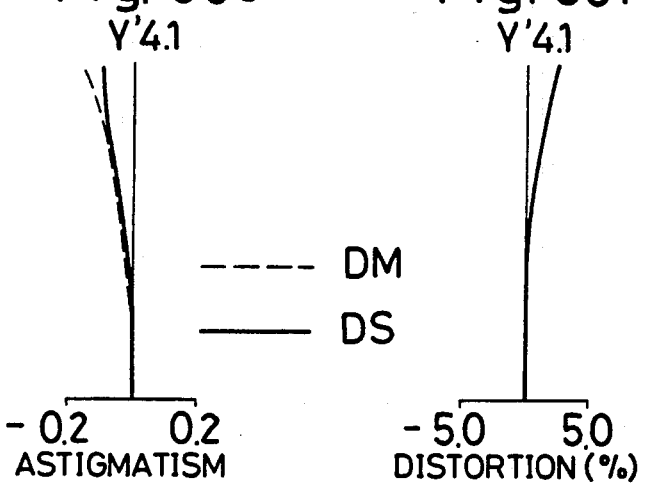
Figure 30F:
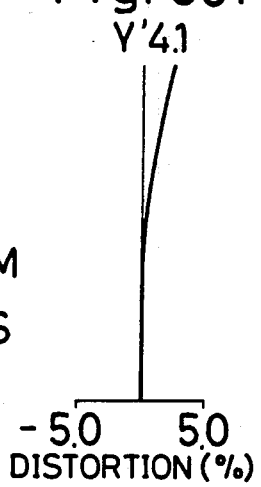
Figure 30G:
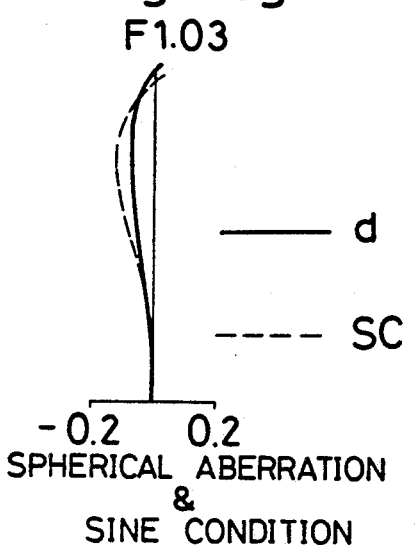
FIGS. 30g to 30i represent the aberration curves of the fifteenth embodiment for the longest focal length.
Figure 30H:
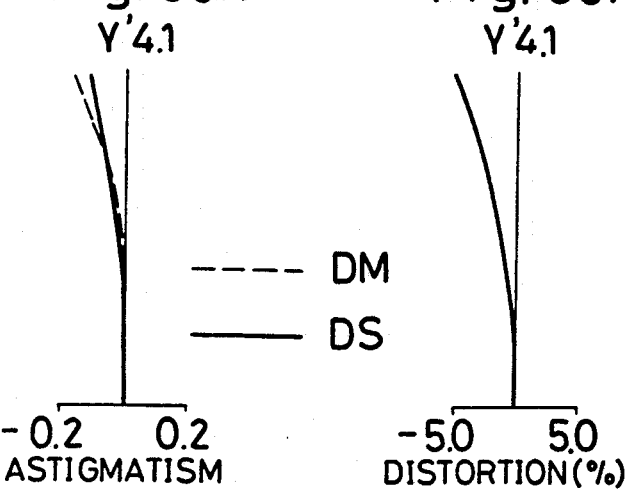
Figure 30I:
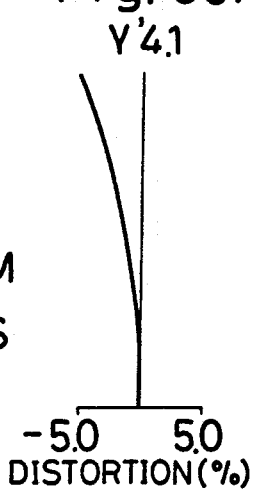
Figure 31:
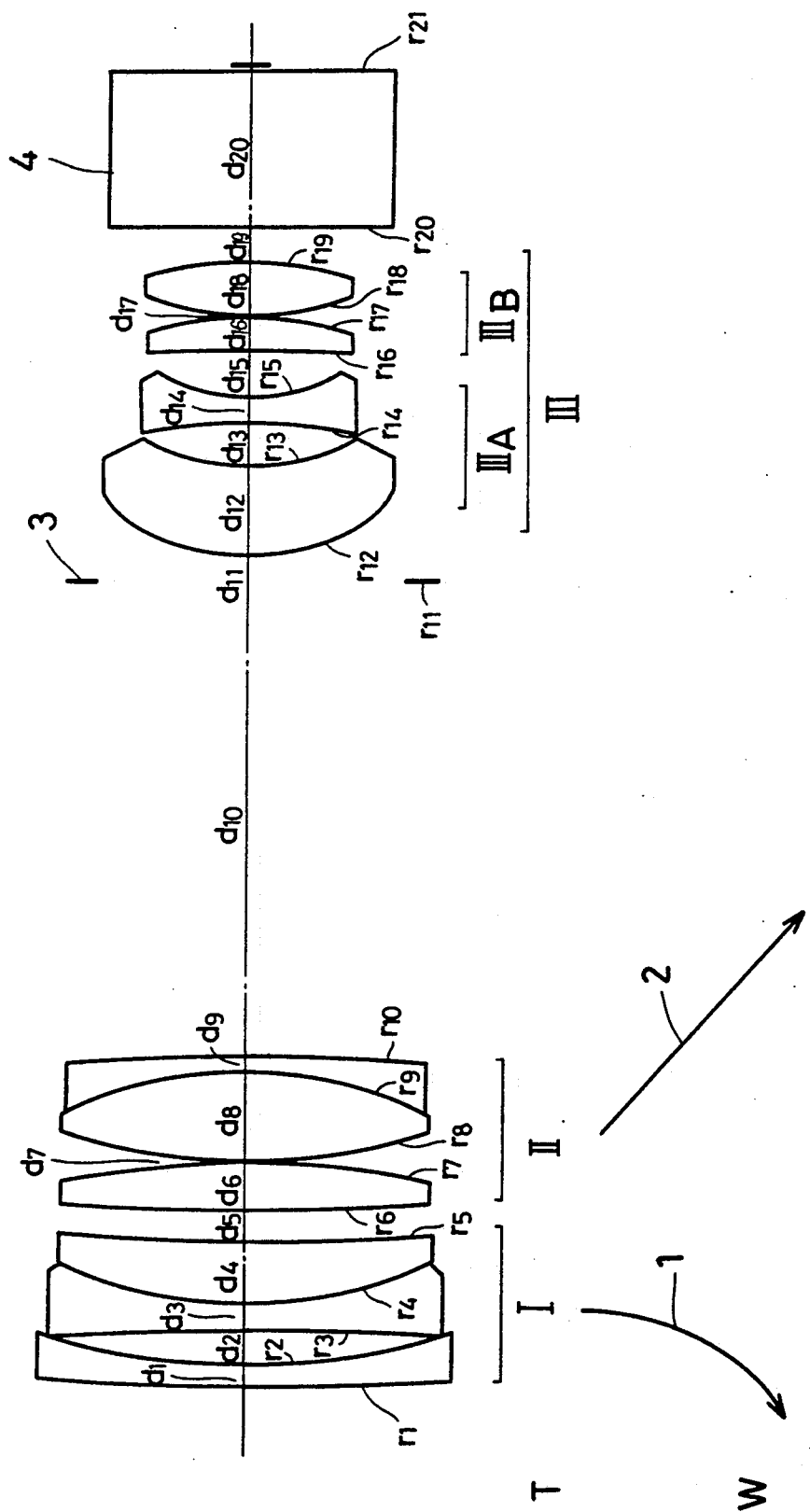
FIG. 31 represents a cross sectional view of the lens system according to a sixteenth embodiment of the present invention for the shortest focal length.
Figure 32:
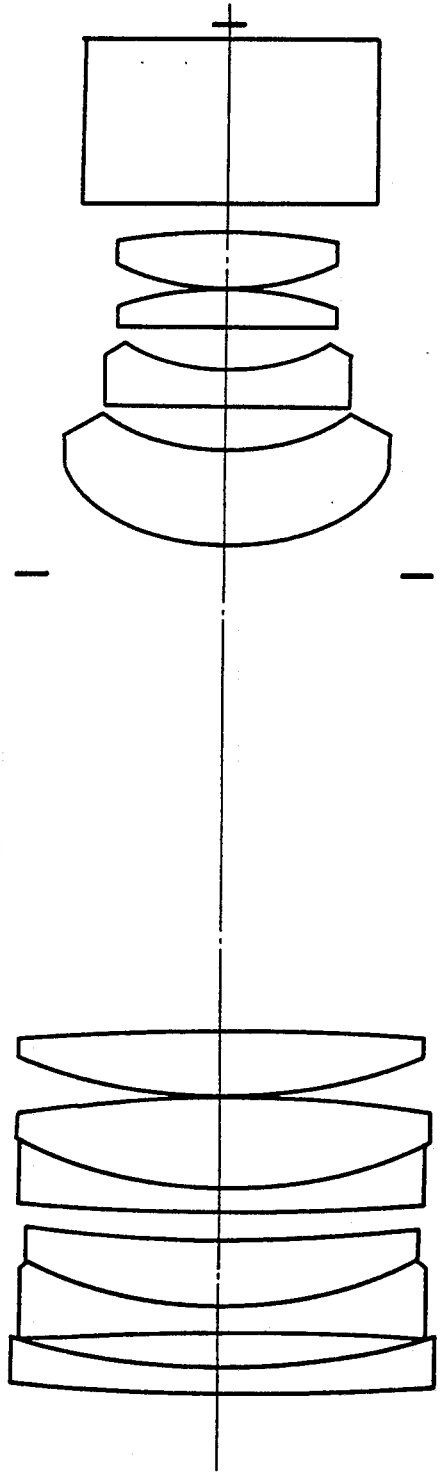
FIG. 32 represents a cross sectional view of the lens system according to a seventeenth embodiment of the present invention for the shortest focal length.
Figure 33:
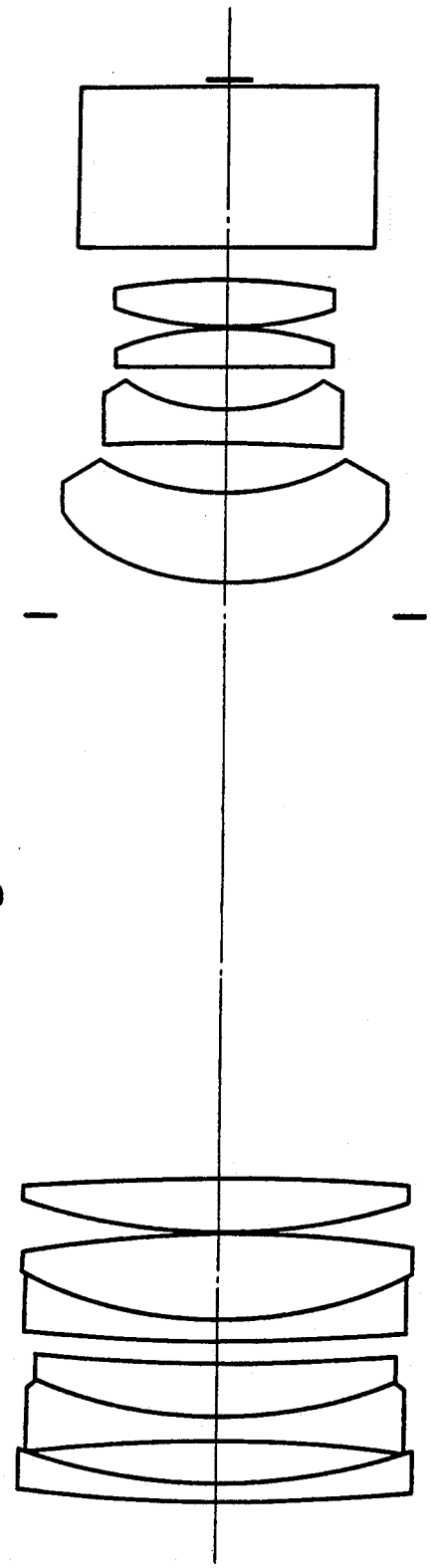
FIG. 33 represents a cross sectional view of the lens system according to a eighteenth embodiment of the present invention for the shortest focal length.
Figure 34:
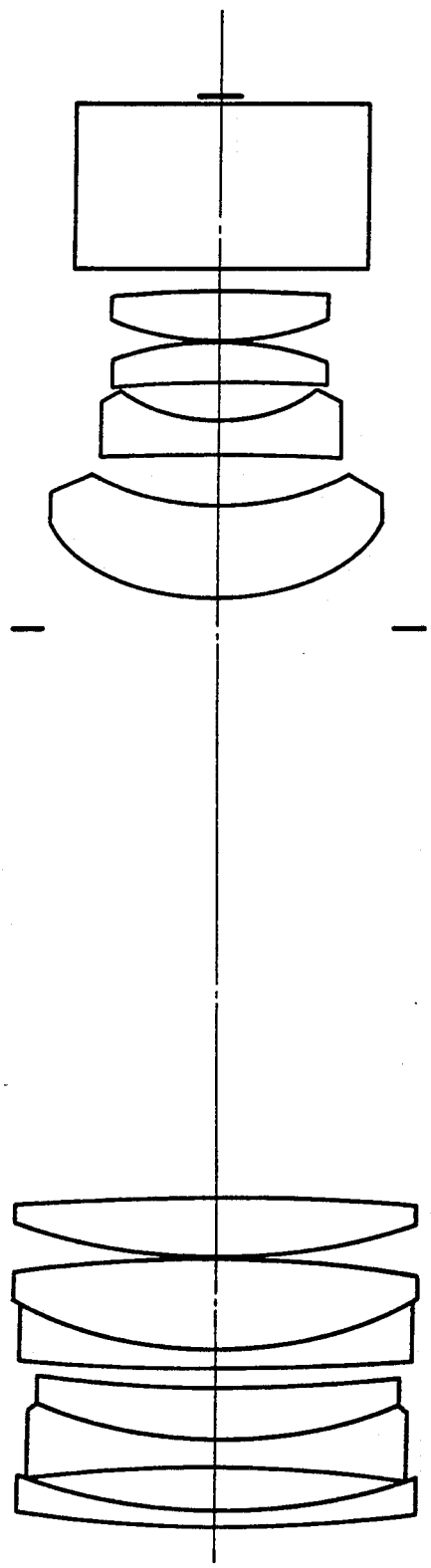
FIG. 34 represents a cross sectional view of the lens system according to a nineteenth embodiment of the present invention for the shortest focal length.
Figure 35:
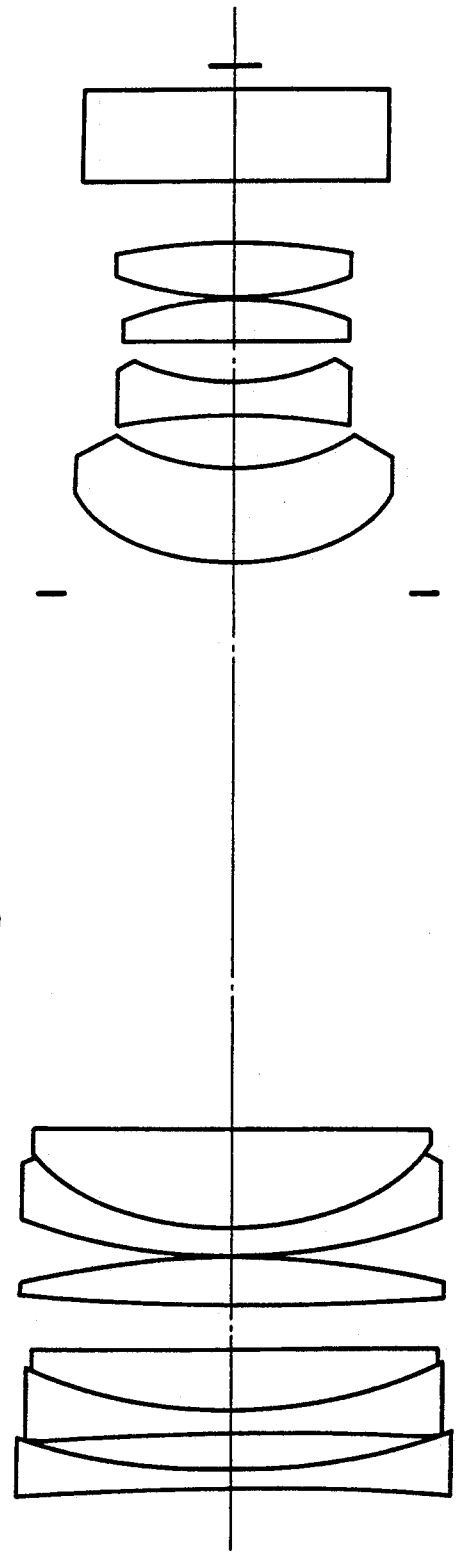
FIG. 35 represents a cross sectional view of the lens system according to a twentieth embodiment of the present invention for the shortest focal length.
Figure 36:
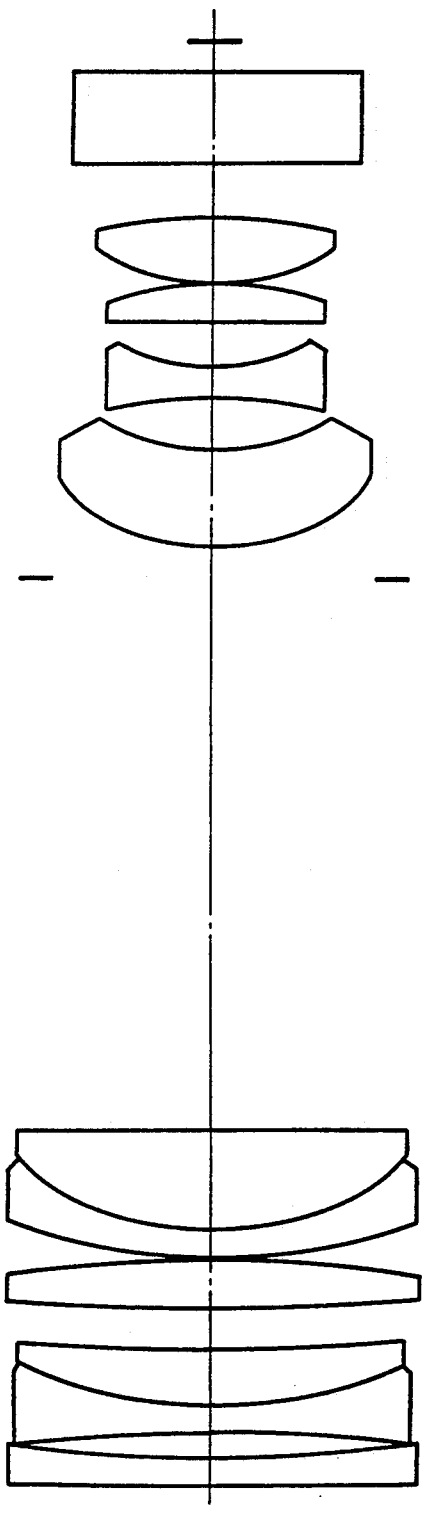
FIG. 36 represents a cross sectional view of the lens system according to a twenty-first embodiment of the present invention for the shortest focal length.
Figure 37:
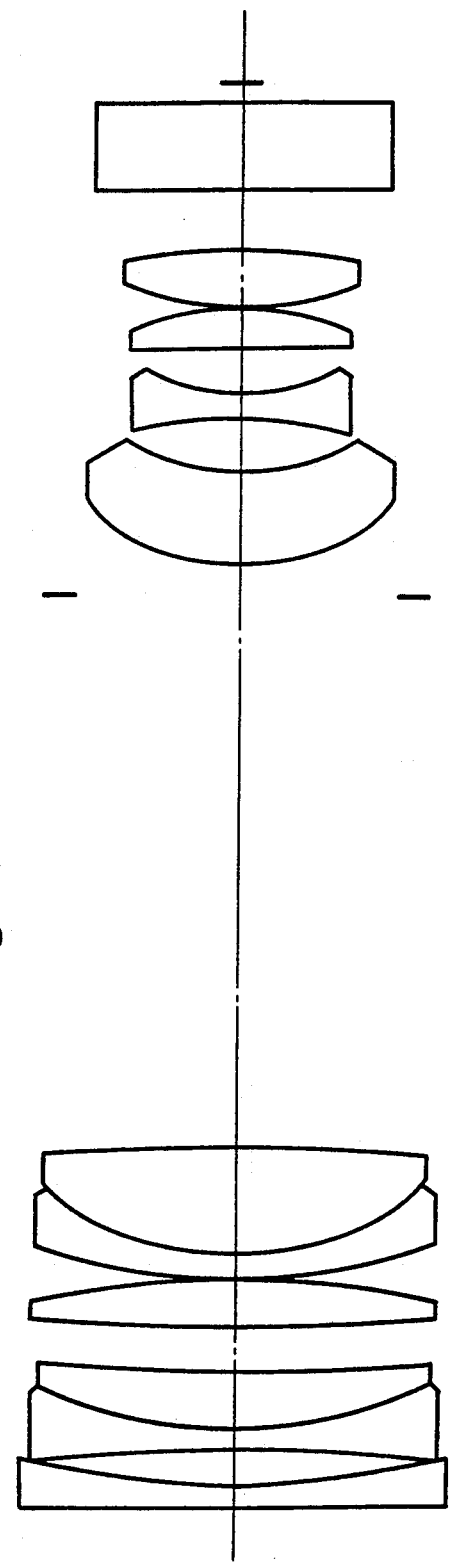
FIG. 37 represents a cross sectional view of the lens system according to a twenty-second embodiment of the present invention for the shortest focal length.
Figure 38A:
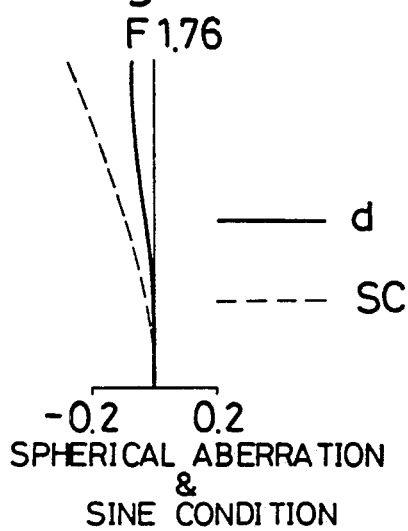
FIGS. 38a to 38c represent the aberration curves of the sixteenth embodiment for the shortest focal length.
Figure 38B:
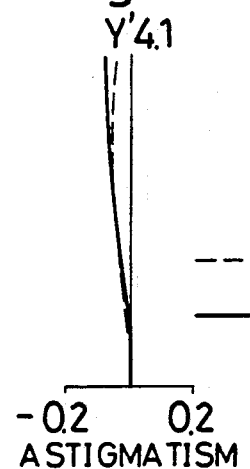
Figure 38C:
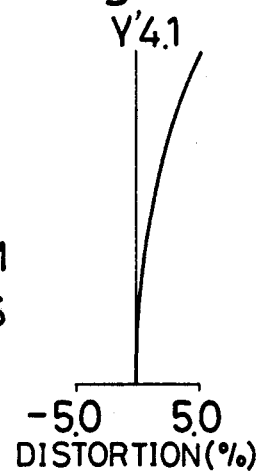
Figure 38D:
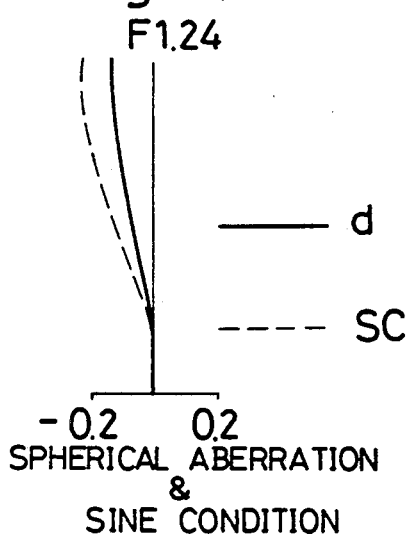
FIGS. 38d to 38f represent the aberration curves of the sixteenth embodiment for a medium focal length.
Figure 38E:
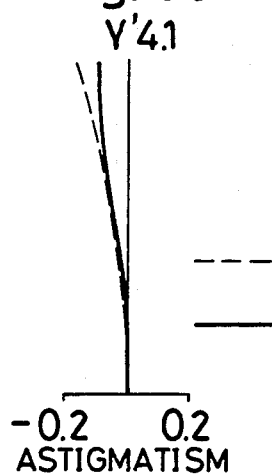
Figure 38F:
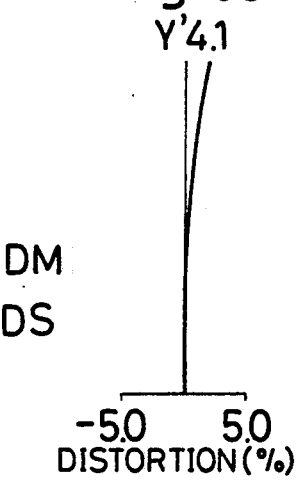
Figure 38G:
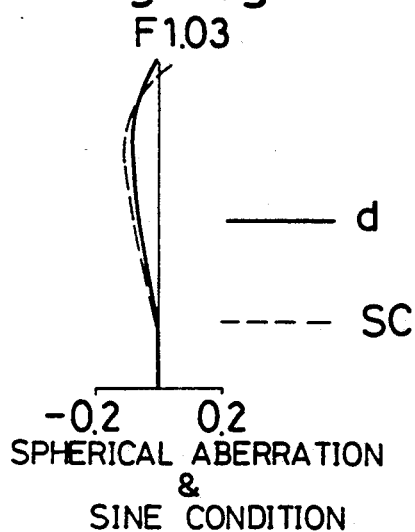
FIGS. 38g to 38i represent the aberration curves of the sixteenth embodiment for the longest focal length.
Figure 38H:
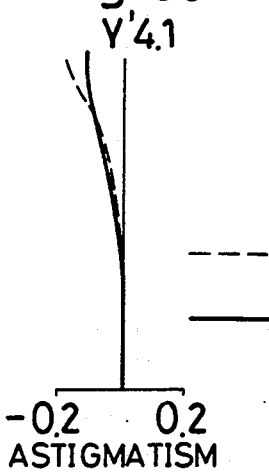
Figure 38I:
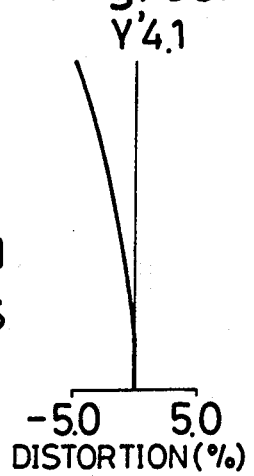
Figure 39A:
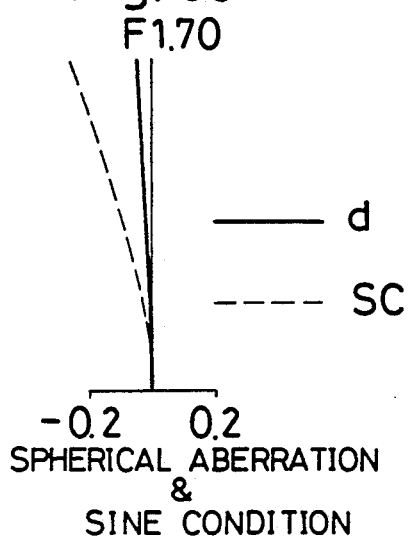
FIGS. 39a to 39c represent the aberration curves of the seventeenth embodiment for the shortest focal length.
Figure 39B:
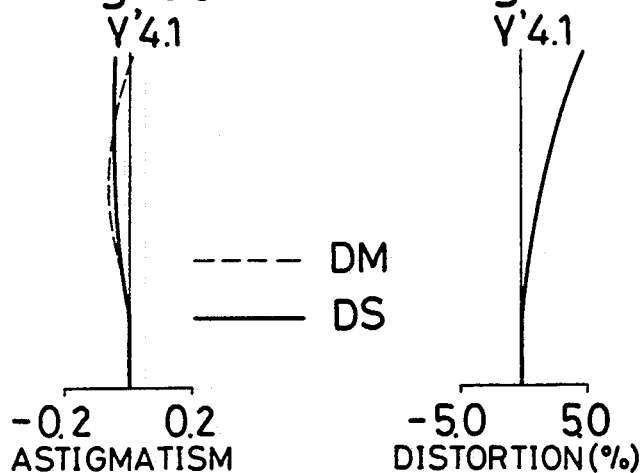
Figure 39C:
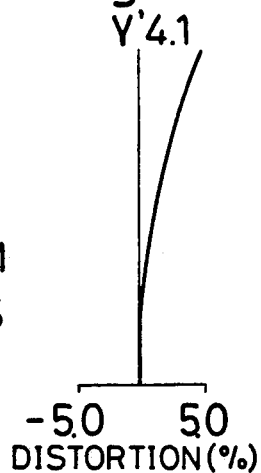
Figure 39D:
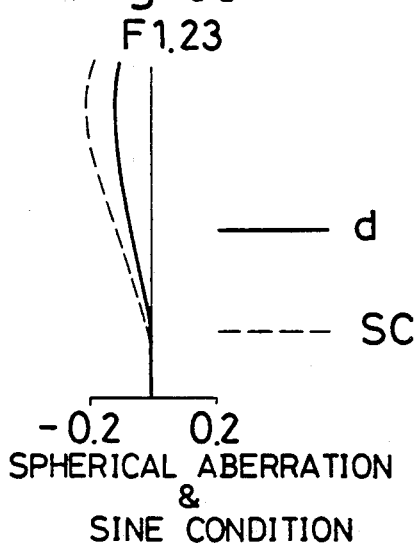
FIGS. 39d to 39f represent the aberration curves of the seventeenth embodiment for a medium focal length.
Figure 39E:
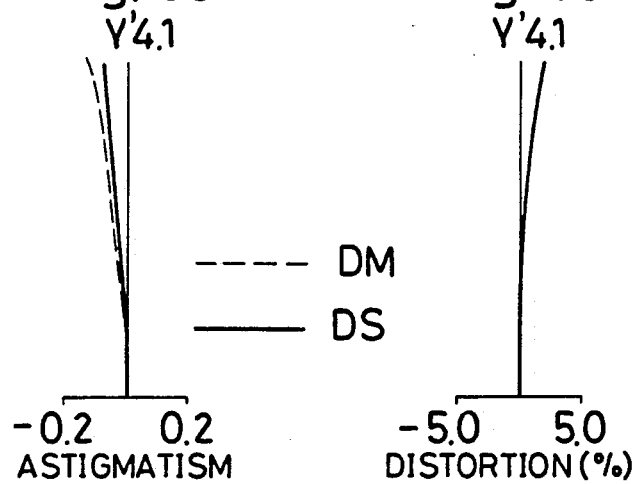
Figure 39F:
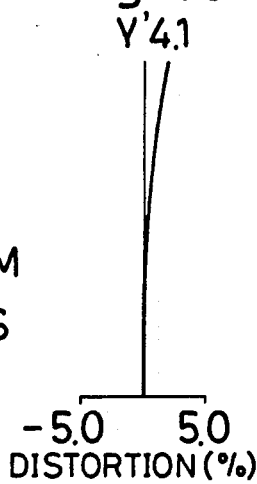
Figure 39G:
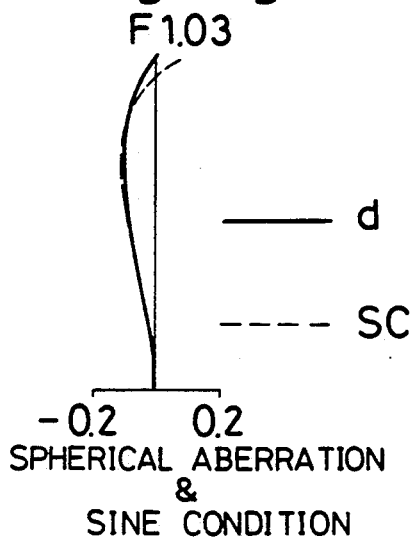
FIGS. 39g to 39i represent the aberration curves of the seventeenth embodiment for the longest focal length.
Figure 39H:
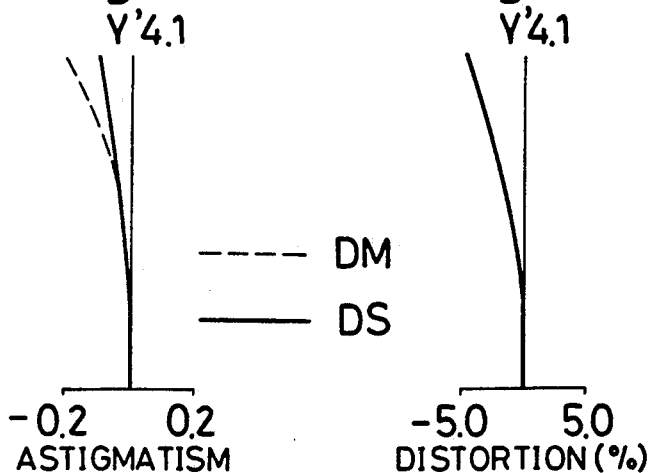
Figure 39I:
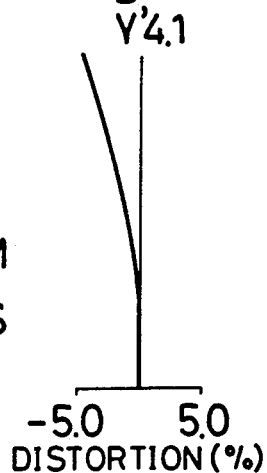
Figure 40A:
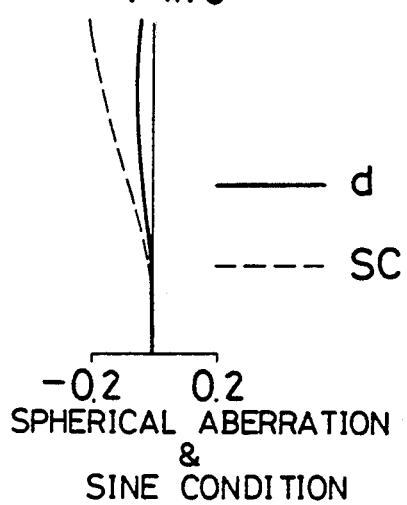
FIGS. 40a to 40c represent the aberration curves of the eighteenth embodiment for the shortest focal length.
Figure 40B:
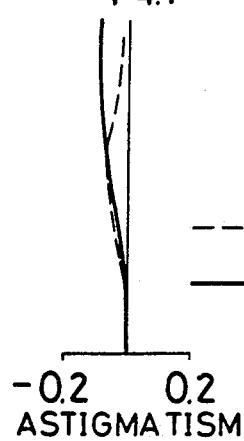
Figure 40C:
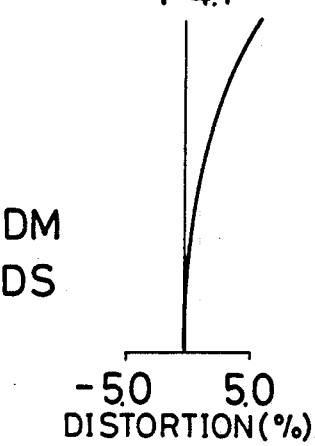
Figure 40D:
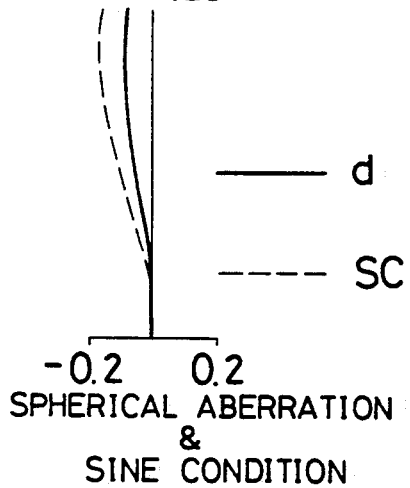
FIGS. 40d to 40f represent the aberration curves of the eighteenth embodiment for a medium focal length.
Figure 40E:
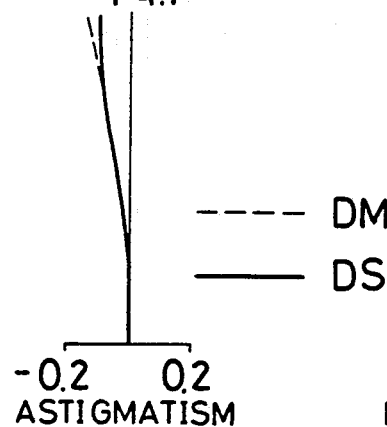
Figure 40F:
Figure 40G:
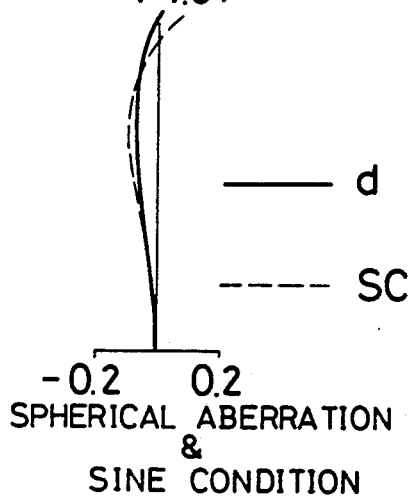
FIGS. 40g to 40i represent the aberration curves of the eighteenth embodiment for the longest focal length.
Figure 40H:
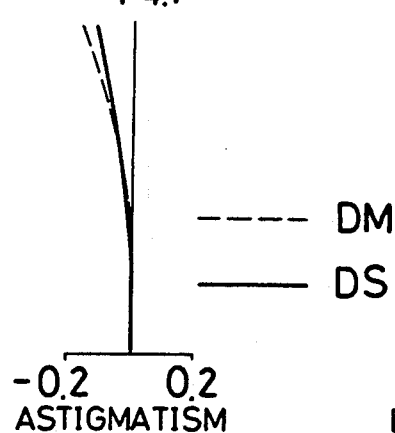
Figure 40I:
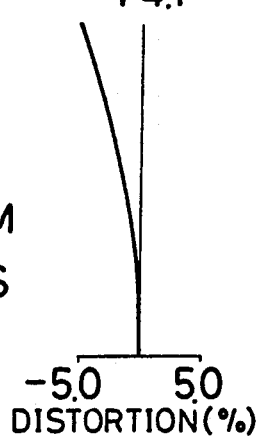
Figure 41A:
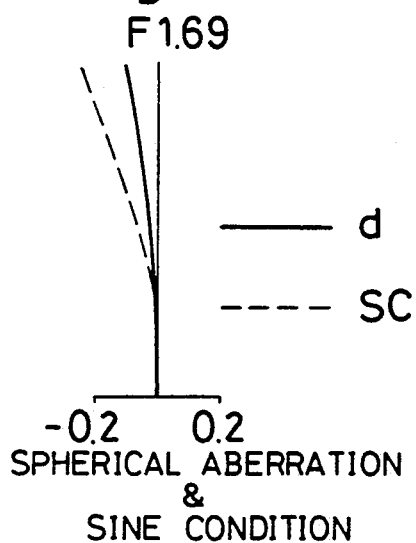
FIGS. 41a to 41c represent the aberration curves of the nineteenth embodiment for the shortest focal length.
Figure 41B:
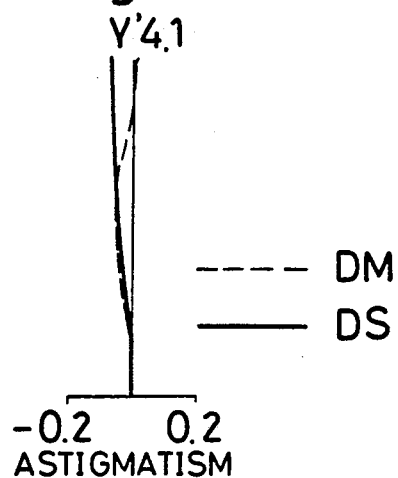
Figure 41C:
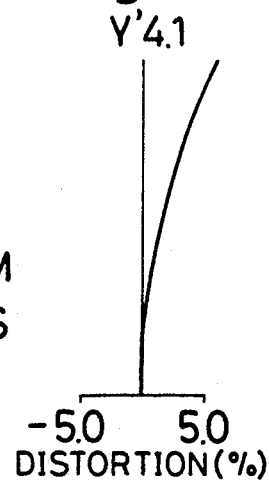
Figure 41D:
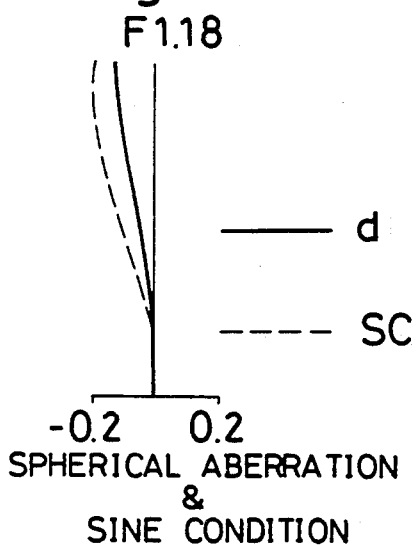
FIGS. 41d to 41f represent the aberration curves of the nineteenth embodiment for a medium focal length.
Figure 41E:
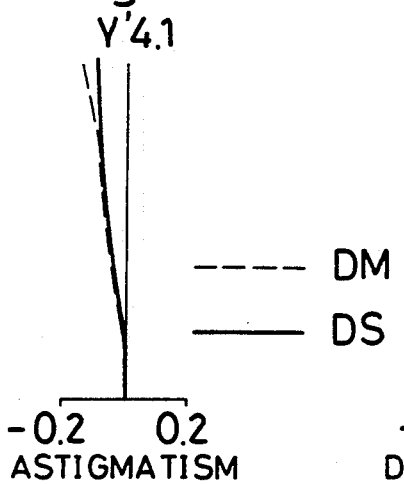
Figure 41F:
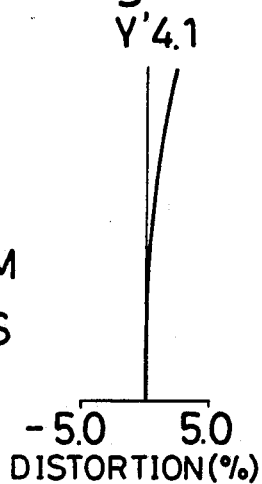
Figure 41G:
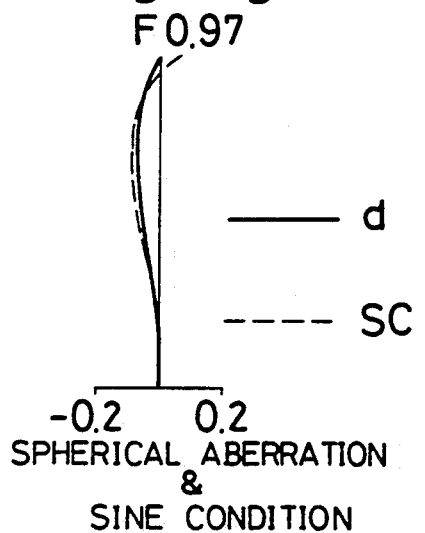
FIGS. 41g to 41i represent the aberration curves of the nineteenth embodiment for the longest focal length.
Figure 41H:
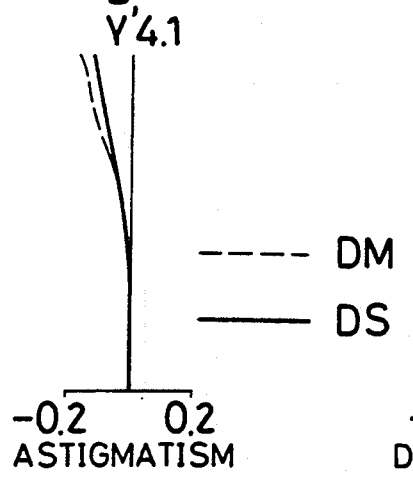
Figure 41I:
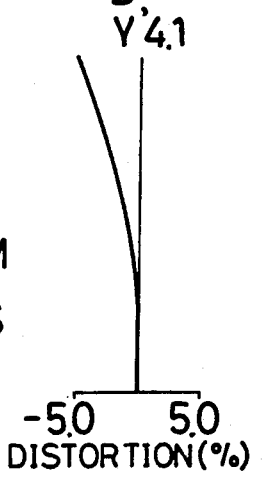
Figure 45:
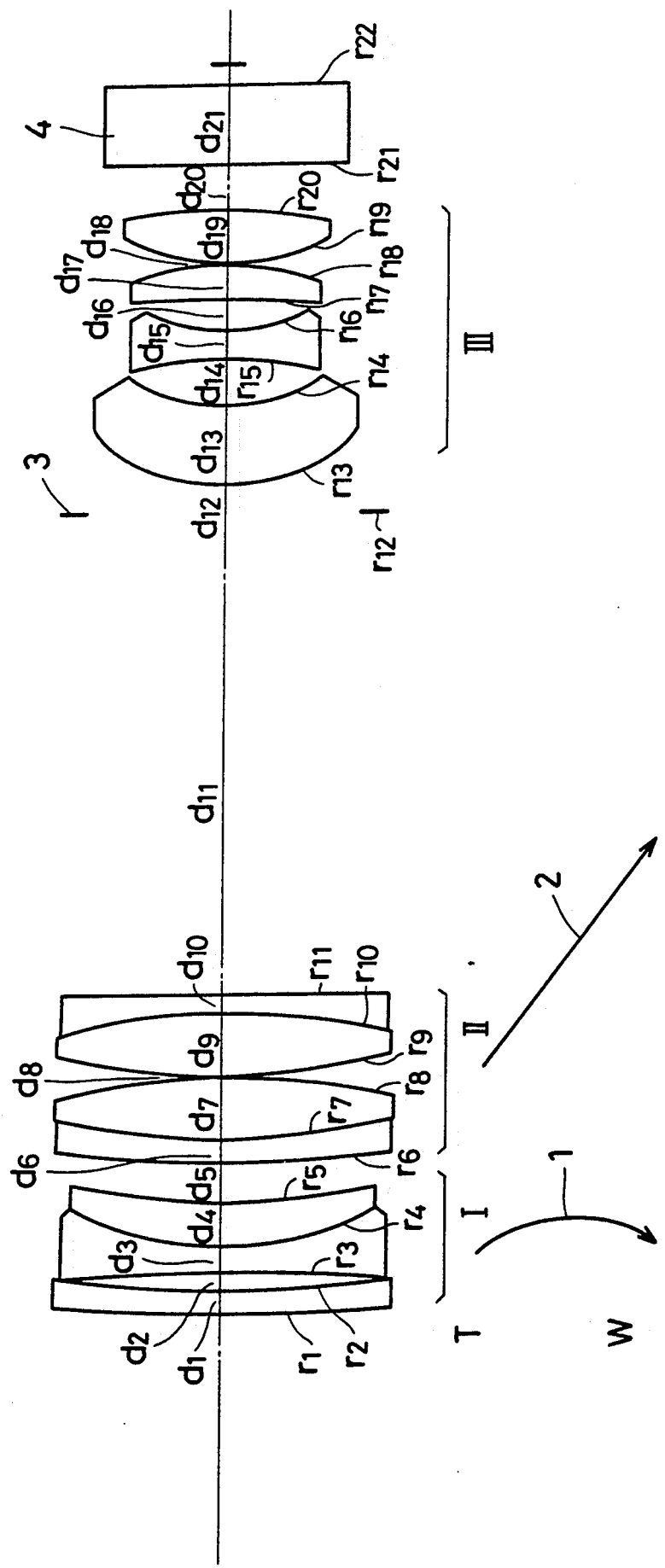
FIG. 45 represents a cross sectional view of the lens system according to a twenty-third embodiment of the present invention for the shortest focal length.
Figure 46:
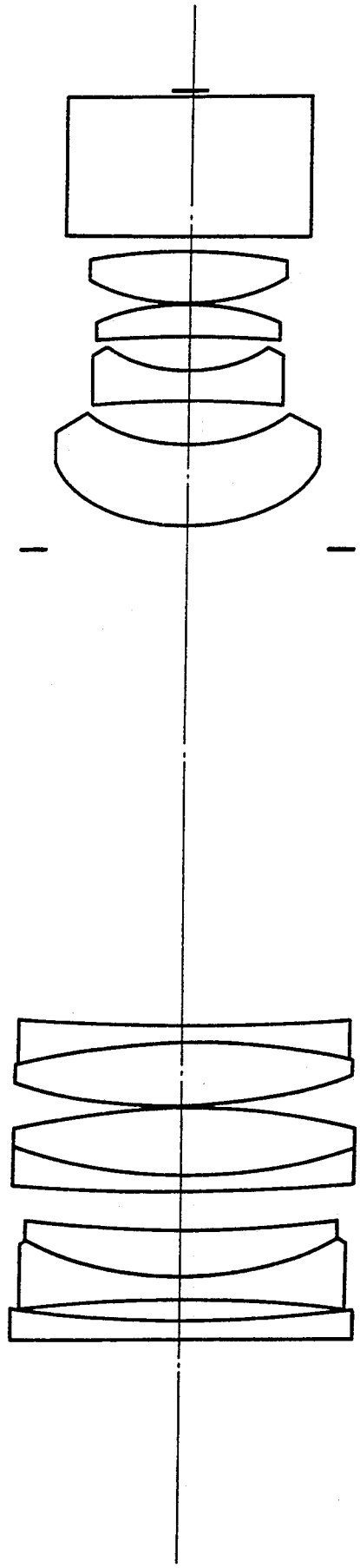
FIG. 46 represents a cross sectional view of the lens system according to a twenty-fourth embodiment of the present invention for the shortest focal length.
Figure 47:
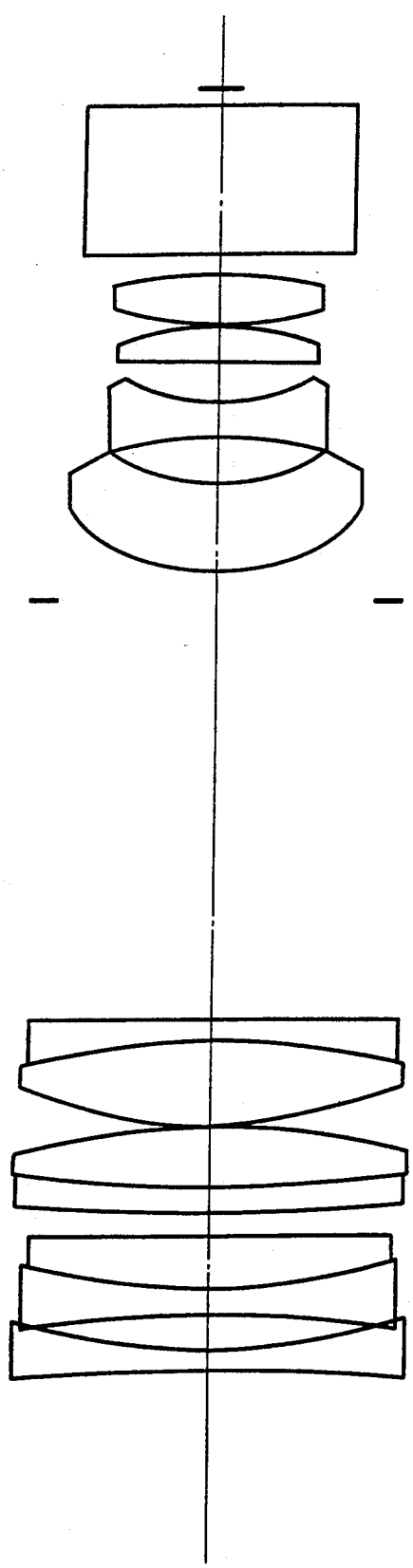
FIG. 47 represents a cross sectional view of the lens system according to a twenty-fifth embodiment of the present invention for the shortest focal length.
Figure 54A:
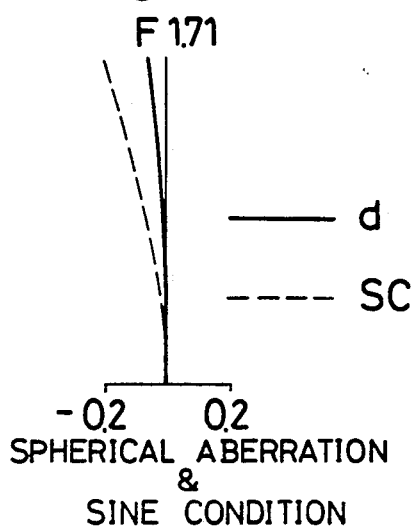
FIGS. 54a to 54c represent the aberration curves of the twenty-seventh embodiment for the shortest focal length.
Figure 54B:
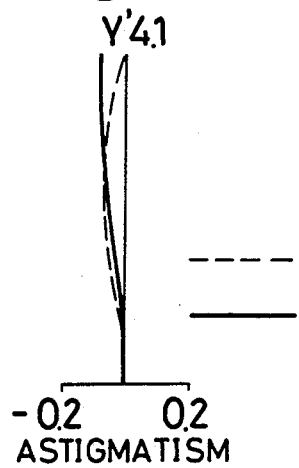
Figure 54C:
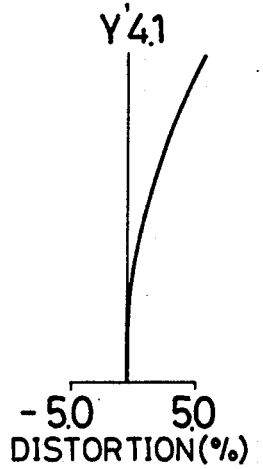
Figure 54D:
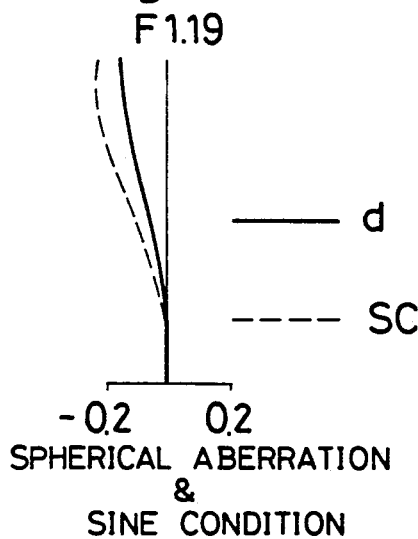
FIGS. 54d to 54f represent the aberration curves of the twenty-seventh embodiment for a medium focal length.
Figure 54E:
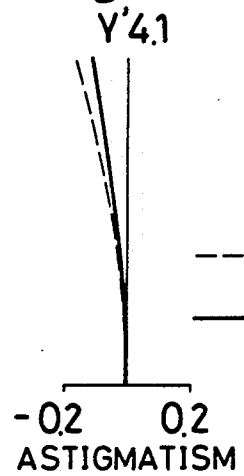
Figure 54F:
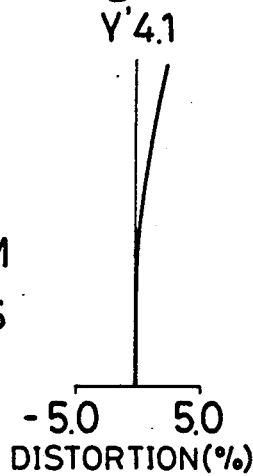
Figure 54G:
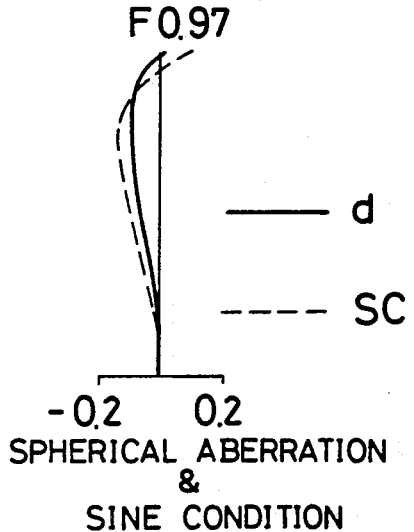
FIGS. 54g to 54i represent the aberration curves of the twenty-seventh embodiment for the longest focal length.
Figure 54H:
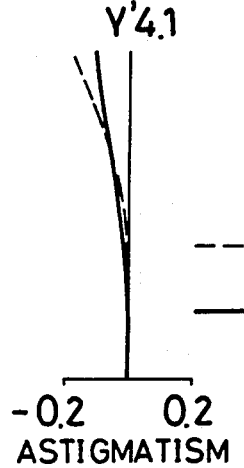
Figure 54I:
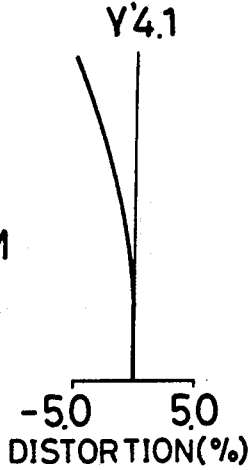

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with such compact camera as video camera and electronic still camera.

In the drawings, schematic cross sectional views disclose the position of the lens groups and lens elements for the shortest focal length with arrows below the lens groups representing the directions of their movements for zooming toward the longest focal length. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

For example, as shown in FIG. 1, a compact zoom lens system in accordance with the present invention consists of, from the object side to the image side, a first lens unit of a negative refractive power having a cemented lens component consisting of a negative lens element and a positive lens element cemented with each other, said first lens unit being shiftable along an optical axis of the lens system in a zooming operation, a second lens unit of a positive refractive power having two positive lens components, at least one of which consists of a positive lens element and a negative lens element cemented with each other, said second lens unit being shiftable along the optical axis of the lens system in the zooming operation, and a third lens unit of a positive refractive power having, from the object side, a front lens component of a negative refractive power and a rear lens component of a positive refractive power, said third lens unit being stationary along the optical axis of the lens system in the zooming operation.

Thus, the configuration of negative, positive and positive refractive powers can extremely reduce the weight of the front lens group (occupies about ½-⅔ of the total lens weight in the zoom lens system for video camera), which is the greatest defect of the zoom lens system wherein the positive refractive power precedes. This means that in securing the quantity of peripheral light, the diameter of the front lens group may be made small markedly to quickly reduce the incident angle of the peripheral light entering at a large angle of inclination by means of the negative refractive power of the first lens unit. A reduction in diameter gives large room in designing the camera main unit in addition to a large extent of reduction in weight. However, in reverse, defects of the zoom lens system wherein the negative refractive power precedes are that it is not suitable well for the case of a large zooming ratio and the amount of movement of the second lens unit increases a little in a zooming operation, but there is no problem at all if the zooming ratio is about three.

Then, a configuration wherein the first lens unit consists of a cemented negative lens component wherein a negative lens element and a positive lens element are cemented with each other, and the second lens unit consists of two positive lens components, at least one of which is a cemented positive lens component wherein a negative lens element and a positive lens element are cemented with each other, and the third lens unit consists of a front lens component having a negative lens element and a rear lens component having a positive lens element makes it possible to obtain a small-size, light-weight, low-price compact zoom lens system.

Also, by setting the refractive powers of the first lens unit and the second lens unit which are moving components in the zooming operation within a range meeting the following conditions, the above-described light-weight zoom lens system can be obtained.

$$0.48 < |\phi_I|/\phi_{II} < 0.85 \text{ (where, } \phi_I < 0) \quad \text{①}$$

$$0.20 < |\phi_I| f_w < 0.4 \quad \text{②}$$

wherein, $\phi_I$ and $\phi_{II}$ represent refractive powers of the first and the second lens units respectively, and $f_w$ represents a compound focal length of the whole system at the short focal length condition.

Condition ① shows a ratio of refractive powers of the first and second lens units, both of which are shiftable in the zooming operation. The shifting loci of the first and second lens units in the zooming operation, particular to the locus of the first lens unit therein, are changed depending on the ratio. If the upper limit of Condition ① is violated, the first lens unit is shifted, in the zooming operation to the longest focal length condition, to a position arranged at the object side of its position at the shortest focal length condition, resulting in the deterioration of amount of peripheral light at the longest focal length condition. Contrary, if the lower limit of Condition ① is violated, the first lens unit is shifted, in the zooming operation to the shortest focal length condition, to a position arranged at the object side of its position at the longest focal length condition, resulting the deterioration of amount of peripheral light at the shortest focal length condition. Thus, in both cases, it becomes necessary to increase the diameter of the first lens unit and that of the second lens unit for preventing the deterioration of the amount of peripheral light, resulting in the deviation from the object of compactness.

Next, Condition ② shows a proper range of the refractive power of the first lens unit. If the lower limit of Condition ② is violated, the amounts of movements of the both lens units increase in the zooming operation, and the diameter of the first lens unit becomes larger, resulting in the contrary to the compactness. In reverse, the upper limit of Condition ② is violated, it is advantageous for the compactness, but various aberrations increase and therefore an economical configuration cannot be achieved.

Here, the following conditions are more effective instead of Conditions ① and ②:

$$0.48 < |\phi_I|/\phi_{II} < 0.83 \qquad ①'$$

$$0.20 < |\phi_I|/f_w < 0.34 \qquad ②'$$

Giving such a refractive power and further meeting the following two conditions makes it possible to obtain a zoom lens system favorable in which various aberrations can be corrected well in peripheral area even if the first lens unit consists of only one cemented lens component wherein one negative lens element and one positive lens element are cemented.

$$-0.7 < R_{2R}/R_{1P} < 0.1 \qquad ③$$

$$\Delta\nu < 18 \qquad ④$$

wherein, R designates a radius of curvature, and the first affix thereof shows the lens No. as counted from the object side, and the second affix P shows the object side surface, and the affix R shows the image side surface. Also, $\Delta\nu$ is a difference in the Abbe number between the negative lens and the positive lens of the first component.

Condition ③ shows distribution of the refractive power to the both surfaces of the cemented lens component, and it is preferable for compensating aberration to give a larger refractive power to the image side surface $R_{2R}$. When the object side surface $R_{1P}$ also has a strong negative refractive power beyond the lower limit of Condition ③, generation of negative distortion and generation of coma aberration are large and these aberrations cannot be compensated completely by the second lens unit and after. In reverse, when the refractive power concentrates on the image side surface beyond the upper limit of Condition ③, generation of higher-order aberration is large, and particularly spherical aberration, coma aberration, field curvature and the like at the TELE end are deteriorated.

Condition ④ limits the difference in chromatic dispersion between the both lens elements in the first lens unit for enabling a sufficient chromatic abberation compensation only by the first lens unit, and when this condition is not met, variation in chromatic aberration due to the zooming operation is very large. This means that cemented surface having a very strong refractive power is required to make up an insufficient chromatic compensation or to meet the conditions for paraxial chromatic compensation, and thereby higher-order chromatic aberration can take place.

By meeting each condition as described above, a simple compact zoom lens system can be provided, and further by configuring the second lens unit with the following two positive lens elements, a zoom part which has a large aperture and a small variation in aberration is easy to be realized. This means that it is preferable that one is a cemented positive lens component wherein a negative lens element and a positive lens element are cemented and the other is a positive single lens element, and thereby the following conditions are met.

$$0.1 < F_P/F_N < 0.7 \qquad ⑤$$

$$\nu_N < 30 \qquad ⑥$$

wherein, $F_P$ represents a focal length of the single lens element; $F_N$ represents a focal length of the cemented lens component; and $\nu_N$ represents an Abbe number of the negative lens element in the cemented lens component of the second lens unit.

The height of passage of axial ray through the second lens unit is higher in the negative refractive power preceding type than in the positive refractive power preceding type, and therefore it is preferable to decompose into two positive refractive powers to nicely compensate the spherical aberration. Furthermore, to make chromatic aberration compensation only by the second lens unit, a cemented lens component having a negative lens element of high dispersion should be used for one element thereof. At this time, it is desirable to distribute a larger refractive power to the single lens element side out of the two positive lens components, and when a strong positive refractive power is given also to the cemented lens beyond the upper limit of Condition ⑤, for the convenience of chromatic compensation, the curvature of the cemented surface becomes very small, and a large higher-order aberration is generated. In reverse, when the refractive power is concentrated on the single lens side beyond the lower limit of Condition ⑤, a large negative spherical aberration is generated, and the aperture becomes difficult to be made larger.

Condition ⑥ shows that a sufficiently high dispersion glass must be used for the negative lens to make a satisfactory chromatic compensation singly by the second component, and when this condition is not met, the curvature of the cemented surface has to be made stronger than needed, resulting in a generation of higher-order chromatic aberration.

According to the above-described, particularly the specific configuration of the zoom part composed of the first lens unit and the second lens unit is fixed, and thereby a zoom lens part which is compact and small in variation in aberration in the zooming operation is obtained, and by further configurating the third lens unit as follows as a relay system following this, a large-aperture compact zoom lens system canbe easily realized.

This means that the third lens unit is configured with the front lens component which consists of a positive meniscus lens element and a negative lens element in the sequence from the object side and has a negative refractive power as a whole, and the rear lens component which consists of one or two positive lens elements and has a positive refractive power as a whole, and the following conditions are made to be met.

$$0.1 < |\phi_A|f_w < 0.7 \text{ (where, } \phi_A < 0) \qquad ⑦$$

$$0.6 < r_A/f_w < 1.3 \qquad ⑧$$

wherein, $\phi_A$ represents a composite refractive power of the front lens component of the third lens unit, and $r_A$ is a radius of curvature of the lens surface nearest to the object side in the third lens unit.

Light flux projected from the zoom part as described above is convergent light, and therefore a sufficient back focal length cannot be secured unless the third lens unit is configured by an inverted telephoto type. Also, in reverse, even when a large aperture is applied, it is desirable that the most objective side surface of the third lens unit is made convex to the object side to nicely compensate the spherical aberration. The front lens component is configured with a positive meniscus lens element and a lens element having a strong negative refractive power, and is given a negative refractive power as a whole, and thereby such advantages are enjoyable that not only a nice compensation of spherical aberration and a sufficient back focal length are obtained, but also the Petzval sum likely to shift to a positive direction can be reduced. When the composite refractive power is weakened beyond the lower limit of Condition ⑦, the shortage of back focal length becomes a problem, and in reverse, when increasing beyond the upper limit, the spherical aberration is considerably deteriorated and a larger aperture becomes difficult to be applied.

Also, when $r_A/f_w$ decreases beyond the lower limit of Condition ⑧, the spherical aberration can be easily compensated, but the back focal length becomes insufficient. In reverse, when increasing beyond the upper limit, the spherical aberration and the coma aberration in the peripheral light are deteriorated.

Also, in a configuration in FIGS. 21 to 25, by setting the ratio of the refractive powers of the first lens unit and the second lens unit being moving components within a range meeting the following condition, the above-described light-weight compact zoom lens system is obtainable.

$$0.6 < |\phi_I|/\phi_{II} < 0.8 \text{ (where, } \phi_I < 0) \qquad ⑨$$

wherein, $\phi_I$ and $\phi_{II}$ represent refractive powers of the first and the second lens units respectively.

Condition ⑨ shows a ratio of refractive powers of the first and second lens units, both of which are shiftable in the zooming operation. The shifting loci of the first and second lens units in the zooming operation, particular to the locus of the first lens unit therein, are changed depending on the ratio. If the upper limit of Condition ⑨ is violated, the first lens unit is shifted, in the zooming operation to the longest focal length condition, to a position arranged at the object side of its position at the shortest focal length condition, resulting the deterioration of amount of peripheral light at the longest focal length condition. Contrary, if the lower limit of Condition ⑨ is violated, the first lens unit is shifted, in the zooming operation to the shortest focal length condition, to a position arranged at the object side of its position at the longest focal length condition, resulting in the deterioration of amount of peripheral light at the shortest focal length condition. Thus, in both cases, it becomes necessary to increase the diameter of the first lens unit and that of the second lens unit for preventing the deterioration of the amount of peripheral light, resulting in the deviation from the object of compactness. And further the larger the diameter becomes, the more the harmful light causing great aberration increases, and the performance is deteriorated.

Furthermore, description is made on a little more specific configuration. The first lens unit consists of a cemented negative lens component wherein a negative lens element and a positive lens element are cemented with each other, and the second lens unit consists of two positive lens components, at least one of which is a cemented positive lens component wherein a negative lens element and a positive lens element are cemented with each other, and the third lens unit consists of a front lens component which consists of a positive meniscus lens element and a negative lens element in the sequence from the object side and has a negative refractive power as a whole and a rear lens component having a positive refractive power, and the following conditions are met.

$$0.1 < \phi_I^P/\phi_I < 0.45 \qquad ⑩$$

$$-0.3 < \phi_{II}^P/\phi_{II} < 0.3 \qquad ⑪$$

$$0.25 < |\phi_A|f_w < 0.6 \text{ (where, } \phi_A < 0) \qquad ⑫$$

$$0.6 < D/f_w < 1.2 \qquad ⑬$$

wherein, $\phi_I^P$ and $\phi_{II}^P$ represent refractive powers of the surfaces nearest to the object side of the first lens unit and the second lens unit respectively; $f_w$ represents a compound focal length of the whole lens system at a shortest focal length condition; $\phi_A$ represents a composite refractive power of the front lens component of the third lens unit; and D represents an axis distance from the object side surface of the meniscus lens to the image side surface of the negative lens in the front lens component in the third lens unit.

The amount of variation in aberration in the zooming operation is determined by the configuration of the first lens unit and the second lens unit. To obtain a high performance, each component must be chromatically compensated satisfactorily on a component basis. In the negative refractive power preceding type, the height of axial ray through the second lens unit becomes higher in comparison with the positive refractive power preceding type, and therefore the configuration of the second lens unit becomes an important factor for compensating the spherical aberration. In order to obtain a high performance by a simple configuration, first the chromatic aberration must be nicely compensated by adopting the above-described forms of the first component and the second component, and then the conditions ⑩ and ⑪ must be met to nicely compensate the spherical aberration and the off-axis aberration.

First, Condition ⑩ shows the proportion of distribution of the negative refractive power of the cemented lens component of the first lens unit to the object side, and when the refractive power is concentrated on the image side beyond the lower limit of Condition ⑩, the higher-order aberration is generated greatly at the image surface, and the performance is deteriorated remarkably in a large-aperture lens system. In reverse, when a strong negative refractive power is given also to the object side surface beyond the upper limit of Condition ⑩, a negative distortion or a coma aberration is generated, and the off-axis performance is deteriorated.

Next, Condition ⑪ similarly shows the proportion of the refractive power to be given to the object side surface of the object side component among the two positive lens components of the second lens unit, and divergent light flux impinges on the second lens unit, and this flux is made into convergent light by the two positive lens components, and therefore it is advantageous to configurate the two positive lens components in a manner that both strong positive refractive surfaces face each other for compensating the spherical aberration, and it is preferable that the opposite surfaces have a weak positive refractive power or a weak negative refractive power, respectively. At that time, the object side surface of the positive lens component of the object side should be set within the range as shown by this Condition ⑪. When setting is made outside this range, the spherical aberration generated in the second lens unit is deteriorated, and particularly the field curvature at the TELE end gets out of shape greatly.

Next, as to the configuration of the third lens unit, the third lens unit has to produce a shape image from the convergent light flux after projection from the second lens unit, and on the other hand, a sufficient back focal length has to be obtained. In order to secure the suitable back focal length while well compensating the spherical aberration with a large aperture, it is preferable that the third lens unit employs the so-called inverted telephoto type consisting of the front component which starts with a convex surface on the object side and has a negative refractive power as a whole and the rear component having a positive refractive power. The back focal length can be controlled by the magnitude of the negative refractive power of this front component, but in reverse, each aberration including the spherical aberration becomes difficult to be compensated by that amount. When the negative refractive power of the front component is weakened beyond the lower limit of Condition ⑫, a sufficient back focal length is not obtained, and in reverse, when exceeding the upper limit thereof, the aberration is generated in excess of an allowable amount in the large-aperture lens system.

Furthermore, in the negative lens element of the front lens unit, by disposing a strong refractive power on its image side surface, the Petzval sum likely to shift to a positive direction can be compensated to become satisfactorily small. In the large-aperture lens system, it is important to make the Petzval sum as small as possible to well compensate the field curvature in off-axial area. The condition ⑬ shows the position in the front lens component of the third lens unit where this strong negative refractive surface is disposed, and when it is disposed on the object side beyond the lower limit of Condition ⑬, the Petzval sum cannot be made small sufficiently, and in reverse, when it is disposed on the image side beyond the upper limit thereof, the back focal length cannot be secured or the curvature becomes excessively large and higher-order aberration is generated, and the performance falls into disorder.

Further desirably, the rear lens component of the third lens unit is configured with a positive lens element whose strong refractive surface faces the image side and a bi-convex lens element and the following conditions are made to be met, and thereby a good performance is obtainable even if a compact zoom lens system has a large aperture of about F=1.2.

$$N_B > 1.67 \qquad \text{⑭}$$

$$0.4 < f_{B2}/f_{B1} < 0.85 \qquad \text{⑮}$$

wherein, $N_B$ represents an average of refractive indices of materials of two lens elements of the rear lens component of the third lens unit; and $f_{B1}$ and $f_{B2}$ represent focal lengths of the both lens elements, respectively.

Because of a large aperture, the refractive indices of the both positive lens elements are preferably high as shown by Condition ⑭ to suppress an increase in Petzval sum and generation of higher-order aberration. Also, securing the suitable back focus length becomes easier by giving a strong refractive power to the image side lens element of the both lens elements. Condition ⑮ shows the distribution thereof, and when the refractive power concentrates on the image side lens element in excess of the lower limit of Condition ⑮, the spherical aberration and negative distortion are likely to be generated, and in reverse, when the refractive power is distributed sufficiently also to the object side lens element in excess of the upper limit thereof, the suitable back focal length becomes difficult to be taken.

By meeting the above-described conditions ⑨–⑮, a compact zoom lens system is obtainable which has high performance despite that it has a extremely lightweight, compact and simple configuration in comparison with the conventional ones, and has a large aperture of about F=1.2 to F=1.1.

In addition, when inserting an optical finder or a beam splitter for focus detection, it is preferably disposed in the rear part of the second lens unit.

Also, in a configuration in FIGS. 31 to 37, to meet the requirements of further cost reduction and compactness by guiding luminous flux of about 1.0 in F number to the third lens unit while well suppressing the generation of various aberrations, the first lens unit and the second lens unit which are variable power parts are configurated as follows.

This means that the first lens unit is configurated with two negative lens components, one of which is a cemented lens component wherein a positive lens element and a negative lens element are cemented with each other, and the second lens unit is configurated with two positive lens components, one of which is a cemented lens component wherein a negative lens element and a positive lens element are cemented with each other. By such a configuration, a satisfactory chromatic compensation can be made in each lens unit, and various aberrations can also be compensated, but a satisfactory compactness is difficult to be achieved unless the following conditions on the refractive powers of the both lens units are met.

$$0.6 < |\phi_I|/\phi_{II} < 0.85 \text{ (where, } \phi_I < 0) \qquad \text{⑯}$$

$$0.2 < |\phi_I| f_w < 0.4 \qquad \text{⑰}$$

wherein, $\phi_I$ and $\phi_{II}$ represent refractive powers of the first lens unit and the second lens unit respectively; and $f_w$ represents a compound focal length of the whole lens system at a shortest focal length condition.

Condition ⑯ shows a ratio of refractive powers of the first and second lens units, both of which are shiftable in the zooming operation. The shifting loci of the first and second lens units in the zooming operation, particular to the locus of the first lens unit therein, are changed depending on the ratio. If the upper limit of Condition ⑯ is violated, the first lens unit is shifted, in the zooming operation to the longest focal length condition, to a position arranged at the object side of its position at the shortest focal length condition, resulting the deterioration of amount of peripheral light at the longest focal length condition. Contrary, if the lower limit of Condition ⑯ is violated, the first lens unit is shifted, in the zooming operation to the shortest focal length condition, to a position arranged at the object side of its position at the longest focal length condition, resulting in the deterioration of amount of peripheral light at the shortest focal length condition. Thus, in both cases, it becomes necessary to increase the diameter of the first lens unit and that of the second lens unit for preventing the deterioration of the amount of peripheral light, resulting in the deviation from the object of compactness.

Next, Condition ⑰ shows a proper range of the refractive power of the first lens unit. If the lower limit of Condition ⑰ is violated, the amounts of movements of the both lens units increase in the zooming operation, and the diameter of the first lens unit becomes larger, resulting in the contrary to the compactness. In reverse, the upper limit of Condition ⑰ is violated, it is advantageous for the compactness, but various aberrations increases and therefore an economical configuration cannot be achieved.

In order to further satisfactorily reduce variations in various aberrations, for the arrangement of the first lens unit, it is desirable to dispose a negative lens element whose strong refractive surface faces the image side and a cemented lens component in the sequence from the object side, and further it is desirable to meet the following conditions in the first lens unit and the second lens unit.

$$(N_{1P}+N_{2N})/2 > 1.72 \qquad ⑱$$

$$0.5 < f_{2R}/f_{2P} < 1.1 \qquad ⑲$$

wherein, $N_{1P}$ and $N_{2N}$ represent refractive powers of the positive lens element in the cemented negative lens component in the first lens unit and the negative lens element in the cemented positive lens element in the second lens unit, respectively; $f_{2R}$ and $f_{2P}$ represent focal lengths of the two positive lens components located at the object side and at the image side in the second lens unit, respectively.

Each cemented lens component in the first lens unit and the second lens unit is an important element from the viewpoint of compensation of chromatic aberration and from the viewpoint of compensation of various aberrations, and particularly the positive lens element in the first lens unit and the negative lens element in the second lens unit play important roles, and the both lens elements are made of high chromatic dispersion glass, and make chromatic compensation and nicely suppress monochromic aberration, and therefore a configuration with high-refractive-index glass is required so as to meet Condition ⑱.

Furthermore, in the configuration in accordance with the present invention, the Petzval sum is likely to shift to a positive direction, and therefore to suppress this, it is desirable that the refractive power of the object side element in the second lens unit is not made larger in comparison with the refractive power of the image side element. Condition ⑲ shows a proper range thereof, and when the object side element has a strong refractive power beyond the upper limit thereof, the Petzval sum becomes large and the field curvature is produced greatly, and high performance cannot be assured up to the periphery in a large-aperture lens. In reverse, when the refractive power concentrates excessively on the image side element beyond the lower limit thereof, generation of the spherical aberration and coma aberration due to it increases, resulting in a deterioration of the performance.

By the above-described, particularly the specific configuration of the zoom part of the first and the second lens units is fixed, and a zoom part compact and small in variation in aberration is obtained, and further as a relay system following this, the third lens unit is configured as follows, and thereby a large-aperture compact zoom lens system can be easily realized.

This means that the third lens unit is configured with a front lens component which consists of a positive meniscus lens element and a negative lens element in the sequence from the object side and has a negative refractive power as a whole and a rear lens component which consists of one or two positive lens elements and has a positive refractive power as a whole, and the following condition is made to be met.

$$0.2 < |\phi_A|f_w < 0.8 \text{ (where, } \phi_A < 0) \qquad ⑳$$

where, $\phi_A$ is a composite refractive power of the front lens component of the third lens unit.

Light flux projected from the above-described zoom part is convergent light, and therefore a sufficient back focal length cannot be secured unless the third lens unit is configured by the inverted telephoto type. Also, in reverse, even in the case with a large aperture, it is desirable that the object side surface of the third lens unit is a convex surface to well compensate the sperical aberration.

The front lens component is configured with a positive meniscus lens element and a lens element having a strong negative refractive power, and is given a negative refractive power as a whole, and thereby not only preferable spherical aberration and a sufficient back focal length are obtainable, but also an advantage is given that the Petzval sum liable to shift greatly to a positive direction can be made small. When the power falls beyond the lower limit of Condition ⑳, the shortage of back focal length becomes a problem, and in reverse, when increasing beyond the upper limit thereof, deterioration of the spherical aberration progresses remarkably, and the adoption of a larger aperture becomes difficult.

Furthermore, it is desirable that the third lens unit is configured with two positive lens elements, and the following two conditions are met.

$$0.8 < r_A/f_w < 1.5 \qquad ㉑$$

$$0.35 < f_{BR}/f_{BP} < 0.85 \qquad ㉒$$

wherein, $r_A$ represents a radius of curvature of the lens surface nearest to the object side in the front lens component of the third lens unit; $f_{BP}$ and $f_{BR}$ represent focal lengths of the two positive lens elements in the rear lens component of the third lens unit located at the object side and at the image side respectively.

The radius of curvature of the surface nearest to the object side in the front lens component in the third lens unit is a very important factor for compensating the spherical aberration and securing the back focal length, and when it is strengthened beyond the lower limit of Condition ㉑, the back focal length is likely to be insufficient, and in reverse, when weakened beyond the upper limit thereof, the spherical aberration and the coma aberration are likely to be generated greatly, and the high performance is difficult to be assured.

Also, the two positive lens elements of the rear lens component particularly play a role of nicely compensating the off-axis aberration, but the back focal length is likely to be insufficient unless the refractive power of the object side lens element is made weaker than that of the image side lens element to the extent not exceeding the upper limit of Condition ㉒. In reverse, when the refractive power concentrates excessively on the image side lens element in excess of the lower limit thereof, generation of distortion and astigmatism becomes excessively large.

By configurating as described above on the conditions ⑯ - ㉒ , a large-aperture-ratio compact zoom lens system attaining a zooming ratio of about three and a F number of as small as 1.0 with a configuration of only 8 components and 10 lens elements can be realized at a low cost.

Also, in a configuration is FIGS. 45 to 49, in order to guide light flux of about 1.0 in F number to the third lens unit while nicely suppressing generation of various aberrations, and further meet the requirements of low cost and compactness, the first lens unit and the second lens unit which are variable power parts are configurated as folows.

This means that the first lens unit is configurated with two negative lens components, one of which is a cemented lens component wherein a positive lens element and a negative lens element are cemented with each other, and the second lens unit is configurated with two positive lens components, each of which is a cemented lens component of a negative lens element and a positive lens element. By this configuration, a satisfactory chromatic compensation can be made and various aberrations can be well compensated in each lens unit, and particularly, by configuring the second lens unit with two cemented lens components, deterioration of the performance due to the chromatic aberration can be alleviated despite a large aperture ratio.

In addition, particularly, to satisfactorily maintain the compactness and suppress generation of higher-order aberration in the whole zooming region, the following conditions are required to be met.

$$0.63 < |\phi_I|/\phi_{II} < 0.83 \text{ (where, } \phi_I < 0) \quad ㉓$$

$$0.22 < |\phi_I|f_w < 0.37 \quad ㉔$$

wherein, $\phi_I$ and $\phi_{II}$ represent refractive powers of the first lens unit and the second lens unit respectively; $f_w$ represents a compound focal length of the whole lens system at a shortest focal length condition.

Condition ㉓ shows a ratio of refractive powers of the first and second lens units, both of which are shiftable in the zooming operation. The shifting loci of the first and second lens units in the zooming operation, particular to the locus of the first lens unit therein, are changed depending on the ratio. If the upper limit of Condition ㉓ is violated, the first lens unit is shifted, in the zooming operation to the longest focal length condition, to a position arranged at the object side of its position at the shortest focal length condition, resulting in the deterioration of the amount of peripheral light at the longest focal length condition. Contrary, if the lower limit of Condition ㉓ is violated, the first lens unit is shifted, in the zooming operation to the shortest focal length condition, to a position arranged at the object side of its position at the longest focal length condition, resulting the deterioration of amount of peripheral light at the shortest focal length condition. Thus, in both cases, it becomes necessary to increase the diameter of the first lens unit and that of the second lens unit for preventing the deterioration of the amount of peripheral light, resulting in the deviation from the object of compactness.

Next, Condition ㉔ shows a proper range of the refractive power of the first lens unit, and when it is weakened beyond this lower limit of Condition ㉔ , the amounts of movements of the both lens units in the zooming operation increase, and the diameter of the first lens unit is required to be made larger contrary to the compactness. In reverse, when it is stregthened beyond the upper limit thereof, it is advantageous for the compactness, but the amount of generation of higher-order aberration increases, and the performance cannot be assured in a large-aperture-ratio lens of as small as 1.0 in F number.

Furthermore, to satisfactorily reduce variations in various aberrations, the following two conditions must be met about the two cemented lenses in the second component.

$$0.7 < f_{2P}/f_{2R} < 1.1 \quad ㉕$$

$$\bar{v}_{2P} - \bar{v}_{2N} > 22 \quad ㉖$$

wherein, $f_{2P}$ and $f_{2R}$ represent focal lengths of the two positive lens elements of the second lens unit located at the object side and at the image side respectively; and $\bar{v}_{2P}$ and $\bar{v}_{2N}$ represent averages of Abbe numbers of two positive lens elements and two negative lens elements in the second lens unit.

Condition ㉕ shows a distribution of the refractive powers of the both cemented lens components, showing that it is preferable to set the refractive power of the object side lens a little stronger. However, when the power concentrates on the object side lens element beyond the lower limit of Condition ㉕ , the Petzval sum changes for the worse, and higher-order spherical aberration and coma aberration are generated, and in reverse, when the distribution of the image side lens element becomes larger beyond the upper limit thereof, the field curvature changes to the worse.

Also, Condition ㉖ shows that the second lens unit wherein the height of passage of light rays is high is important for compensating the chromatic aberration, and it is necessary to make a sufficient chromatic aberration compensation using low chromatic dispersion glass for the positive lens element and high chromatic dispersion glass for the negative lens element, and in the case where the chromatic compensation is made by a combination of glass materials whose Abbe numbers are lower than this limit, particularly at the WIDE end, generation of higher-order aberration cannot be suppressed, resulting in a reduction in contrast.

By the above-described configuration, particularly the specific configuration of the zoom part of the first and the second lens units is fixed, and a zoom part which is compact and small in variation in aberration is obtained, and further as a relay system following this part, the third lens unit is configurated as follows, and thereby a large-aperture compact zoom lens system can be easily realized.

This means that the third lens unit is configurated with two components of a front lens component which consists of a positive meniscus lens element and a negative lens element in the sequence from the object side and has a negative refractive power as a whole and a rear lens component which consists of one or two positive lens elements and has a positive refractive power as a whole, and the following condition is met.

$$0.3 < |\phi_A|f_w < 0.8 \text{ (where, } \phi_A < 0) \quad ㉗$$

where, $\phi_A$ is a composite refractive power of the front lens component of the third lens unit.

Since the light flux projected from the above-described zoom part is convergent light, a sufficient back focal length cannot be secured unless the third lens unit is configured by the inverted telephoto type. Also, in reverse, to nicely compensate the spherical aberration even in the case with a large aperture, the object side of the third lens unit is desirably a convex surface. By configuring the front lens component with a positive meniscus lens element and a lens element having a strong negative refractive power and giving it a negative power as a whole, not only a preferable spherical aberration and a sufficient back focal length are obtained, but also an advantage is given that the Petzval sum likely to shift greatly to a positive direction can be made small. When the power is weakened beyond the lower limit of Condition ㉗, the shortage of the back focal length becomes a problem, and in reverse, when strengthened beyond the upper limit thereof, the spherical aberration is deteriorated remarkably, and a larger aperture becomes difficult to be applied.

Furthermore, when the rear lens component of the third lens unit is configured with two positive lens components, and the following two conditions are met, a good performance can be realized.

$$0.4 < f_{BR}/f_{BP} < 0.85 \qquad ㉘$$

$$-0.2 < R_{10R}/R_{10P} < 0.3 \text{ (where, } R_{10R} < 0) \qquad ㉙$$

wherein, $f_{BP}$ and $f_{BR}$ represent focal lengths of the two positive lens elements in the rear component of the third lens unit located at the object side and at the image side respectively; and $R_{10P}$ and $R_{10R}$ represent radii of curvature of the object side surface and that of image side surface in the positive lens element located at the object side.

The two positive lens components of the rear lens component of the third lens unit have a great effect particularly on compensation of the off-axis aberration, but the back focal length is likely to be insufficient unless the refractive power of the object side lens element is made weaker than that of the image side lens element to the extent not exceeding the upper limit of Condition ㉘. In reverse, when the refractive power concentrates on the image side lens element in excess of the lower limit thereof, the amount of generation of aberration at that lens greatly increases, and a good performance becomes difficult to be obtained.

Condition ㉙ shows a schematic shape of the object side lens element of the rear lens component of the third lens unit, and the object side surface is nearly a plane and has hardly a refractive power, and the strong refractive surface thereof faces the image side surface. A good field curvature is obtained by making this strong refractive surface face the image side. When a positive refractive power is given excessively also to the object side surface beyond the lower limit of Condition ㉙, the back focal length is hard to be secured, and the field curvature also changes to the worse. In reverse, when the positive refractive power concentrates excessively on the image side surface beyond the upper limit thereof, a large negative distortion is generated.

In accordance with the configuration as described above on the conditions ㉓ - ㉙, a very compact zoom lens system can be easily realized even if a large aperture ratio such that the zoom ratio is about three and the F number is 1.0 or less is applied despite a simple configuration of eight components and 11 lens elements.

Hereinafter, embodiments in accordance with the present invention are shown.

In the following tables, f equals a focal length, F represents an F number, $r_1, r_2, \ldots$ are radii of curvature with respective sub number indicating the surfaces from the object to image side along the optical axis, $d_1, d_2, \ldots$ represent the axial distance and includes both air spaces and the actual thickness of the lenses along the optical axis, $N_1, N_2, \ldots$ equal the refractive indexes of respective lenses and again, the sub number refer to the particular optical element from the object to image side, and $\nu_1, \nu_2, \ldots$ equal Abbe numbers of respective lenses sequentially counted from the object side.

FIGS. 1 to 10, FIGS. 21 to 25, FIGS. 31 to 37 and FIGS. 45 to 49 show schematic configurations at the TELE end in said embodiments 1 to 10, embodiments 11 to 15, embodiments 16 to 22 and embodiments 23 to 27 respectively, wherein the shiftings of the first lens unit I and the second lens unit II from the longest focal length condition (T) to the shortest focal length condition (W) are represented by the arrow lines 1, 2 respectively. There are provided a diaphragm 3 in the front of the third lens unit III, and also a plate equivalent to a lowpass filter or a face plate in the rear of the third lens unit III. Furthermore, the plates disposed between the second lens unit II and the third lens unit III in FIGS. 6 to 10 represent ones as beam splitters for focus detection.

In each aberration curve, the line d shows an aberration with respect to d-line, the dotted line SC shows a sine condition, the dotted line DM shows an astigmatism in a meridional image plane and the line DS shows an astigmatism in a sagital image plane.

TABLE 1

(Embodiment 1)
f = 10.2~24.4 F = 1.62~1.62~1.68

| Radius of Curvature | | Distance | Refractive Index | | Abbe Number | |
|---|---|---|---|---|---|---|
| $r_1$ | −81.533 | | | | | |
| | | $d_1$ | 1.300 | $N_1$ | 1.69100 | $\nu_1$ 54.8 |
| $r_2$ | 15.335 | | | | | |
| | | $d_2$ | 2.900 | $N_2$ | 1.80518 | $\nu_2$ 25.4 |
| $r_3$ | 32.059 | | | | | |
| | | $d_3$ | 2.800 | $N_3$ | 1.00000 | |
| $r_4$ | 268.960 | | | | | |
| | | $d_4$ | 2.700 | $N_4$ | 1.69100 | $\nu_4$ 54.8 |
| $r_5$ | −29.224 | | | | | |
| | | $d_5$ | 0.100 | $N_5$ | 1.00000 | |
| $r_6$ | 19.339 | | | | | |
| | | $d_6$ | 4.300 | $N_6$ | 1.69100 | $\nu_6$ 54.8 |
| $r_7$ | −35.812 | | | | | |
| | | $d_7$ | 1.200 | $N_7$ | 1.80518 | $\nu_7$ 25.4 |
| $r_8$ | 36.605 | | | | | |
| | | $d_8$ | 22.453 | $N_8$ | 1.00000 | |
| $r_9$ | ∞ | | | | | |
| | | $d_9$ | 1.300 | $N_9$ | 1.00000 | |
| $r_{10}$ | 8.536 | | | | | |
| | | $d_{10}$ | 2.100 | $N_{10}$ | 1.80500 | $\nu_{10}$ 41.0 |
| $r_{11}$ | 16.396 | | | | | |
| | | $d_{11}$ | 0.800 | $N_{11}$ | 1.00000 | |
| $r_{12}$ | −87.972 | | | | | |
| | | $d_{12}$ | 1.900 | $N_{12}$ | 1.75450 | $\nu_{12}$ 32.8 |
| $r_{13}$ | 7.867 | | | | | |
| | | $d_{13}$ | 2.100 | $N_{13}$ | 1.00000 | |
| $r_{14}$ | −23.490 | | | | | |
| | | $d_{14}$ | 1.500 | $N_{14}$ | 1.69350 | $\nu_{14}$ 53.4 |
| $r_{15}$ | −11.883 | | | | | |
| | | $d_{15}$ | 0.100 | $N_{15}$ | 1.00000 | |
| $r_{16}$ | 18.400 | | | | | |
| | | $d_{16}$ | 2.800 | $N_{16}$ | 1.72000 | $\nu_{16}$ 50.3 |
| $r_{17}$ | −26.163 | | | | | |
| | | $d_{17}$ | 1.500 | $N_{17}$ | 1.00000 | |
| $r_{18}$ | ∞ | | | | | |
| | | $d_{18}$ | 8.000 | $N_{18}$ | 1.45851 | $\nu_{18}$ 67.9 |

TABLE 1-continued (Embodiment 1)
$f = 10.2 \sim 24.4 \quad F = 1.62 \sim 1.62 \sim 1.68$

| $r_{19}$ | $\infty$ | | |
|---|---|---|---|

| Power Data | | Compound Focal Length | |
|---|---|---|---|
| $\phi_I$ | $-0.0263000$ | $f_{4-5}$ | 38.289 |
| $\phi_{II}$ | 0.0414000 | $f_{6-8}$ | 75.105 |
| $\phi_{III}$ | 0.0549743 | $f_{10-12}$ | $-29.682$ |

| Variable Distance | | |
|---|---|---|
| | $d_3$ | $d_8$ |
| TELE | 2.800 | 22.453 |
| MIDDLE | 15.132 | 7.473 |
| WIDE | 25.914 | 2.000 |

TABLE 2

(Embodiment 2)
$f = 11.2 \sim 32.3 \quad F = 1.62 \sim 1.62 \sim 2.28$

| Radius of Curvature | | Distance | | Refractive Index | | Abbe Number |
|---|---|---|---|---|---|---|
| $r_1$ | $-72.337$ | | | | | |
| | | $d_1$ | 1.300 | $N_1$ | 1.69100 | $\nu_1$ 54.8 |
| $r_2$ | 15.385 | | | | | |
| | | $d_2$ | 2.700 | $N_2$ | 1.80518 | $\nu_2$ 25.4 |
| $r_3$ | 32.644 | | | | | |
| | | $d_3$ | 2.800 | $N_3$ | 1.00000 | |
| $r_4$ | $-234.791$ | | | | | |
| | | $d_4$ | 2.500 | $N_4$ | 1.69100 | $\nu_4$ 54.8 |
| $r_5$ | $-26.387$ | | | | | |
| | | $d_5$ | 0.100 | $N_5$ | 1.00000 | |
| $r_6$ | 20.859 | | | | | |
| | | $d_6$ | 4.100 | $N_6$ | 1.69100 | $\nu_6$ 54.8 |
| $r_7$ | $-32.359$ | | | | | |
| | | $d_7$ | 1.200 | $N_7$ | 1.80518 | $\nu_7$ 25.4 |
| $r_8$ | 46.371 | | | | | |
| | | $d_8$ | 30.105 | $N_8$ | 1.00000 | |
| $r_9$ | $\infty$ | | | | | |
| | | $d_9$ | 1.300 | $N_9$ | 1.00000 | |
| $r_{10}$ | 8.315 | | | | | |
| | | $d_{10}$ | 2.500 | $N_{10}$ | 1.80500 | $\nu_{10}$ 41.0 |
| $r_{11}$ | 14.197 | | | | | |
| | | $d_{11}$ | 0.800 | $N_{11}$ | 1.00000 | |
| $r_{12}$ | 2907.230 | | | | | |
| | | $d_{12}$ | 2.100 | $N_{12}$ | 1.75450 | $\nu_{12}$ 32.8 |
| $r_{13}$ | 7.559 | | | | | |
| | | $d_{13}$ | 2.100 | $N_{13}$ | 1.00000 | |
| $r_{14}$ | $-25.475$ | | | | | |
| | | $d_{14}$ | 1.800 | $N_{14}$ | 1.69350 | $\nu_{14}$ 50.3 |
| $r_{15}$ | $-12.031$ | | | | | |
| | | $d_{15}$ | 0.100 | $N_{15}$ | 1.00000 | |
| $r_{16}$ | 21.195 | | | | | |
| | | $d_{16}$ | 2.000 | $N_{16}$ | 1.69350 | $\nu_{16}$ 50.3 |
| $r_{17}$ | $-86.500$ | | | | | |
| | | $d_{17}$ | 2.000 | $N_{17}$ | 1.00000 | |
| $r_{18}$ | $\infty$ | | | | | |
| | | $d_{18}$ | 8.000 | $N_{18}$ | 1.45851 | $\nu_{18}$ 67.9 |
| $r_{19}$ | $\infty$ | | | | | |

| Power Data | | Compound Focal Length | |
|---|---|---|---|
| $\phi_I$ | $-0.0270000$ | $f_{4-5}$ | 42.811 |
| $\phi_{II}$ | 0.0391000 | $f_{6-8}$ | 70.137 |
| $\phi_{III}$ | 0.0353044 | $f_{10-12}$ | $-34.520$ |

| Variable Distance | | |
|---|---|---|
| | $d_3$ | $d_8$ |
| TELE | 2.800 | 30.105 |
| MIDDLE | 18.713 | 6.931 |
| WIDE | 30.459 | 1.000 |

TABLE 3

(Embodiment 3)
$f = 9.2 \sim 17.8 \quad F = 1.63 \sim 1.63$

| Radius of Curvature | | Distance | | Refractive Index | | Abbe Number |
|---|---|---|---|---|---|---|
| $r_1$ | $-169.427$ | | | | | |

TABLE 3-continued (Embodiment 3)
$f = 9.2 \sim 17.8 \quad F = 1.63 \sim 1.63$

| | | | | | | |
|---|---|---|---|---|---|---|
| | | $d_1$ | 1.000 | $N_1$ | 1.51680 | $\nu_1$ 64.1 |
| $r_2$ | 11.748 | | | | | |
| | | $d_2$ | 1.700 | $N_2$ | 1.80518 | $\nu_2$ 25.4 |
| $r_3$ | 14.625 | | | | | |
| | | $d_3$ | 2.800 | $N_3$ | 1.00000 | |
| $r_4$ | $-101.659$ | | | | | |
| | | $d_4$ | 1.000 | $N_4$ | 1.80518 | $\nu_4$ 25.4 |
| $r_5$ | 42.927 | | | | | |
| | | $d_5$ | 3.000 | $N_5$ | 1.51680 | $\nu_5$ 64.1 |
| $r_6$ | $-9.991$ | | | | | |
| | | $d_6$ | 0.100 | $N_6$ | 1.00000 | |
| $r_7$ | 15.560 | | | | | |
| | | $d_7$ | 3.200 | $N_7$ | 1.51680 | $\nu_7$ 64.1 |
| $r_8$ | $-103.409$ | | | | | |
| | | $d_8$ | 12.500 | $N_8$ | 1.00000 | |
| $r_9$ | $\infty$ | | | | | |
| | | $d_9$ | 1.400 | $N_9$ | 1.00000 | |
| $r_{10}$ | 7.424 | | | | | |
| | | $d_{10}$ | 2.100 | $N_{10}$ | 1.71700 | $\nu_{10}$ 47.9 |
| $r_{11}$ | 13.882 | | | | | |
| | | $d_{11}$ | 1.000 | $N_{11}$ | 1.00000 | |
| $r_{12}$ | 1700.275 | | | | | |
| | | $d_{12}$ | 1.800 | $N_{12}$ | 1.75520 | $\nu_{12}$ 27.5 |
| $r_{13}$ | 6.579 | | | | | |
| | | $d_{13}$ | 2.100 | $N_{13}$ | 1.00000 | |
| $r_{14}$ | $-111.629$ | | | | | |
| | | $d_{14}$ | 2.100 | $N_{14}$ | 1.67000 | $\nu_{14}$ 57.1 |
| $r_{15}$ | $-12.356$ | | | | | |
| | | $d_{15}$ | 0.100 | $N_{15}$ | 1.00000 | |
| $r_{16}$ | 10.914 | | | | | |
| | | $d_{16}$ | 1.900 | $N_{16}$ | 1.67000 | $\nu_{16}$ 57.1 |
| $r_{17}$ | 45.488 | | | | | |
| | | $d_{17}$ | 1.000 | $N_{17}$ | 1.00000 | |
| $r_{18}$ | $\infty$ | | | | | |
| | | $d_{18}$ | 8.500 | $N_{18}$ | 1.45851 | $\nu_{18}$ 67.9 |
| $r_{19}$ | $\infty$ | | | | | |

| Power Data | | Compound Focal Length | |
|---|---|---|---|
| $\phi_I$ | $-0.0325000$ | $f_{4-6}$ | 83.009 |
| $\phi_{II}$ | 0.0510000 | $f_{7-8}$ | 26.412 |
| $\phi_{III}$ | 0.0499453 | $f_{10-13}$ | $-26.371$ |

| Variable Distance | | |
|---|---|---|
| | $d_3$ | $d_8$ |
| TELE | 2.800 | 12.500 |
| MIDDLE | 8.989 | 6.315 |
| WIDE | 18.468 | 1.418 |

TABLE 4

(Embodiment 4)
$f = 9.2 \sim 26.5 \quad F = 1.63 \sim 1.86 \sim 2.45$

| Radius of Curvature | | Distance | | Refractive Index | | Abbe Number |
|---|---|---|---|---|---|---|
| $r_1$ | $-125.846$ | | | | | |
| | | $d_1$ | 1.300 | $N_1$ | 1.61720 | $\nu_1$ 54.0 |
| $r_2$ | 13.652 | | | | | |
| | | $d_2$ | 3.100 | $N_2$ | 1.80518 | $\nu_2$ 25.4 |
| $r_3$ | 21.561 | | | | | |
| | | $d_3$ | 2.800 | $N_3$ | 1.00000 | |
| $r_4$ | 5247.416 | | | | | |
| | | $d_4$ | 1.000 | $N_4$ | 1.80518 | $\nu_4$ 25.4 |
| $r_5$ | 28.258 | | | | | |
| | | $d_5$ | 3.100 | $N_5$ | 1.51680 | $\nu_5$ 64.1 |
| $r_6$ | $-28.191$ | | | | | |
| | | $d_6$ | 0.100 | $N_6$ | 1.00000 | |
| $r_7$ | 21.573 | | | | | |
| | | $d_7$ | 2.700 | $N_7$ | 1.58913 | $\nu_7$ 61.1 |
| $r_8$ | $-86.791$ | | | | | |
| | | $d_8$ | 22.000 | $N_8$ | 1.00000 | |
| $r_9$ | $\infty$ | | | | | |
| | | $d_9$ | 1.400 | $N_9$ | 1.00000 | |
| $r_{10}$ | 6.994 | | | | | |
| | | $d_{10}$ | 2.300 | $N_{10}$ | 1.74400 | $\nu_{10}$ 44.9 |
| $r_{11}$ | 10.892 | | | | | |
| | | $d_{11}$ | 1.000 | $N_{11}$ | 1.00000 | |
| $r_{12}$ | 55.132 | | | | | |

TABLE 4-continued (Embodiment 4)
f = 9.2~26.5 F = 1.63~1.86~2.45

| | Radius of Curvature | Distance | | Refractive Index | | Abbe Number |
|---|---|---|---|---|---|---|
| | | $d_{12}$ | 1.800 | $N_{12}$ | 1.75690 | $\nu_{12}$ 29.7 |
| $r_{13}$ | 5.940 | | | | | |
| | | $d_{13}$ | 2.300 | $N_{13}$ | 1.00000 | |
| $r_{14}$ | −21.548 | | | | | |
| | | $d_{14}$ | 1.500 | $N_{14}$ | 1.69350 | $\nu_{14}$ 53.4 |
| $r_{15}$ | −14.136 | | | | | |
| | | $d_{15}$ | 0.100 | $N_{15}$ | 1.00000 | |
| $r_{16}$ | 15.180 | | | | | |
| | | $d_{16}$ | 2.200 | $N_{16}$ | 1.69350 | $\nu_{16}$ 53.4 |
| $r_{17}$ | −49.648 | | | | | |
| | | $d_{17}$ | 2.000 | $N_{17}$ | 1.00000 | |
| $r_{18}$ | ∞ | | | | | |
| | | $d_{18}$ | 8.500 | $N_{18}$ | 1.45851 | $\nu_{18}$ 67.9 |
| $r_{19}$ | ∞ | | | | | |

| Power Data | | Compound Focal Length | |
|---|---|---|---|
| $\phi_I$ | −0.0280000 | $f_{4-6}$ | 115.522 |
| $\phi_{II}$ | 0.0430000 | $f_{7-8}$ | 29.602 |
| $\phi_{III}$ | 0.0329439 | $f_{10-13}$ | −27.023 |

| Variable Distance | | |
|---|---|---|
| | $d_3$ | $d_8$ |
| TELE | 2.800 | 22.000 |
| MIDDLE | 16.765 | 9.115 |
| WIDE | 37.053 | 2.617 |

TABLE 5

(Embodiment 5)
f = 9.75~28.0 F = 1.43~1.60~2.27

| | Radius of Curvature | Distance | | Refractive Index | | Abbe Number |
|---|---|---|---|---|---|---|
| $r_1$ | −80.935 | | | | | |
| | | $d_1$ | 1.300 | $N_1$ | 1.69350 | $\nu_1$ 50.3 |
| $r_2$ | 13.284 | | | | | |
| | | $d_2$ | 3.200 | $N_2$ | 1.80518 | $\nu_2$ 25.4 |
| $r_3$ | 27.117 | | | | | |
| | | $d_3$ | 2.400 | $N_3$ | 1.00000 | |
| $r_4$ | −246.316 | | | | | |
| | | $d_4$ | 1.000 | $N_4$ | 1.80518 | $\nu_4$ 25.4 |
| $r_5$ | 21.404 | | | | | |
| | | $d_5$ | 3.500 | $N_5$ | 1.69350 | $\nu_5$ 53.4 |
| $r_6$ | −46.664 | | | | | |
| | | $d_6$ | 0.100 | $N_6$ | 1.00000 | |
| $r_7$ | 31.748 | | | | | |
| | | $d_7$ | 2.700 | $N_7$ | 1.69350 | $\nu_7$ 53.4 |
| $r_8$ | −61.913 | | | | | |
| | | $d_8$ | 30.358 | $N_8$ | 1.00000 | |
| $r_9$ | ∞ | | | | | |
| | | $d_9$ | 1.400 | $N_9$ | 1.00000 | |
| $r_{10}$ | 8.200 | | | | | |
| | | $d_{10}$ | 3.200 | $N_{10}$ | 1.80500 | $\nu_{10}$ 41.0 |
| $r_{11}$ | 16.211 | | | | | |
| | | $d_{11}$ | 1.000 | $N_{11}$ | 1.00000 | |
| $r_{12}$ | 66.876 | | | | | |
| | | $d_{12}$ | 1.800 | $N_{12}$ | 1.75690 | $\nu_{12}$ 29.7 |
| $r_{13}$ | 6.077 | | | | | |
| | | $d_{13}$ | 2.200 | $N_{13}$ | 1.00000 | |
| $r_{14}$ | −24.816 | | | | | |
| | | $d_{14}$ | 1.700 | $N_{14}$ | 1.69350 | $\nu_{14}$ 53.4 |
| $r_{15}$ | −13.364 | | | | | |
| | | $d_{15}$ | 0.100 | $N_{15}$ | 1.00000 | |
| $r_{16}$ | 18.135 | | | | | |
| | | $d_{16}$ | 2.200 | $N_{16}$ | 1.69350 | $\nu_{16}$ 53.4 |
| $r_{17}$ | −125.171 | | | | | |
| | | $d_{17}$ | 2.000 | $N_{17}$ | 1.00000 | |
| $r_{18}$ | ∞ | | | | | |
| | | $d_{18}$ | 8.500 | $N_{18}$ | 1.45851 | $\nu_{18}$ 67.9 |
| $r_{19}$ | ∞ | | | | | |

| Power Data | | Compound Focal Length | |
|---|---|---|---|
| $\phi_I$ | −0.0300000 | $f_{4-6}$ | 150.300 |
| $\phi_{II}$ | 0.0398000 | $f_{7-8}$ | 30.623 |
| $\phi_{III}$ | 0.0330823 | $f_{10-13}$ | −46.528 |

| Variable Distance | | |
|---|---|---|
| | $d_3$ | $d_8$ |

TABLE 5-continued (Embodiment 5)
f = 9.75~28.0 F = 1.43~1.60~2.27

| | | |
|---|---|---|
| TELE | 2.400 | 30.358 |
| MIDDLE | 14.887 | 10.015 |
| WIDE | 29.369 | 1.800 |

TABLE 6

(Embodiment 6)
f = 9.25~26.5 F = 1.54~1.67~2.22

| | Radius of Curvature | Distance | | Refractive Index | | Abbe Number |
|---|---|---|---|---|---|---|
| $r_1$ | −131.370 | | | | | |
| | | $d_1$ | 1.300 | $N_1$ | 1.69100 | $\nu_1$ 54.8 |
| $r_2$ | 12.850 | | | | | |
| | | $d_2$ | 3.400 | $N_2$ | 1.80518 | $\nu_2$ 25.4 |
| $r_3$ | 24.139 | | | | | |
| | | $d_3$ | 3.000 | $N_3$ | 1.00000 | |
| $r_4$ | −596.527 | | | | | |
| | | $d_4$ | 1.000 | $N_4$ | 1.80518 | $\nu_4$ 25.4 |
| $r_5$ | 19.945 | | | | | |
| | | $d_5$ | 3.400 | $N_5$ | 1.69100 | $\nu_5$ 54.8 |
| $r_6$ | −46.646 | | | | | |
| | | $d_6$ | 0.100 | $N_6$ | 1.00000 | |
| $r_7$ | 26.132 | | | | | |
| | | $d_7$ | 2.700 | $N_7$ | 1.69100 | $\nu_7$ 54.8 |
| $r_8$ | −76.798 | | | | | |
| | | $d_8$ | 21.000 | $N_8$ | 1.00000 | |
| $r_9$ | ∞ | | | | | |
| | | $d_9$ | 5.000 | $N_9$ | 1.51680 | $\nu_9$ 64.1 |
| $r_{10}$ | ∞ | | | | | |
| | | $d_{10}$ | 1.000 | $N_{10}$ | 1.00000 | |
| $r_{11}$ | ∞ | | | | | |
| | | $d_{11}$ | 1.400 | $N_{11}$ | 1.00000 | |
| $r_{12}$ | 7.060 | | | | | |
| | | $d_{12}$ | 2.200 | $N_{12}$ | 1.80500 | $\nu_{12}$ 41.0 |
| $r_{13}$ | 9.792 | | | | | |
| | | $d_{13}$ | 1.000 | $N_{13}$ | 1.00000 | |
| $r_{14}$ | 60.516 | | | | | |
| | | $d_{14}$ | 1.800 | $N_{14}$ | 1.75690 | $\nu_{14}$ 29.7 |
| $r_{15}$ | 6.071 | | | | | |
| | | $d_{15}$ | 2.300 | $N_{15}$ | 1.00000 | |
| $r_{16}$ | −18.438 | | | | | |
| | | $d_{16}$ | 1.400 | $N_{16}$ | 1.69350 | $\nu_{16}$ 53.4 |
| $r_{17}$ | −13.658 | | | | | |
| | | $d_{17}$ | 0.100 | $N_{17}$ | 1.00000 | |
| $r_{18}$ | 13.636 | | | | | |
| | | $d_{18}$ | 2.600 | $N_{18}$ | 1.69350 | $\nu_{18}$ 53.4 |
| $r_{19}$ | −31.908 | | | | | |
| | | $d_{19}$ | 2.000 | $N_{19}$ | 1.00000 | |
| $r_{20}$ | ∞ | | | | | |
| | | $d_{20}$ | 8.500 | $N_{20}$ | 1.45851 | $\nu_{20}$ 67.9 |
| $r_{21}$ | ∞ | | | | | |

| Power Data | | Compound Focal Length | |
|---|---|---|---|
| $\phi_I$ | −0.0296000 | $f_{4-6}$ | 125.680 |
| $\phi_{II}$ | 0.0434000 | $f_{7-8}$ | 28.522 |
| $\phi_{III}$ | 0.0390692 | $f_{12-15}$ | −24.001 |

| Variable Distance | | |
|---|---|---|
| | $d_3$ | $d_8$ |
| TELE | 3.000 | 21.000 |
| MIDDLE | 15.976 | 7.387 |
| WIDE | 34.562 | 0.581 |

TABLE 7

(Embodiment 7)
f = 9.75~26.5 F = 1.54~1.67~2.22

| | Radius of Curvature | Distance | | Refractive Index | | Abbe Number |
|---|---|---|---|---|---|---|
| $r_1$ | −78.803 | | | | | |
| | | $d_1$ | 1.300 | $N_1$ | 1.69350 | $\nu_1$ 50.3 |
| $r_2$ | 16.497 | | | | | |
| | | $d_2$ | 2.800 | $N_2$ | 1.80518 | $\nu_2$ 25.4 |
| $r_3$ | 30.436 | | | | | |
| | | $d_3$ | 2.000 | $N_3$ | 1.00000 | |

TABLE 7-continued (Embodiment 7)
$f = 9.75 \sim 26.5$ $F = 1.54 \sim 1.67 \sim 2.22$

| | | | | | | |
|---|---|---|---|---|---|---|
| $r_4$ | 833.576 | | | | | |
| | | $d_4$ | 1.000 | $N_4$ | 1.80518 | $\nu_4$ 25.4 |
| $r_5$ | 23.464 | | | | | |
| | | $d_5$ | 3.300 | $N_5$ | 1.69350 | $\nu_5$ 53.4 |
| $r_6$ | −42.003 | | | | | |
| | | $d_6$ | 0.100 | $N_6$ | 1.00000 | |
| $r_7$ | 25.772 | | | | | |
| | | $d_7$ | 2.600 | $N_7$ | 1.69350 | $\nu_7$ 53.4 |
| $r_8$ | −107.210 | | | | | |
| | | $d_8$ | 17.600 | $N_8$ | 1.00000 | |
| $r_9$ | ∞ | | | | | |
| | | $d_9$ | 5.000 | $N_9$ | 1.51680 | $\nu_9$ 64.1 |
| $r_{10}$ | ∞ | | | | | |
| | | $d_{10}$ | 1.200 | $N_{10}$ | 1.00000 | |
| $r_{11}$ | ∞ | | | | | |
| | | $d_{11}$ | 1.300 | $N_{11}$ | 1.00000 | |
| $r_{12}$ | 7.395 | | | | | |
| | | $d_{12}$ | 2.100 | $N_{12}$ | 1.80500 | $\nu_{12}$ 41.0 |
| $r_{13}$ | 9.984 | | | | | |
| | | $d_{13}$ | 1.050 | $N_{13}$ | 1.00000 | |
| $r_{14}$ | 97.691 | | | | | |
| | | $d_{14}$ | 1.800 | $N_{14}$ | 1.75690 | $\nu_{14}$ 29.7 |
| $r_{15}$ | 6.697 | | | | | |
| | | $d_{15}$ | 2.200 | $N_{15}$ | 1.00000 | |
| $r_{16}$ | −27.325 | | | | | |
| | | $d_{16}$ | 1.500 | $N_{16}$ | 1.69350 | $\nu_{16}$ 53.4 |
| $r_{17}$ | −14.405 | | | | | |
| | | $d_{17}$ | 0.100 | $N_{17}$ | 1.00000 | |
| $r_{18}$ | 20.645 | | | | | |
| | | $d_{18}$ | 2.300 | $N_{18}$ | 1.69350 | $\nu_{18}$ 53.4 |
| $r_{19}$ | −30.974 | | | | | |
| | | $d_{19}$ | 2.000 | $N_{19}$ | 1.00000 | |
| $r_{20}$ | ∞ | | | | | |
| | | $d_{20}$ | 8.500 | $N_{20}$ | 1.45851 | $\nu_{20}$ 67.9 |
| $r_{21}$ | ∞ | | | | | |

| Power Data | | Compound Focal Length | |
|---|---|---|---|
| $\phi_I$ | −0.0287000 | $f_{4-6}$ | 77.926 |
| $\phi_{II}$ | 0.0460000 | $f_{7-8}$ | 30.202 |
| $\phi_{III}$ | 0.0314781 | $f_{12-15}$ | −22.703 |

| Variable Distance | | |
|---|---|---|
| | $d_3$ | $d_8$ |
| TELE | 2.000 | 17.600 |
| MIDDLE | 17.922 | 5.657 |
| WIDE | 36.387 | 0.833 |

TABLE 8

(Embodiment 8)
$f = 9.75 \sim 28.0$ $F = 1.43 \sim 1.63 \sim 2.11$

| Radius of Curvature | | Distance | | Refractive Index | | Abbe Number |
|---|---|---|---|---|---|---|
| $r_1$ | −133.541 | | | | | |
| | | $d_1$ | 1.300 | $N_1$ | 1.69100 | $\nu_1$ 54.8 |
| $r_2$ | 19.929 | | | | | |
| | | $d_2$ | 2.600 | $N_2$ | 1.80518 | $\nu_2$ 25.4 |
| $r_3$ | 30.973 | | | | | |
| | | $d_3$ | 2.200 | $N_3$ | 1.00000 | |
| $r_4$ | 69.591 | | | | | |
| | | $d_4$ | 1.000 | $N_4$ | 1.80518 | $\nu_4$ 25.4 |
| $r_5$ | 20.943 | | | | | |
| | | $d_5$ | 3.300 | $N_5$ | 1.69100 | $\nu_5$ 54.8 |
| $r_6$ | −67.180 | | | | | |
| | | $d_6$ | 0.100 | $N_6$ | 1.00000 | |
| $r_7$ | 24.209 | | | | | |
| | | $d_7$ | 2.800 | $N_7$ | 1.69100 | $\nu_7$ 54.8 |
| $r_8$ | −165.783 | | | | | |
| | | $d_8$ | 13.000 | $N_8$ | 1.00000 | |
| $r_9$ | ∞ | | | | | |
| | | $d_9$ | 5.000 | $N_9$ | 1.51680 | $\nu_9$ 64.1 |
| $r_{10}$ | ∞ | | | | | |
| | | $d_{10}$ | 1.200 | $N_{10}$ | 1.00000 | |
| $r_{11}$ | ∞ | | | | | |
| | | $d_{11}$ | 1.400 | $N_{11}$ | 1.00000 | |
| $r_{12}$ | 7.746 | | | | | |
| | | $d_{12}$ | 1.900 | $N_{12}$ | 1.80500 | $\nu_{12}$ 41.0 |

TABLE 8-continued (Embodiment 8)
$f = 9.75 \sim 28.0$ $F = 1.43 \sim 1.63 \sim 2.11$

| | | | | | | |
|---|---|---|---|---|---|---|
| $r_{13}$ | 9.001 | | | | | |
| | | $d_{13}$ | 1.150 | $N_{13}$ | 1.00000 | |
| $r_{14}$ | −114.481 | | | | | |
| | | $d_{14}$ | 1.800 | $N_{14}$ | 1.75690 | $\nu_{14}$ 29.7 |
| $r_{15}$ | 8.137 | | | | | |
| | | $d_{15}$ | 2.200 | $N_{15}$ | 1.00000 | |
| $r_{16}$ | −57.149 | | | | | |
| | | $d_{16}$ | 1.600 | $N_{16}$ | 1.69350 | $\nu_{16}$ 53.4 |
| $r_{17}$ | −16.685 | | | | | |
| | | $d_{17}$ | 0.100 | $N_{17}$ | 1.00000 | |
| $r_{18}$ | 22.560 | | | | | |
| | | $d_{18}$ | 2.400 | $N_{18}$ | 1.69350 | $\nu_{18}$ 53.4 |
| $r_{19}$ | −26.330 | | | | | |
| | | $d_{19}$ | 2.000 | $N_{19}$ | 1.00000 | |
| $r_{20}$ | ∞ | | | | | |
| | | $d_{20}$ | 8.500 | $N_{20}$ | 1.45851 | $\nu_{20}$ 67.9 |
| $r_{21}$ | ∞ | | | | | |

| Power Data | | Compound Focal Length | |
|---|---|---|---|
| $\phi_I$ | −0.0255000 | $f_{4-6}$ | 61.540 |
| $\phi_{II}$ | 0.0480000 | $f_{7-8}$ | 30.756 |
| $\phi_{III}$ | 0.0311884 | $f_{12-15}$ | −16.694 |

| Variable Distance | | |
|---|---|---|
| | $d_3$ | $d_8$ |
| TELE | 2.200 | 13.000 |
| MIDDLE | 22.210 | 4.272 |
| WIDE | 45.417 | 0.748 |

TABLE 9

[Embodiment 9]
$f = 9.75 \sim 28.0$ $F = 1.43 \sim 1.62 \sim 2.19$

| Radius of Curvature | | Distance | | Refractive Index | | Abbe Number |
|---|---|---|---|---|---|---|
| $r_1$ | −192.770 | | | | | |
| | | $d_1$ | 1.300 | $N_1$ | 1.69350 | $\nu_1$ 50.3 |
| $r_2$ | 16.973 | | | | | |
| | | $d_2$ | 3.200 | $N_2$ | 1.80518 | $\nu_2$ 25.4 |
| $r_3$ | 29.745 | | | | | |
| | | $d_3$ | 2.200 | $N_3$ | 1.00000 | |
| $r_4$ | 108.645 | | | | | |
| | | $d_4$ | 1.000 | $N_4$ | 1.80518 | $\nu_4$ 25.4 |
| $r_5$ | 20.936 | | | | | |
| | | $d_5$ | 2.900 | $N_5$ | 1.69350 | $\nu_5$ 53.4 |
| $r_6$ | −127.410 | | | | | |
| | | $d_6$ | 0.100 | $N_6$ | 1.00000 | |
| $r_7$ | 30.443 | | | | | |
| | | $d_7$ | 2.500 | $N_7$ | 1.69350 | $\nu_7$ 53.4 |
| $r_8$ | −78.080 | | | | | |
| | | $d_8$ | 22.500 | $N_8$ | 1.00000 | |
| $r_9$ | ∞ | | | | | |
| | | $d_9$ | 5.000 | $N_9$ | 1.51680 | $\nu_9$ 64.1 |
| $r_{10}$ | ∞ | | | | | |
| | | $d_{10}$ | 1.200 | $N_{10}$ | 1.00000 | |
| $r_{11}$ | ∞ | | | | | |
| | | $d_{11}$ | 1.400 | $N_{11}$ | 1.00000 | |
| $r_{12}$ | 7.367 | | | | | |
| | | $d_{12}$ | 2.500 | $N_{12}$ | 1.80500 | $\nu_{12}$ 41.0 |
| $r_{13}$ | 11.370 | | | | | |
| | | $d_{13}$ | 1.000 | $N_{13}$ | 1.00000 | |
| $r_{14}$ | 73.341 | | | | | |
| | | $d_{14}$ | 1.800 | $N_{14}$ | 1.75690 | $\nu_{14}$ 29.7 |
| $r_{15}$ | 5.816 | | | | | |
| | | $d_{15}$ | 2.200 | $N_{15}$ | 1.00000 | |
| $r_{16}$ | 14.020 | | | | | |
| | | $d_{16}$ | 2.600 | $N_{16}$ | 1.69350 | $\nu_{16}$ 53.4 |
| $r_{17}$ | −16.388 | | | | | |
| | | $d_{17}$ | 2.000 | $N_{17}$ | 1.00000 | |
| $r_{18}$ | ∞ | | | | | |
| | | $d_{18}$ | 8.500 | $N_{18}$ | 1.45851 | $\nu_{18}$ 67.9 |
| $r_{19}$ | ∞ | | | | | |

| Power Data | | | |
|---|---|---|---|
| $\phi_I$ | −0.0240000 | $F_N$ = | 133.334 |
| $\phi_{II}$ | 0.0385000 | $F_P$ = | 31.884 |
| $\phi_{III}$ | 0.0367723 | $\phi_N$ = | −1/25.678 |
| | | Variable Distance | |

TABLE 9-continued

[Embodiment 9]
f = 9.75~28.0   F = 1.43~1.62~2.19

|  | $d_3$ | $d_8$ |
|---|---|---|
| TELE | 2.200 | 22.500 |
| MIDDLE | 19.792 | 7.069 |
| WIDE | 40.195 | 0.837 |

TABLE 10

[Embodiment 10]
f = 10.2~29.4   F = 1.43~1.65~2.30

| Radius of Curvature | Distance | Refractive Index | Abbe Number |
|---|---|---|---|
| $r_1$ −76.342 | | | |
| | $d_1$ 1.300 | $N_1$ 1.69350 | $\nu_1$ 53.4 |
| $r_2$ 19.137 | | | |
| | $d_2$ 2.900 | $N_2$ 1.80518 | $\nu_2$ 25.4 |
| $r_3$ 35.913 | | | |
| | $d_3$ 2.200 | $N_3$ 1.00000 | |
| $r_4$ −82.466 | | | |
| | $d_4$ 1.000 | $N_4$ 1.80518 | $\nu_4$ 25.4 |
| $r_5$ 36.972 | | | |
| | $d_5$ 3.100 | $N_5$ 1.69100 | $\nu_5$ 54.8 |
| $r_6$ −31.700 | | | |
| | $d_6$ 0.100 | $N_6$ 1.00000 | |
| $r_7$ 28.563 | | | |
| | $d_7$ 2.500 | $N_7$ 1.69100 | $\nu_7$ 54.8 |
| $r_8$ −147.799 | $d_8$ 23.686 | $N_8$ 1.00000 | |
| $r_9$ ∞ | | | |
| | $d_9$ 5.000 | $N_9$ 1.51680 | $\nu_9$ 64.1 |
| $r_{10}$ ∞ | | | |
| | $d_{10}$ 1.200 | $N_{10}$ 1.00000 | |
| $r_{11}$ ∞ | | | |
| | $d_{11}$ 1.400 | $N_{11}$ 1.00000 | |
| $r_{12}$ 7.573 | | | |
| | $d_{12}$ 3.000 | $N_{12}$ 1.80500 | $\nu_{12}$ 41.0 |
| $r_{13}$ 12.151 | | | |
| | $d_{13}$ 0.900 | $N_{13}$ 1.00000 | |
| $r_{14}$ 48.218 | | | |
| | $d_{14}$ 1.800 | $N_{14}$ 1.75690 | $\nu_{14}$ 29.7 |
| $r_{15}$ 5.659 | | | |
| | $d_{15}$ 2.200 | $N_{15}$ 1.00000 | |
| $r_{16}$ 19.107 | | | |
| | $d_{16}$ 2.600 | $N_{16}$ 1.69350 | $\nu_{16}$ 53.4 |
| $r_{17}$ −18.0212 | | | |
| | $d_{17}$ 2.000 | $N_{17}$ 1.00000 | |
| $r_{18}$ ∞ | | | |
| | $d_{18}$ 8.500 | $N_{18}$ 1.45851 | $\nu_{18}$ 67.9 |
| $r_{19}$ ∞ | | | |

Power Data
$\phi_I$   −0.0259000          $F_N$ = 104.590
$\phi_{II}$   0.0390000          $F_P$ = 34.843
$\phi_{III}$  0.0273114          $\phi_N$ = −1/32.085

Variable Distance

|  | $d_3$ | $d_8$ |
|---|---|---|
| TELE | 2.200 | 23.686 |
| MIDDLE | 20.370 | 6.671 |
| WIDE | 37.826 | 1.000 |

TABLE 11

[Embodiment 11]
f = 9.75~28.0   F = 1.20~1.42~1.94

| Radius of Curvature | Distance | Refractive Index | Abbe Number |
|---|---|---|---|
| $r_1$ −89.120 | | | |
| | $d_1$ 1.300 | $N_1$ 1.7200 | $\nu_1$ 50.3 |
| $r_2$ 15.712 | | | |
| | $d_2$ 3.100 | $N_2$ 1.80518 | $\nu_2$ 25.4 |
| $r_3$ 31.817 | | | |
| | $d_3$ 2.000 | $N_3$ 1.00000 | |
| $r_4$ −544.624 | | | |
| | $d_4$ 1.000 | $N_4$ 1.80518 | $\nu_4$ 25.4 |
| $r_5$ 23.604 | | | |
| | $d_5$ 3.900 | $N_5$ 1.71300 | $\nu_4$ 53.9 |
| $r_6$ −47.153 | | | |

TABLE 11-continued

[Embodiment 11]
f = 9.75~28.0   F = 1.20~1.42~1.94

| | | | | |
|---|---|---|---|---|
| | $d_6$ 0.100 | $N_6$ 1.00000 | | |
| $r_7$ 29.755 | | | | |
| | $d_7$ 3.000 | $N_7$ 1.71300 | $\nu_7$ 53.9 | |
| $r_8$ −89.143 | | | | |
| | $d_8$ 22.905 | $N_8$ 1.00000 | | |
| $r_9$ ∞ | | | | |
| | $d_9$ 1.500 | $N_9$ 1.00000 | | |
| $r_{10}$ 10.679 | | | | |
| | $d_{10}$ 2.600 | $N_{10}$ 1.80500 | $\nu_{10}$ 41.0 | |
| $r_{11}$ 15.476 | | | | |
| | $d_{11}$ 3.900 | $N_{11}$ 1.00000 | | |
| $r_{12}$ −94.445 | | | | |
| | $d_{12}$ 1.500 | $N_{12}$ 1.75690 | $\nu_{12}$ 29.7 | |
| $r_{13}$ 8.776 | | | | |
| | $d_{13}$ 2.600 | $N_{13}$ 1.00000 | | |
| $r_{14}$ −87.603 | | | | |
| | $d_{14}$ 1.900 | $N_{14}$ 1.71300 | $\nu_{14}$ 53.9 | |
| $r_{15}$ −18.464 | | | | |
| | $d_{15}$ 0.100 | $N_{15}$ 1.00000 | | |
| $r_{16}$ 21.281 | | | | |
| | $d_{16}$ 2.400 | $N_{16}$ 1.71300 | $\nu_{16}$ 53.9 | |
| $r_{17}$ −26.956 | | | | |
| | $d_{17}$ 2.000 | $N_{17}$ 1.00000 | | |
| $r_{18}$ ∞ | | | | |
| | $d_{18}$ 8.500 | $N_{18}$ 1.45851 | $\nu_{18}$ 67.9 | |
| $r_{19}$ ∞ | | | | |

Power Data
$\phi_I$   −0.0282000
$\phi_{II}$   0.0418000
$\phi_{III}$  0.0408817

Variable Distance

|  | $d_3$ | $d_8$ |
|---|---|---|
| TELE | 2.000 | 22.905 |
| MIDDLE | 17.104 | 7.658 |
| WIDE | 34.620 | 1.500 |

TABLE 12

[Embodiment 12]
f = 9.75~28.0   F = 1.20~1.42~1.94

| Radius of Curvature | Distance | Refractive Index | Abbe Number |
|---|---|---|---|
| $r_1$ −89.918 | | | |
| | $d_1$ 1.300 | $N_1$ 1.72000 | $\nu_1$ 50.3 |
| $r_2$ 15.305 | | | |
| | $d_2$ 3.100 | $N_2$ 1.80518 | $\nu_2$ 25.4 |
| $r_3$ 31.294 | | | |
| | $d_3$ 2.000 | $N_3$ 1.00000 | |
| $r_4$ −145.653 | | | |
| | $d_4$ 1.000 | $N_4$ 1.80510 | $\nu_4$ 25.4 |
| $r_5$ 25.525 | | | |
| | $d_5$ 3.900 | $N_5$ 1.71300 | $\nu_5$ 53.9 |
| $r_6$ −38.862 | | | |
| | $d_6$ 0.100 | $N_6$ 1.00000 | |
| $r_7$ 28.611 | | | |
| | $d_7$ 3.000 | $N_7$ 1.71300 | $\nu_7$ 53.9 |
| $r_8$ −105.893 | | | |
| | $d_8$ 23.382 | $N_8$ 1.00000 | |
| $r_9$ ∞ | | | |
| | $d_9$ 1.500 | $N_9$ 1.00000 | |
| $r_{10}$ 11.370 | | | |
| | $d_{10}$ 4.000 | $N_{10}$ 1.80500 | $\nu_{10}$ 41.0 |
| $r_{11}$ 15.111 | | | |
| | $d_{11}$ 3.000 | $N_{11}$ 1.00000 | |
| $r_{12}$ −65.853 | | | |
| | $d_{12}$ 1.700 | $N_{12}$ 1.75690 | $\nu_{12}$ 29.7 |
| $r_{13}$ 9.269 | | | |
| | $d_{13}$ 2.600 | $N_{13}$ 1.00000 | |
| $r_{14}$ −84.682 | | | |
| | $d_{14}$ 1.900 | $N_{14}$ 1.71300 | $\nu_{14}$ 53.9 |
| $r_{15}$ −16.704 | | | |
| | $d_{15}$ 0.100 | $N_{15}$ 1.00000 | |
| $r_{16}$ 21.092 | | | |
| | $d_{16}$ 2.400 | $N_{16}$ 1.71300 | $\nu_{16}$ 53.9 |
| $r_{17}$ −29.224 | | | |
| | $d_{17}$ 2.000 | $N_{17}$ 1.00000 | |
| $r_{18}$ ∞ | | | |

TABLE 12-continued

[Embodiment 12]
f = 9.75~28.0   F = 1.20~1.42~1.94

| | Radius of Curvature | Distance | | Refractive Index | | Abbe Number | |
|---|---|---|---|---|---|---|---|
| | | $d_{18}$ | 8.500 | $N_{18}$ | 1.45851 | $\nu_{18}$ | 67.9 |
| $r_{19}$ | ∞ | | | | | | |

Power Data
$\phi_I$  −0.0284000
$\phi_{II}$  0.0416000
$\phi_{III}$  0.0409394

| | Variable Distance | |
|---|---|---|
| | $d_3$ | $d_8$ |
| TELE | 2.000 | 23.382 |
| MIDDLE | 16.917 | 7.795 |
| WIDE | 34.217 | 1.500 |

TABLE 13

[Embodiment 13]
f = 10.3~29.4   F = 1.23~1.48~2.05

| | Radius of Curvature | Distance | | Refractive Index | | Abbe Number | |
|---|---|---|---|---|---|---|---|
| $r_1$ | −78.668 | | | | | | |
| | | $d_1$ | 1.300 | $N_1$ | 1.71300 | $\nu_1$ | 53.9 |
| $r_2$ | 16.478 | | | | | | |
| | | $d_2$ | 3.000 | $N_2$ | 1.80518 | $\nu_2$ | 25.4 |
| $r_3$ | 32.653 | | | | | | |
| | | $d_3$ | 2.500 | $N_3$ | 1.00000 | | |
| $r_4$ | 244.395 | | | | | | |
| | | $d_4$ | 1.100 | $N_4$ | 1.80518 | $\nu_4$ | 25.4 |
| $r_5$ | 21.277 | | | | | | |
| | | $d_5$ | 3.800 | $N_5$ | 1.71300 | $\nu_5$ | 53.9 |
| $r_6$ | −71.815 | | | | | | |
| | | $d_6$ | 0.100 | $N_6$ | 1.00000 | | |
| $r_7$ | 33.450 | | | | | | |
| | | $d_7$ | 3.000 | $N_7$ | 1.71300 | $\nu_7$ | 53.9 |
| $r_8$ | −73.387 | | | | | | |
| | | $d_8$ | 27.457 | $N_8$ | 1.00000 | | |
| $r_9$ | ∞ | | | | | | |
| | | $d_9$ | 1.500 | $N_9$ | 1.00000 | | |
| $r_{10}$ | 11.799 | | | | | | |
| | | $d_{10}$ | 4.000 | $N_{10}$ | 1.80500 | $\nu_{10}$ | 41.0 |
| $r_{11}$ | 18.578 | | | | | | |
| | | $d_{11}$ | 3.000 | $N_{11}$ | 1.00000 | | |
| $r_{12}$ | −115.597 | | | | | | |
| | | $d_{12}$ | 1.700 | $N_{12}$ | 1.75690 | $\nu_{12}$ | 29.7 |
| $r_{13}$ | 9.136 | | | | | | |
| | | $d_{13}$ | 2.600 | $N_{13}$ | 1.00000 | | |
| $r_{14}$ | −81.329 | | | | | | |
| | | $d_{14}$ | 1.900 | $N_{14}$ | 1.71300 | $\nu_{14}$ | 53.9 |
| $r_{15}$ | −17.643 | | | | | | |
| | | $d_{15}$ | 0.100 | $N_{15}$ | 1.00000 | | |
| $r_{16}$ | 21.429 | | | | | | |
| | | $d_{16}$ | 2.400 | $N_{16}$ | 1.71300 | $\nu_{16}$ | 53.9 |
| $r_{17}$ | −38.193 | | | | | | |
| | | $d_{17}$ | 2.000 | $N_{17}$ | 1.00000 | | |
| $r_{18}$ | ∞ | | | | | | |
| | | $d_{18}$ | 8.500 | $N_{18}$ | 1.45851 | $\nu_{18}$ | 67.9 |
| $r_{19}$ | ∞ | | | | | | |

Power Data
$\phi_I$  −0.0284000
$\phi_{II}$  0.0394000
$\phi_{III}$  0.0380574

| | Variable Distance | |
|---|---|---|
| | $d_3$ | $d_8$ |
| TELE | 2.500 | 27.457 |
| MIDDLE | 16.003 | 9.246 |
| WIDE | 32.398 | 1.500 |

TABLE 14

[Embodiment 14]
f = 9.75~28.0   F = 1.12~1.33~1.82

| | Radius of Curvature | Distance | | Refractive Index | | Abbe Number | |
|---|---|---|---|---|---|---|---|
| $r_1$ | −86.659 | | | | | | |
| | | $d_1$ | 1.300 | $N_1$ | 1.74400 | $\nu_1$ | 44.9 |
| $r_2$ | 14.600 | | | | | | |
| | | $d_2$ | 3.600 | $N_2$ | 1.80518 | $\nu_2$ | 25.4 |
| $r_3$ | 34.882 | | | | | | |
| | | $d_3$ | 2.000 | $N_3$ | 1.00000 | | |
| $r_4$ | 123.530 | | | | | | |
| | | $d_4$ | 1.100 | $N_4$ | 1.80518 | $\nu_4$ | 25.4 |
| $r_5$ | 20.555 | | | | | | |
| | | $d_5$ | 4.300 | $N_5$ | 1.71300 | $\nu_5$ | 53.9 |
| $r_6$ | −70.507 | | | | | | |
| | | $d_6$ | 0.100 | $N_6$ | 1.00000 | | |
| $r_7$ | 32.315 | | | | | | |
| | | $d_7$ | 3.100 | $N_7$ | 1.71300 | $\nu_7$ | 53.9 |
| $r_8$ | −92.030 | | | | | | |
| | | $d_8$ | 23.509 | $N_8$ | 1.00000 | | |
| $r_9$ | ∞ | | | | | | |
| | | $d_9$ | 1.500 | $N_9$ | 1.00000 | | |
| $r_{10}$ | 11.268 | | | | | | |
| | | $d_{10}$ | 2.700 | $N_{10}$ | 1.80500 | $\nu_{10}$ | 41.0 |
| $r_{11}$ | 14.977 | | | | | | |
| | | $d_{11}$ | 4.400 | $N_{11}$ | 1.00000 | | |
| $r_{12}$ | −45.979 | | | | | | |
| | | $d_{12}$ | 1.500 | $N_{12}$ | 1.75690 | $\nu_{12}$ | 29.7 |
| $r_{13}$ | 10.256 | | | | | | |
| | | $d_{13}$ | 2.600 | $N_{13}$ | 1.00000 | | |
| $r_{14}$ | −155.484 | | | | | | |
| | | $d_{14}$ | 2.000 | $N_{14}$ | 1.71300 | $\nu_{14}$ | 53.9 |
| $r_{15}$ | −16.577 | | | | | | |
| | | $d_{15}$ | 0.100 | $N_{15}$ | 1.00000 | | |
| $r_{16}$ | 19.597 | | | | | | |
| | | $d_{16}$ | 2.500 | $N_{16}$ | 1.71300 | $\nu_{16}$ | 53.9 |
| $r_{17}$ | −31.607 | | | | | | |
| | | $d_{17}$ | 2.000 | $N_{17}$ | 1.00000 | | |
| $r_{18}$ | ∞ | | | | | | |
| | | $d_{18}$ | 8.500 | $N_{18}$ | 1.45851 | $\nu_{18}$ | 67.9 |
| $r_{19}$ | ∞ | | | | | | |

Power Data
$\phi_I$  −0.0278000
$\phi_{II}$  0.0411000
$\phi_{III}$  0.0461339

| | Variable Distance | |
|---|---|---|
| | $d_3$ | $d_8$ |
| TELE | 2.000 | 23.509 |
| MIDDLE | 17.194 | 7.831 |
| WIDE | 34.816 | 1.500 |

TABLE 15

[Embodiment 15]
f = 10.25~29.3   F = 1.03~1.24~1.71

| | Radius of Curvature | Distance | | Refractive Index | | Abbe Number | |
|---|---|---|---|---|---|---|---|
| $r_1$ | −72.482 | | | | | | |
| | | $d_1$ | 1.300 | $N_1$ | 1.71300 | $\nu_1$ | 53.9 |
| $r_2$ | 16.968 | | | | | | |
| | | $d_2$ | 3.100 | $N_2$ | 1.80518 | $\nu_2$ | 25.4 |
| $r_3$ | 35.170 | | | | | | |
| | | $d_3$ | 2.300 | $N_3$ | 1.00000 | | |
| $r_4$ | 208.232 | | | | | | |
| | | $d_4$ | 1.100 | $N_4$ | 1.80518 | $\nu_4$ | 25.4 |
| $r_5$ | 21.763 | | | | | | |
| | | $d_5$ | 4.900 | $N_5$ | 1.71300 | $\nu_5$ | 53.9 |
| $r_6$ | −67.815 | | | | | | |
| | | $d_6$ | 0.100 | $N_6$ | 1.00000 | | |
| $r_7$ | 35.079 | | | | | | |
| | | $d_7$ | 3.600 | $N_7$ | 1.71300 | $\nu_7$ | 53.9 |
| $r_8$ | −81.379 | | | | | | |
| | | $d_8$ | 26.920 | $N_8$ | 1.00000 | | |
| $r_9$ | ∞ | | | | | | |
| | | $d_9$ | 1.500 | $N_9$ | 1.00000 | | |
| $r_{10}$ | 12.035 | | | | | | |
| | | $d_{10}$ | 5.100 | $N_{10}$ | 1.80500 | $\nu_{10}$ | 41.0 |
| $r_{11}$ | 16.931 | | | | | | |
| | | $d_{11}$ | 2.600 | $N_{11}$ | 1.00000 | | |
| $r_{12}$ | −100.925 | | | | | | |
| | | $d_{12}$ | 1.600 | $N_{12}$ | 1.75690 | $\nu_{12}$ | 29.7 |
| $r_{13}$ | 9.117 | | | | | | |
| | | $d_{13}$ | 2.500 | $N_{13}$ | 1.00000 | | |
| $r_{14}$ | −73.924 | | | | | | |

TABLE 15-continued

[Embodiment 15]
f = 10.25~29.3  F = 1.03~1.24~1.71

| | | | | | | | |
|---|---|---|---|---|---|---|---|
| | | $d_{14}$ | 1.900 | $N_{14}$ | 1.71300 | $v_{14}$ | 53.9 |
| $r_{15}$ | −17.538 | | | | | | |
| | | $d_{15}$ | 0.100 | $N_{15}$ | 1.00000 | | |
| $r_{16}$ | 22.464 | | | | | | |
| | | $d_{16}$ | 2.600 | $N_{16}$ | 1.71300 | $v_{16}$ | 53.9 |
| $r_{17}$ | −28.083 | | | | | | |
| | | $d_{17}$ | 1.500 | $N_{17}$ | 1.00000 | | |
| $r_{18}$ | ∞ | | | | | | |
| | | $d_{18}$ | 8.500 | $N_{18}$ | 1.45851 | $v_{18}$ | 67.9 |
| $r_{19}$ | ∞ | | | | | | |

Power Data
$\phi_I$  −0.0276000
$\phi_{II}$  0.0386000
$\phi_{III}$  0.0387537

Variable Distance

| | $d_3$ | $d_8$ |
|---|---|---|
| TELE | 2.300 | 26.920 |
| MIDDLE | 16.570 | 9.173 |
| WIDE | 34.205 | 1.500 |

TABLE 16

[Embodiment 16]
f = 9.75~15.0~28.0  F = 1.03~1.24~1.76

| Radius of Curvature | | Distance | | Refractive Index | | Abbe Number | |
|---|---|---|---|---|---|---|---|
| $r_1$ | 498.738 | | | | | | |
| | | $d_1$ | 1.200 | $N_1$ | 1.69100 | $v_1$ | 54.8 |
| $r_2$ | 46.086 | | | | | | |
| | | $d_2$ | 1.900 | $N_2$ | 1.00000 | | |
| $r_3$ | −86.045 | | | | | | |
| | | $d_3$ | 1.200 | $N_3$ | 1.69100 | $v_3$ | 54.8 |
| $r_4$ | 23.843 | | | | | | |
| | | $d_4$ | 3.400 | $N_4$ | 1.75520 | $v_4$ | 27.5 |
| $r_5$ | 79.930 | | | | | | |
| | | $d_5$ | 1.900 | $N_5$ | 1.00000 | | |
| $r_6$ | 144.020 | | | | | | |
| | | $d_6$ | 2.800 | $N_6$ | 1.71300 | $v_6$ | 53.9 |
| $r_7$ | −54.318 | | | | | | |
| | | $d_7$ | 0.100 | $N_7$ | 1.00000 | | |
| $r_8$ | 36.851 | | | | | | |
| | | $d_8$ | 4.900 | $N_8$ | 1.71300 | $v_8$ | 53.9 |
| $r_9$ | −24.082 | | | | | | |
| | | $d_9$ | 1.100 | $N_9$ | 1.80518 | $v_9$ | 25.4 |
| $r_{10}$ | −102.904 | | | | | | |
| | | $d_{10}$ | 26.325 | $N_{10}$ | 1.00000 | | |
| $r_{11}$ | ∞ | | | | | | |
| | | $d_{11}$ | 1.500 | $N_{11}$ | 1.00000 | | |
| $r_{12}$ | 11.333 | | | | | | |
| | | $d_{12}$ | 5.000 | $N_{12}$ | 1.77250 | $v_{12}$ | 49.8 |
| $r_{13}$ | 12.134 | | | | | | |
| | | $d_{13}$ | 2.500 | $N_{13}$ | 1.00000 | | |
| $r_{14}$ | −37.157 | | | | | | |
| | | $d_{14}$ | 1.500 | $N_{14}$ | 1.75690 | $v_{14}$ | 29.7 |
| $r_{15}$ | 9.871 | | | | | | |
| | | $d_{15}$ | 2.600 | $N_{15}$ | 1.00000 | | |
| $r_{16}$ | −258.654 | | | | | | |
| | | $d_{16}$ | 2.000 | $N_{16}$ | 1.71300 | $v_{16}$ | 53.9 |
| $r_{17}$ | −16.929 | | | | | | |
| | | $d_{17}$ | 0.100 | $N_{17}$ | 1.00000 | | |
| $r_{18}$ | −16.670 | | | | | | |
| | | $d_{18}$ | 2.900 | $N_{18}$ | 1.71300 | $v_{18}$ | 53.9 |
| $r_{19}$ | −22.962 | | | | | | |
| | | $d_{19}$ | 2.000 | $n_{19}$ | 1.00000 | | |
| $r_{20}$ | ∞ | | | | | | |
| | | $d_{20}$ | 8.500 | $N_{20}$ | 1.45851 | $v_{20}$ | 67.9 |
| $r_{21}$ | ∞ | | | | | | |

Power Data
$\phi_I$  −0.0292000
$\phi_{II}$  0.0405000
$\phi_{III}$  0.05330097

Variable Distance

| | $d_5$ | $d_{10}$ |
|---|---|---|
| TELE | 1.900 | 26.325 |
| MIDDLE | 15.773 | 8.641 |

TABLE 16-continued

[Embodiment 16]
f = 9.75~15.0~28.0 F = 1.03~1.24~1.76

| | | |
|---|---|---|
| WIDE | 31.861 | 1.500 |

TABLE 17

[Embodiment 17]
f = 9.75~15.0~28.0  F = 1.03~1.23~1.70

| Radius of Curvature | | Distance | | Refractive Index | | Abbe Number | |
|---|---|---|---|---|---|---|---|
| $r_1$ | 561.158 | | | | | | |
| | | $d_1$ | 1.200 | $N_1$ | 1.69100 | $v_1$ | 54.8 |
| $r_2$ | 43.345 | | | | | | |
| | | $d_2$ | 1.900 | $N_2$ | 1.00000 | | |
| $r_3$ | −95.645 | | | | | | |
| | | $d_3$ | 1.200 | $N_3$ | 1.69100 | $v_3$ | 54.8 |
| $r_4$ | 23.288 | | | | | | |
| | | $d_4$ | 3.400 | $N_4$ | 1.75520 | $v_4$ | 27.5 |
| $r_5$ | 85.335 | | | | | | |
| | | $d_5$ | 1.500 | $N_5$ | 1.00000 | | |
| $r_6$ | 119.382 | | | | | | |
| | | $d_6$ | 1.100 | $N_6$ | 1.80513 | $v_6$ | 25.4 |
| $r_7$ | 23.709 | | | | | | |
| | | $d_7$ | 5.000 | $N_7$ | 1.71300 | $v_7$ | 53.9 |
| $r_8$ | −49.546 | | | | | | |
| | | $d_8$ | 0.100 | $N_8$ | 1.00000 | | |
| $r_9$ | 32.517 | | | | | | |
| | | $d_9$ | 3.200 | $N_9$ | 1.71300 | $v_9$ | 53.9 |
| $r_{10}$ | −361.689 | | | | | | |
| | | $d_{10}$ | 23.714 | $N_{10}$ | 1.00000 | | |
| $r_{11}$ | ∞ | | | | | | |
| | | $d_{11}$ | 1.500 | $N_{11}$ | 1.00000 | | |
| $r_{12}$ | 10.894 | | | | | | |
| | | $d_{12}$ | 5.000 | $N_{12}$ | 1.77250 | $v_{12}$ | 49.8 |
| $r_{13}$ | 11.433 | | | | | | |
| | | $d_{13}$ | 2.600 | $N_{13}$ | 1.00000 | | |
| $r_{14}$ | −75.229 | | | | | | |
| | | $d_{14}$ | 1.500 | $N_{14}$ | 1.75690 | $v_{14}$ | 29.7 |
| $r_{15}$ | 9.773 | | | | | | |
| | | $d_{15}$ | 2.600 | $N_{15}$ | 1.00000 | | |
| $r_{16}$ | −174.780 | | | | | | |
| | | $d_{16}$ | 1.950 | $N_{16}$ | 1.71300 | $v_{16}$ | 53.9 |
| $r_{17}$ | −17.886 | | | | | | |
| | | $d_{17}$ | 0.100 | $N_{17}$ | 1.00000 | | |
| $r_{18}$ | 17.635 | | | | | | |
| | | $d_{18}$ | 2.700 | $N_{18}$ | 1.71300 | $v_{18}$ | 53.9 |
| $r_{19}$ | −35.408 | | | | | | |
| | | $d_{19}$ | 1.5000 | $n_{19}$ | 1.00000 | | |
| $r_{20}$ | ∞ | | | | | | |
| | | $d_{20}$ | 8.500 | $N_{20}$ | 1.45851 | $v_{20}$ | 67.9 |
| $r_{21}$ | ∞ | | | | | | |

Power Data
$\phi_I$  −0.0288000
$\phi_{II}$  0.0405000
$\phi_{III}$  0.0409349

Variable Distance

| | $d_5$ | $d_{10}$ |
|---|---|---|
| TELE | 1.500 | 23.714 |
| MIDDLE | 16.865 | 7.748 |
| WIDE | 34.684 | 1.300 |

TABLE 18

[Embodiment 18]
f = 9.75~15.0~28.0  F = 1.01~1.23~1.75

| Radius of Curvature | | Distance | | Refractive Index | | Abbe Number | |
|---|---|---|---|---|---|---|---|
| $r_1$ | 84.791 | | | | | | |
| | | $d_1$ | 1.200 | $N_1$ | 1.77250 | $v_1$ | 49.8 |
| $r_2$ | 39.747 | | | | | | |
| | | $d_2$ | 2.000 | $N_2$ | 1.00000 | | |
| $r_3$ | −59.939 | | | | | | |
| | | $d_3$ | 1.200 | $N_3$ | 1.77250 | $v_3$ | 49.8 |
| $r_4$ | 23.769 | | | | | | |
| | | $d_4$ | 2.800 | $N_4$ | 1.84666 | $v_4$ | 23.8 |
| $r_5$ | 89.451 | | | | | | |
| | | $d_5$ | 1.200 | $N_5$ | 1.00000 | | |

TABLE 18-continued

[Embodiment 18]
f = 9.75~15.0~28.0  F = 1.01~1.23~1.75

| | | | | | | |
|---|---|---|---|---|---|---|
| $r_6$ | 108.655 | | | | | |
| | | $d_6$ | 1.100 | $N_6$ | 1.84666 | $\nu_6$ 23.8 |
| $r_7$ | 21.405 | | | | | |
| | | $d_7$ | 4.700 | $N_7$ | 1.77250 | $\nu_7$ 49.8 |
| $r_8$ | −59.355 | | | | | |
| | | $d_8$ | 0.100 | $N_8$ | 1.00000 | |
| $r_9$ | 39.650 | | | | | |
| | | $d_9$ | 2.700 | $N_9$ | 1.77250 | $\nu_9$ 49.8 |
| $r_{10}$ | −192.614 | | | | | |
| | | $d_{10}$ | 29.517 | $N_{10}$ | 1.00000 | |
| $r_{11}$ | ∞ | | | | | |
| | | $d_{11}$ | 1.500 | $N_{11}$ | 1.00000 | |
| $r_{12}$ | 11.617 | | | | | |
| | | $d_{12}$ | 5.000 | $N_{12}$ | 1.77250 | $\nu_{12}$ 49.8 |
| $r_{13}$ | 14.318 | | | | | |
| | | $d_{13}$ | 2.800 | $N_{13}$ | 1.00000 | |
| $r_{14}$ | −57.357 | | | | | |
| | | $d_{14}$ | 1.600 | $N_{14}$ | 1.75690 | $\nu_{14}$ 29.7 |
| $r_{15}$ | 9.926 | | | | | |
| | | $d_{15}$ | 2.300 | $N_{15}$ | 1.00000 | |
| $r_{16}$ | −346.548 | | | | | |
| | | $d_{16}$ | 1.900 | $N_{16}$ | 1.77250 | $\nu_{16}$ 49.8 |
| $r_{17}$ | −19.027 | | | | | |
| | | $d_{17}$ | 0.100 | $N_{17}$ | 1.00000 | |
| $r_{18}$ | 19.029 | | | | | |
| | | $d_{18}$ | 2.600 | $N_{18}$ | 1.77250 | $\nu_{18}$ 49.8 |
| $r_{19}$ | −31.627 | | | | | |
| | | $d_{19}$ | 1.500 | $n_{19}$ | 1.00000 | |
| $r_{20}$ | ∞ | | | | | |
| | | $d_{20}$ | 8.500 | $N_{20}$ | 1.45851 | $\nu_{20}$ 67.9 |
| $r_{21}$ | ∞ | | | | | |

Power Data

| | |
|---|---|
| $\phi_I$ | −0.0301000 |
| $\phi_{II}$ | 0.0400000 |
| $\phi_{III}$ | 0.0473587 |

Variable Distance

| | $d_5$ | $d_{10}$ |
|---|---|---|
| TELE | 1.200 | 29.517 |
| MIDDLE | 13.801 | 9.560 |
| WIDE | 28.416 | 1.500 |

TABLE 19

(Embodiment 19)
f = 9.75~15.0~28.0 F = 0.97~1.18~1.69

| | Radius of Curvature | | Distance | | Refractive Index | Abbe Number |
|---|---|---|---|---|---|---|
| $r_1$ | 66.826 | | | | | |
| | | $d_1$ | 1.200 | $N_1$ | 1.77250 | $\nu_1$ 49.8 |
| $r_2$ | 38.947 | | | | | |
| | | $d_2$ | 2.100 | $N_2$ | 1.00000 | |
| $r_3$ | −64.082 | | | | | |
| | | $d_3$ | 1.200 | $N_3$ | 1.77250 | $\nu_3$ 49.8 |
| $r_4$ | 21.517 | | | | | |
| | | $d_4$ | 2.800 | $N_4$ | 1.84666 | $\nu_4$ 23.8 |
| $r_5$ | 66.539 | | | | | |
| | | $d_5$ | 1.100 | $N_5$ | 1.00000 | |
| $r_6$ | 154.797 | | | | | |
| | | $d_6$ | 1.100 | $N_6$ | 1.84666 | $\nu_6$ 23.8 |
| $r_7$ | 21.951 | | | | | |
| | | $d_7$ | 4.900 | $N_7$ | 1.77250 | $\nu_7$ 49.8 |
| $r_8$ | −61.270 | | | | | |
| | | $d_8$ | 0.100 | $N_8$ | 1.00000 | |
| $r_9$ | 38.003 | | | | | |
| | | $d_9$ | 3.100 | $N_9$ | 1.77250 | $\nu_9$ 49.8 |
| $r_{10}$ | −135.612 | | | | | |
| | | $d_{10}$ | 29.863 | $N_{10}$ | 1.00000 | |
| $r_{11}$ | ∞ | | | | | |
| | | $d_{11}$ | 1.500 | $N_{11}$ | 1.00000 | |
| $r_{12}$ | 11.467 | | | | | |
| | | $d_{12}$ | 5.000 | $N_{12}$ | 1.77250 | $\nu_{12}$ 49.8 |
| $r_{13}$ | 15.140 | | | | | |
| | | $d_{13}$ | 2.800 | $N_{13}$ | 1.00000 | |
| $r_{14}$ | −139.975 | | | | | |
| | | $d_{14}$ | 1.600 | $N_{14}$ | 1.75690 | $\nu_{14}$ 29.7 |
| $r_{15}$ | 8.925 | | | | | |
| | | $d_{15}$ | 2.300 | $N_{15}$ | 1.00000 | |

TABLE 19-continued (Embodiment 19)
f = 9.75~15.0~28.0 F = 0.97~1.18~1.69

| | | | | | | |
|---|---|---|---|---|---|---|
| $r_{16}$ | −46.329 | | | | | |
| | | $d_{16}$ | 1.900 | $N_{16}$ | 1.77250 | $\nu_{16}$ 49.8 |
| $r_{17}$ | −16.484 | | | | | |
| | | $d_{17}$ | 0.100 | $N_{17}$ | 1.00000 | |
| $r_{18}$ | 15.006 | | | | | |
| | | $d_{18}$ | 2.700 | $N_{18}$ | 1.77250 | $\nu_{18}$ 49.8 |
| $r_{19}$ | −42.687 | | | | | |
| | | $d_{19}$ | 1.000 | $N_{19}$ | 1.00000 | |
| $r_{20}$ | ∞ | | | | | |
| | | $d_{20}$ | 8.500 | $N_{20}$ | 1.45851 | $\nu_{20}$ 67.9 |
| $r_{21}$ | ∞ | | | | | |

Power Data

| | |
|---|---|
| $\phi_I$ | −0.0301000 |
| $\phi_{II}$ | 0.0400000 |
| $\phi_{III}$ | 0.0473666 |

Variable Distance

| | $d_5$ | $d_{10}$ |
|---|---|---|
| TELE | 1.100 | 29.863 |
| MIDDLE | 13.592 | 9.731 |
| WIDE | 28.080 | 1.601 |

TABLE 20

(Embodiment 20)
f = 9.75~15.0~28.0 F = 0.97~1.18~1.69

| | Radius of Curvature | | Distance | | Refractive Index | Abbe Number |
|---|---|---|---|---|---|---|
| $r_1$ | −304.151 | | | | | |
| | | $d_1$ | 1.200 | $N_1$ | 1.77250 | $\nu_1$ 49.8 |
| $r_2$ | 48.332 | | | | | |
| | | $d_2$ | 1.600 | $N_2$ | 1.00000 | |
| $r_3$ | −87.929 | | | | | |
| | | $d_3$ | 1.300 | $N_3$ | 1.77250 | $\nu_3$ 49.8 |
| $r_4$ | 29.114 | | | | | |
| | | $d_4$ | 2.800 | $N_4$ | 1.84666 | $\nu_4$ 23.8 |
| $r_5$ | 211.221 | | | | | |
| | | $d_5$ | 2.500 | $N_5$ | 1.00000 | |
| $r_6$ | 123.068 | | | | | |
| | | $d_6$ | 2.500 | $N_6$ | 1.77250 | $\nu_6$ 49.8 |
| $r_7$ | −60.330 | | | | | |
| | | $d_7$ | 0.100 | $N_7$ | 1.00000 | |
| $r_8$ | 34.183 | | | | | |
| | | $d_8$ | 1.200 | $N_8$ | 1.84666 | $\nu_8$ 23.8 |
| $r_9$ | 15.079 | | | | | |
| | | $d_9$ | 5.300 | $N_9$ | 1.77250 | $\nu_9$ 49.8 |
| $r_{10}$ | −682.846 | | | | | |
| | | $d_{10}$ | 28.025 | $N_{10}$ | 1.00000 | |
| $r_{11}$ | ∞ | | | | | |
| | | $d_{11}$ | 1.500 | $N_{11}$ | 1.00000 | |
| $r_{12}$ | 10.848 | | | | | |
| | | $d_{12}$ | 5.000 | $N_{12}$ | 1.77250 | $\nu_{12}$ 49.8 |
| $r_{13}$ | 11.423 | | | | | |
| | | $d_{13}$ | 2.700 | $N_{13}$ | 1.00000 | |
| $r_{14}$ | −35.380 | | | | | |
| | | $d_{14}$ | 1.500 | $N_{14}$ | 1.75690 | $\nu_{14}$ 29.7 |
| $r_{15}$ | 10.433 | | | | | |
| | | $d_{15}$ | 2.500 | $N_{15}$ | 1.00000 | |
| $r_{16}$ | −619.237 | | | | | |
| | | $d_{16}$ | 2.100 | $N_{16}$ | 1.77250 | $\nu_{16}$ 49.8 |
| $r_{17}$ | −16.966 | | | | | |
| | | $d_{17}$ | 0.100 | $N_{17}$ | 1.00000 | |
| $r_{18}$ | 15.257 | | | | | |
| | | $d_{18}$ | 2.900 | $N_{18}$ | 1.77250 | $\nu_{18}$ 49.8 |
| $r_{19}$ | −40.095 | | | | | |
| | | $d_{19}$ | 3.200 | $N_{19}$ | 1.00000 | |
| $r_{20}$ | ∞ | | | | | |
| | | $d_{20}$ | 4.800 | $N_{20}$ | 1.56883 | $\nu_{20}$ 56.0 |
| $r_{21}$ | ∞ | | | | | |

Power Data

| | |
|---|---|
| $\phi_I$ | −0.0293000 |
| $\phi_{II}$ | 0.0397000 |
| $\phi_{III}$ | 0.0540194 |

Variable Distance

TABLE 20-continued (Embodiment 20)
f = 9.75~15.0~28.0 F = 0.97~1.18~1.69

|  | $d_5$ | $d_{10}$ |
|---|---|---|
| TELE | 2.500 | 28.025 |
| MIDDLE | 16.166 | 9.344 |
| WIDE | 32.016 | 1.800 |

TABLE 21

(Embodiment 21)
f = 10.26~16.0~29.4 F = 0.97~1.20~1.71

| Radius of Curvature | | Distance | | Refractive Index | | Abbe Number |
|---|---|---|---|---|---|---|
| $r_1$ | 489.893 | | | | | |
| | | $d_1$ | 1.200 | $N_1$ | 1.77250 | $\nu_1$ 49.8 |
| $r_2$ | 62.201 | | | | | |
| | | $d_2$ | 1.510 | $N_2$ | 1.00000 | |
| $r_3$ | −85.507 | | | | | |
| | | $d_3$ | 1.300 | $N_3$ | 1.77250 | $\nu_3$ 49.8 |
| $r_4$ | 23.453 | | | | | |
| | | $d_4$ | 2.950 | $N_4$ | 1.84666 | $\nu_4$ 23.8 |
| $r_5$ | 73.005 | | | | | |
| | | $d_5$ | 2.400 | $N_5$ | 1.00000 | |
| $r_6$ | 138.167 | | | | | |
| | | $d_6$ | 2.650 | $N_6$ | 1.77250 | $\nu_6$ 49.8 |
| $r_7$ | −58.835 | | | | | |
| | | $d_7$ | 0.100 | $N_7$ | 1.00000 | |
| $r_8$ | 34.214 | | | | | |
| | | $d_8$ | 1.200 | $N_8$ | 1.84666 | $\nu_8$ 23.8 |
| $r_9$ | 15.614 | | | | | |
| | | $d_9$ | 5.600 | $N_9$ | 1.77250 | $\nu_9$ 49.8 |
| $r_{10}$ | −557.653 | | | | | |
| | | $d_{10}$ | 29.437 | $N_{10}$ | 1.00000 | |
| $r_{11}$ | ∞ | | | | | |
| | | $d_{11}$ | 1.500 | $N_{11}$ | 1.00000 | |
| $r_{12}$ | 11.178 | | | | | |
| | | $d_{12}$ | 5.200 | $N_{12}$ | 1.77250 | $\nu_{12}$ 49.8 |
| $r_{13}$ | 11.400 | | | | | |
| | | $d_{13}$ | 2.900 | $N_{13}$ | 1.00000 | |
| $r_{14}$ | −31.463 | | | | | |
| | | $d_{14}$ | 1.600 | $N_{14}$ | 1.75520 | $\nu_{14}$ 27.5 |
| $r_{15}$ | 10.153 | | | | | |
| | | $d_{15}$ | 2.500 | $N_{15}$ | 1.00000 | |
| $r_{16}$ | ∞ | | | | | |
| | | $d_{16}$ | 2.150 | $N_{16}$ | 1.77250 | $\nu_{16}$ 49.8 |
| $r_{17}$ | −17.640 | | | | | |
| | | $d_{17}$ | 0.100 | $N_{17}$ | 1.00000 | |
| $r_{18}$ | 15.164 | | | | | |
| | | $d_{18}$ | 3.300 | $N_{18}$ | 1.77250 | $\nu_{18}$ 49.8 |
| $r_{19}$ | −28.822 | | | | | |
| | | $d_{19}$ | 2.900 | $N_{19}$ | 1.00000 | |
| $r_{20}$ | ∞ | | | | | |
| | | $d_{20}$ | 4.900 | $N_{20}$ | 1.56883 | $\nu_{20}$ 56.0 |
| $r_{21}$ | ∞ | | | | | |

Power Data

| $\phi_I$ | −0.0290000 |
|---|---|
| $\phi_{II}$ | 0.0397000 |
| $\phi_{III}$ | 0.0578561 |

Variable Distance

|  | $d_5$ | $d_{10}$ |
|---|---|---|
| TELE | 2.400 | 29.437 |
| MIDDLE | 15.008 | 10.228 |
| WIDE | 30.485 | 2.000 |

TABLE 22

(Embodiment 22)
f = 9.76~15.0~28.0 F = 0.97~1.19~1.71

| Radius of Curvature | | Distance | | Refractive Index | | Abbe Number |
|---|---|---|---|---|---|---|
| $r_1$ | −3130.772 | | | | | |
| | | $d_1$ | 1.200 | $N_1$ | 1.77250 | $\nu_1$ 49.8 |
| $r_2$ | 49.482 | | | | | |
| | | $d_2$ | 1.700 | $N_2$ | 1.00000 | |
| $r_3$ | −88.511 | | | | | |

TABLE 22-continued (Embodiment 22)
f = 9.76~15.0~28.0 F = 0.97~1.19~1.71

| | | $d_3$ | 1.300 | $N_3$ | 1.77250 | $\nu_3$ 49.8 |
|---|---|---|---|---|---|---|
| $r_4$ | 26.144 | | | | | |
| | | $d_4$ | 2.900 | $N_4$ | 1.84666 | $\nu_4$ 23.8 |
| $r_5$ | 118.108 | | | | | |
| | | $d_5$ | 2.400 | $N_5$ | 1.00000 | |
| $r_6$ | 128.440 | | | | | |
| | | $d_6$ | 2.550 | $N_6$ | 1.77250 | $\nu_6$ 49.8 |
| $r_7$ | −59.566 | | | | | |
| | | $d_7$ | 0.100 | $N_7$ | 1.00000 | |
| $r_8$ | 34.041 | | | | | |
| | | $d_8$ | 1.200 | $N_8$ | 1.84666 | $\nu_8$ 23.8 |
| $r_9$ | 15.334 | | | | | |
| | | $d_9$ | 5.450 | $N_9$ | 1.77250 | $\nu_9$ 49.8 |
| $r_{10}$ | −748.738 | | | | | |
| | | $d_{10}$ | 29.574 | $N_{10}$ | 1.00000 | |
| $r_{11}$ | ∞ | | | | | |
| | | $d_{11}$ | 1.500 | $N_{11}$ | 1.00000 | |
| $r_{12}$ | 10.871 | | | | | |
| | | $d_{12}$ | 5.000 | $N_{12}$ | 1.77250 | $\nu_{12}$ 49.8 |
| $r_{13}$ | 11.372 | | | | | |
| | | $d_{13}$ | 2.800 | $N_{13}$ | 1.00000 | |
| $r_{14}$ | −31.419 | | | | | |
| | | $d_{14}$ | 1.500 | $N_{14}$ | 1.75520 | $\nu_{14}$ 27.5 |
| $r_{15}$ | 10.211 | | | | | |
| | | $d_{15}$ | 2.400 | $N_{15}$ | 1.00000 | |
| $r_{16}$ | −2193.223 | | | | | |
| | | $d_{16}$ | 2.150 | $N_{16}$ | 1.77250 | $\nu_{16}$ 49.8 |
| $r_{17}$ | −16.893 | | | | | |
| | | $d_{17}$ | 0.100 | $N_{17}$ | 1.00000 | |
| $r_{18}$ | 14.766 | | | | | |
| | | $d_{18}$ | 3.200 | $N_{18}$ | 1.77250 | $\nu_{18}$ 49.8 |
| $r_{19}$ | −31.967 | | | | | |
| | | $d_{19}$ | 3.000 | $N_{19}$ | 1.00000 | |
| $r_{20}$ | ∞ | | | | | |
| | | $d_{20}$ | 4.800 | $N_{20}$ | 1.56883 | $\nu_{20}$ 56.0 |
| $r_{21}$ | ∞ | | | | | |

Power Data

| $\phi_I$ | −0.0296000 |
|---|---|
| $\phi_{II}$ | 0.0397000 |
| $\phi_{III}$ | 0.0584687 |

Variable Distance

|  | $d_5$ | $d_{10}$ |
|---|---|---|
| TELE | 2.400 | 29.574 |
| MIDDLE | 15.391 | 9.922 |
| WIDE | 30.413 | 2.000 |

TABLE 23

(Embodiment 23)
f = 9.75~15.0~28.0 F = 0.97~1.19~1.72

| Radius of Curvature | | Distance | | Refractive Index | | Abbe Number |
|---|---|---|---|---|---|---|
| $r_1$ | 202.380 | | | | | |
| | | $d_1$ | 1.200 | $N_1$ | 1.77250 | $\nu_1$ 49.8 |
| $r_2$ | 65.702 | | | | | |
| | | $d_2$ | 1.500 | $N_2$ | 1.00000 | |
| $r_3$ | −78.718 | | | | | |
| | | $d_3$ | 1.200 | $N_3$ | 1.77250 | $\nu_3$ 49.8 |
| $r_4$ | 19.681 | | | | | |
| | | $d_4$ | 2.900 | $N_4$ | 1.84666 | $\nu_4$ 23.8 |
| $r_5$ | 54.748 | | | | | |
| | | $d_5$ | 2.400 | $N_5$ | 1.00000 | |
| $r_6$ | 108.147 | | | | | |
| | | $d_6$ | 1.200 | $N_6$ | 1.84666 | $\nu_6$ 23.8 |
| $r_7$ | 37.029 | | | | | |
| | | $d_7$ | 4.000 | $N_7$ | 1.77250 | $\nu_7$ 49.8 |
| $r_8$ | −48.325 | | | | | |
| | | $d_8$ | 0.100 | $N_8$ | 1.00000 | |
| $r_9$ | 37.917 | | | | | |
| | | $d_9$ | 3.900 | $N_9$ | 1.77250 | $\nu_9$ 49.8 |
| $r_{10}$ | −44.297 | | | | | |
| | | $d_{10}$ | 1.200 | $N_{10}$ | 1.84666 | $\nu_{10}$ 23.8 |
| $r_{11}$ | ∞ | | | | | |
| | | $d_{11}$ | 29.969 | $N_{11}$ | 1.00000 | |
| $r_{12}$ | ∞ | | | | | |

TABLE 23-continued (Embodiment 23)
$f = 9.75 \sim 15.0 \sim 28.0 \quad F = 0.97 \sim 1.19 \sim 1.72$

| | | | | | | |
|---|---|---|---|---|---|---|
| | | $d_{12}$ | 1.500 | $N_{12}$ | 1.00000 | |
| $r_{13}$ | 10.928 | | | | | |
| | | $d_{13}$ | 5.000 | $N_{13}$ | 1.77250 | $\nu_{13}$ 49.8 |
| $r_{14}$ | 11.596 | | | | | |
| | | $d_{14}$ | 2.900 | $N_{14}$ | 1.00000 | |
| $r_{15}$ | −29.259 | | | | | |
| | | $d_{15}$ | 1.600 | $N_{15}$ | 1.75690 | $\nu_{15}$ 29.7 |
| $r_{16}$ | 10.561 | | | | | |
| | | $d_{16}$ | 2.100 | $N_{16}$ | 1.00000 | |
| $r_{17}$ | −174.001 | | | | | |
| | | $d_{17}$ | 2.200 | $N_{17}$ | 1.77250 | $\nu_{17}$ 49.8 |
| $r_{18}$ | −15.827 | | | | | |
| | | $d_{18}$ | 0.100 | $N_{18}$ | 1.00000 | |
| $r_{19}$ | 14.911 | | | | | |
| | | $d_{19}$ | 3.350 | $N_{19}$ | 1.77250 | $\nu_{19}$ 49.8 |
| $r_{20}$ | −32.146 | | | | | |
| | | $d_{20}$ | 2.720 | $N_{20}$ | 1.00000 | |
| $r_{21}$ | ∞ | | | | | |
| | | $d_{21}$ | 4.900 | $N_{21}$ | 1.53996 | $\nu_{21}$ 59.7 |
| $r_{22}$ | ∞ | | | | | |

Power Data

| | |
|---|---|
| $\phi_I$ | −0.0301000 |
| $\phi_{II}$ | 0.0400000 |
| $\phi_{III}$ | 0.0563396 |

Variable Distance

| | $d_5$ | $d_{11}$ |
|---|---|---|
| TELE | 2.400 | 29.969 |
| MIDDLE | 14.978 | 9.975 |
| WIDE | 29.565 | 1.900 |

TABLE 24

(Embodiment 24)
$f = 9.75 \sim 15.0 \sim 28.0 \quad F = 0.97 \sim 1.19 \sim 1.72$

| Radius of Curvature | | Distance | | Refractive Index | | Abbe Number |
|---|---|---|---|---|---|---|
| $r_1$ | 269.288 | | | | | |
| | | $d_1$ | 1.200 | $N_1$ | 1.77250 | $\nu_1$ 49.8 |
| $r_2$ | 63.861 | | | | | |
| | | $d_2$ | 1.600 | $N_2$ | 1.00000 | |
| $r_3$ | −77.711 | | | | | |
| | | $d_3$ | 1.200 | $N_3$ | 1.77250 | $\nu_3$ 49.8 |
| $r_4$ | 20.900 | | | | | |
| | | $d_4$ | 2.700 | $N_4$ | 1.84666 | $\nu_4$ 23.8 |
| $r_5$ | 61.370 | | | | | |
| | | $d_5$ | 2.400 | $N_5$ | 1.00000 | |
| $r_6$ | 130.971 | | | | | |
| | | $d_6$ | 1.100 | $N_6$ | 1.84666 | $\nu_6$ 23.8 |
| $r_7$ | 38.403 | | | | | |
| | | $d_7$ | 4.100 | $N_7$ | 1.77250 | $\nu_7$ 49.8 |
| $r_8$ | −43.427 | | | | | |
| | | $d_8$ | 0.100 | $N_8$ | 1.00000 | |
| $r_9$ | 34.696 | | | | | |
| | | $d_9$ | 3.900 | $N_9$ | 1.77250 | $\nu_9$ 49.8 |
| $r_{10}$ | −53.379 | | | | | |
| | | $d_{10}$ | 1.100 | $N_{10}$ | 1.84666 | $\nu_{10}$ 23.8 |
| $r_{11}$ | 266.282 | | | | | |
| | | $d_{11}$ | 29.455 | $N_{11}$ | 1.00000 | |
| $r_{12}$ | ∞ | | | | | |
| | | $d_{12}$ | 1.500 | $N_{12}$ | 1.00000 | |
| $r_{13}$ | 10.895 | | | | | |
| | | $d_{13}$ | 5.000 | $N_{13}$ | 1.77250 | $\nu_{13}$ 49.8 |
| $r_{14}$ | 11.678 | | | | | |
| | | $d_{14}$ | 2.900 | $N_{14}$ | 1.00000 | |
| $r_{15}$ | −41.199 | | | | | |
| | | $d_{15}$ | 1.600 | $N_{15}$ | 1.75690 | $\nu_{15}$ 29.7 |
| $r_{16}$ | 10.002 | | | | | |
| | | $d_{16}$ | 2.100 | $N_{16}$ | 1.00000 | |
| $r_{17}$ | −96.161 | | | | | |
| | | $d_{17}$ | 1.900 | $N_{17}$ | 1.77250 | $\nu_{17}$ 49.8 |
| $r_{18}$ | −16.345 | | | | | |
| | | $d_{18}$ | 0.100 | $N_{18}$ | 1.00000 | |
| $r_{19}$ | 14.663 | | | | | |
| | | $d_{19}$ | 3.100 | $N_{19}$ | 1.77250 | $\nu_{19}$ 49.8 |
| $r_{20}$ | −32.645 | | | | | |

TABLE 24-continued (Embodiment 24)
$f = 9.75 \sim 15.0 \sim 28.0 \quad F = 0.97 \sim 1.19 \sim 1.72$

| | | | | | | |
|---|---|---|---|---|---|---|
| | | $d_{20}$ | 1.000 | $N_{20}$ | 1.00000 | |
| $r_{21}$ | ∞ | | | | | |
| | | $d_{21}$ | 8.500 | $N_{21}$ | 1.45851 | $\nu_{21}$ 67.9 |
| $r_{22}$ | ∞ | | | | | |

Power Data

| | |
|---|---|
| $\phi_I$ | −0.0301000 |
| $\phi_{II}$ | 0.0400000 |
| $\phi_{III}$ | 0.0531335 |

Variable Distance

| | $d_5$ | $d_{11}$ |
|---|---|---|
| TELE | 2.400 | 29.455 |
| MIDDLE | 15.029 | 9.5423 |
| WIDE | 29.676 | 1.500 |

TABLE 25

(Embodiment 25)
$f = 9.75 \sim 15.0 \sim 28.0 \quad F = 1.00 \sim 1.20 \sim 1.69$

| Radius of Curvature | | Distance | | Refractive Index | | Abbe Number |
|---|---|---|---|---|---|---|
| $r_1$ | −220.226 | | | | | |
| | | $d_1$ | 1.200 | $N_1$ | 1.69100 | $\nu_1$ 54.8 |
| $r_2$ | 40.648 | | | | | |
| | | $d_2$ | 1.900 | $N_2$ | 1.00000 | |
| $r_3$ | −76.846 | | | | | |
| | | $d_3$ | 1.200 | $N_3$ | 1.69100 | $\nu_3$ 54.8 |
| $r_4$ | 35.765 | | | | | |
| | | $d_4$ | 3.000 | $N_4$ | 1.75520 | $\nu_4$ 27.5 |
| $r_5$ | 609.632 | | | | | |
| | | $d_5$ | 1.500 | $N_5$ | 1.00000 | |
| $r_6$ | 175.792 | | | | | |
| | | $d_6$ | 1.100 | $N_6$ | 1.80518 | $\nu_6$ 25.4 |
| $r_7$ | 68.334 | | | | | |
| | | $d_7$ | 3.700 | $N_7$ | 1.71300 | $\nu_7$ 53.9 |
| $r_8$ | −40.497 | | | | | |
| | | $d_8$ | 0.100 | $N_8$ | 1.00000 | |
| $r_9$ | 30.884 | | | | | |
| | | $d_9$ | 4.600 | $N_9$ | 1.71300 | $\nu_9$ 53.9 |
| $r_{10}$ | −47.600 | | | | | |
| | | $d_{10}$ | 1.100 | $N_{10}$ | 1.80518 | $\nu_{10}$ 25.4 |
| $r_{11}$ | 684.894 | | | | | |
| | | $d_{11}$ | 23.742 | $N_{11}$ | 1.00000 | |
| $r_{12}$ | ∞ | | | | | |
| | | $d_{12}$ | 1.500 | $N_{12}$ | 1.00000 | |
| $r_{13}$ | 10.950 | | | | | |
| | | $d_{13}$ | 5.000 | $N_{13}$ | 1.77250 | $\nu_{13}$ 49.8 |
| $r_{14}$ | 10.541 | | | | | |
| | | $d_{14}$ | 2.500 | $N_{14}$ | 1.00000 | |
| $r_{15}$ | −31.836 | | | | | |
| | | $d_{15}$ | 2.100 | $N_{15}$ | 1.75690 | $\nu_{15}$ 29.7 |
| $r_{16}$ | 10.543 | | | | | |
| | | $d_{16}$ | 2.300 | $N_{16}$ | 1.00000 | |
| $r_{17}$ | 311.799 | | | | | |
| | | $d_{17}$ | 2.100 | $N_{17}$ | 1.71300 | $\nu_{17}$ 53.9 |
| $r_{18}$ | −17.104 | | | | | |
| | | $d_{18}$ | 0.100 | $N_{18}$ | 1.00000 | |
| $r_{19}$ | 17.886 | | | | | |
| | | $d_{19}$ | 3.000 | $N_{19}$ | 1.71300 | $\nu_{19}$ 53.9 |
| $r_{20}$ | −23.997 | | | | | |
| | | $d_{20}$ | 1.000 | $N_{20}$ | 1.00000 | |
| $r_{21}$ | ∞ | | | | | |
| | | $d_{21}$ | 8.500 | $N_{21}$ | 1.45851 | $\nu_{21}$ 67.9 |
| $r_{22}$ | ∞ | | | | | |

Power Data

| | |
|---|---|
| $\phi_I$ | −0.0290000 |
| $\phi_{II}$ | 0.0408000 |
| $\phi_{III}$ | 0.0496077 |

Variable Distance

| | $d_5$ | $d_{11}$ |
|---|---|---|
| TELE | 1.500 | 23.742 |
| MIDDLE | 16.757 | 7.898 |
| WIDE | 34.451 | 1.500 |

TABLE 26

(Embodiment 26)
f = 9.75~15.0~28.0  F = 0.97~1.19~1.71

| Radius of Curvature | Distance | | Refractive Index | | Abbe Number |
| --- | --- | --- | --- | --- | --- |
| $r_1$ 254.907 | | | | | |
| | $d_1$ | 1.200 | $N_1$ | 1.77250 | $\nu_1$ 49.8 |
| $r_2$ 72.204 | | | | | |
| | $d_2$ | 1.500 | $N_2$ | 1.00000 | |
| $r_3$ −90.326 | | | | | |
| | $d_3$ | 1.200 | $N_3$ | 1.77250 | $\nu_3$ 49.8 |
| $r_4$ 20.147 | | | | | |
| | $d_4$ | 2.900 | $N_4$ | 1.84666 | $\nu_4$ 23.8 |
| $r_5$ 50.677 | | | | | |
| | $d_5$ | 2.400 | $N_5$ | 1.00000 | |
| $r_6$ 93.503 | | | | | |
| | $d_6$ | 1.200 | $N_6$ | 1.84666 | $\nu_6$ 23.8 |
| $r_7$ 36.155 | | | | | |
| | $d_7$ | 3.900 | $N_7$ | 1.77250 | $\nu_7$ 49.8 |
| $r_8$ −54.437 | | | | | |
| | $d_8$ | 0.100 | $N_8$ | 1.00000 | |
| $r_9$ 38.127 | | | | | |
| | $d_9$ | 1.200 | $N_9$ | 1.80518 | $\nu_9$ 25.4 |
| $r_{10}$ 20.299 | | | | | |
| | $d_{10}$ | 3.900 | $N_{10}$ | 1.77250 | $\nu_{10}$ 49.8 |
| $r_{11}$ ∞ | | | | | |
| | $d_{11}$ | 29.842 | $N_{11}$ | 1.00000 | |
| $r_{12}$ ∞ | | | | | |
| | $d_{12}$ | 1.500 | $N_{12}$ | 1.00000 | |
| $r_{13}$ 11.004 | | | | | |
| | $d_{13}$ | 5.000 | $N_{13}$ | 1.77250 | $\nu_{13}$ 49.8 |
| $r_{14}$ 11.625 | | | | | |
| | $d_{14}$ | 2.900 | $N_{14}$ | 1.00000 | |
| $r_{15}$ −26.791 | | | | | |
| | $d_{15}$ | 1.600 | $N_{15}$ | 1.75520 | $\nu_{15}$ 27.5 |
| $r_{16}$ −10.947 | | | | | |
| | $d_{16}$ | 2.100 | $N_{16}$ | 1.00000 | |
| $r_{17}$ −431.256 | | | | | |
| | $d_{17}$ | 2.200 | $N_{17}$ | 1.77250 | $\nu_{17}$ 49.8 |
| $r_{18}$ −15.839 | | | | | |
| | $d_{18}$ | 0.100 | $N_{18}$ | 1.00000 | |
| $r_{19}$ 15.076 | | | | | |
| | $d_{19}$ | 3.350 | $N_{19}$ | 1.77250 | $\nu_{19}$ 49.8 |
| $r_{20}$ −34.177 | | | | | |
| | $d_{20}$ | 2.720 | $N_{20}$ | 1.00000 | |
| $r_{21}$ ∞ | | | | | |
| | $d_{21}$ | 4.900 | $N_{21}$ | 1.53996 | $\nu_{21}$ 59.7 |
| $r_{22}$ ∞ | | | | | |

| Power Data | |
| --- | --- |
| $\phi_I$ | −0.0299000 |
| $\phi_{II}$ | 0.0400000 |
| $\phi_{III}$ | 0.0566216 |

| Variable Distance | | |
| --- | --- | --- |
| | $d_5$ | $d_{11}$ |
| TELE | 2.400 | 29.842 |
| MIDDLE | 15.035 | 9.938 |
| WIDE | 29.689 | 1.900 |

TABLE 27

(Embodiment 27)
f = 9.75~15.0~28.0  F = 0.97~1.19~1.71

| Radius of Curvature | Distance | | Refractive Index | | Abbe Number |
| --- | --- | --- | --- | --- | --- |
| $r_1$ 151.072 | | | | | |
| | $d_1$ | 1.200 | $N_1$ | 1.77250 | $\nu_1$ 49.8 |
| $r_2$ 64.402 | | | | | |
| | $d_2$ | 1.500 | $N_2$ | 1.00000 | |
| $r_3$ −80.021 | | | | | |
| | $d_3$ | 1.200 | $N_3$ | 1.77250 | $\nu_3$ 49.8 |
| $r_4$ 20.318 | | | | | |
| | $d_4$ | 2.900 | $N_4$ | 1.84666 | $\nu_4$ 23.8 |
| $r_5$ 51.533 | | | | | |
| | $d_5$ | 2.400 | $N_5$ | 1.00000 | |
| $r_6$ 118.331 | | | | | |
| | $d_6$ | 3.800 | $N_6$ | 1.77250 | $\nu_6$ 49.8 |
| $r_7$ −26.118 | | | | | |
| | $d_7$ | 1.200 | $N_7$ | 1.84666 | $\nu_7$ 23.8 |
| $r_8$ −48.623 | | | | | |
| | $d_8$ | 0.100 | $N_8$ | 1.00000 | |
| $r_9$ 38.174 | | | | | |
| | $d_9$ | 1.200 | $N_9$ | 1.80518 | $\nu_9$ 25.4 |
| $r_{10}$ 20.011 | | | | | |
| | $d_{10}$ | 3.900 | $N_{10}$ | 1.77250 | $\nu_{10}$ 49.8 |
| $r_{11}$ ∞ | | | | | |
| | $d_{11}$ | 29.858 | $N_{11}$ | 1.00000 | |
| $r_{12}$ ∞ | | | | | |
| | $d_{12}$ | 1.500 | $N_{12}$ | 1.00000 | |
| $r_{13}$ 11.130 | | | | | |
| | $d_{13}$ | 5.000 | $N_{13}$ | 1.77250 | $\nu_{13}$ 49.8 |
| $r_{14}$ 11.851 | | | | | |
| | $d_{14}$ | 2.900 | $N_{14}$ | 1.00000 | |
| $r_{15}$ −27.066 | | | | | |
| | $d_{15}$ | 1.600 | $N_{15}$ | 1.75520 | $\nu_{15}$ 27.5 |
| $r_{16}$ 11.288 | | | | | |
| | $d_{16}$ | 2.100 | $N_{16}$ | 1.00000 | |
| $r_{17}$ −1596.042 | | | | | |
| | $d_{17}$ | 2.200 | $N_{17}$ | 1.77250 | $\nu_{17}$ 49.8 |
| $r_{18}$ −15.840 | | | | | |
| | $d_{18}$ | 0.100 | $N_{18}$ | 1.00000 | |
| $r_{19}$ 15.351 | | | | | |
| | $d_{19}$ | 3.350 | $N_{19}$ | 1.77250 | $\nu_{19}$ 49.8 |
| $r_{20}$ −38.647 | | | | | |
| | $d_{20}$ | 2.720 | $N_{20}$ | 1.00000 | |
| $r_{21}$ ∞ | | | | | |
| | $d_{21}$ | 4.900 | $N_{21}$ | 1.53996 | $\nu_{21}$ 59.7 |
| $r_{22}$ ∞ | | | | | |

| Power Data | |
| --- | --- |
| $\phi_I$ | −0.0299000 |
| $\phi_{II}$ | 0.0400000 |
| $\phi_{III}$ | 0.0555841 |

| Variable Distance | | |
| --- | --- | --- |
| | $d_5$ | $d_{11}$ |
| TELE | 2.400 | 29.858 |
| MIDDLE | 15.028 | 9.943 |
| WIDE | 29.673 | 1.900 |

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A compact zoom lens system comprising from the object side to the image side:

a first lens unit of a negative refractive power having a cemented lens component consisting of a negative lens element and a positive lens element cemented with each other, said first lens unit being shiftable along an optical axis of the lens system in a zooming operation;

a second lens unit of a positive refractive power having two positive lens components, at least one of which consists of a positive lens element and a negative lens element cemented with each other, said second lens unit being shiftable along the optical axis of the lens system in the zooming operation; and a third lens unit of a positive refractive power having, from the object side, a front lens component of a negative refractive power and a rear lens component of a positive refractive power, said third lens unit being stationary along the optical axis of the lens system in the zooming operation.

2. A compact zoom lens system in accordance with claim 1, wherein the first lens unit includes a negative lens element nearest to the object side, and wherein an air space is provided between the front lens component and the rear lens component of the third lens unit.

3. A compact zoom lens system in accordance with claim 1, wherein the first lens unit consists of only the cemented lens component.

4. A compact zoom lens system in accordance with claim 3, wherein the second lens unit consists of a cemented lens component consisting of a positive lens element and a negative lens element cemented with each other, and a single positive lens element.

5. A compact zoom lens system in accordance with claim 4, wherein the second lens unit consists of the single positive lens element and the cemented lens component in the sequence from the object side.

6. A compact zoom lens system in accordance with claim 4, wherein the second lens unit consists of the cemented lens component and the single positive lens in the sequence from the object side.

7. A compact zoom lens system in accordance with claim 4, wherein the front lens component of the third lens unit consists of a positive meniscus lens element and a negative lens element in the sequence from the object side, and the rear lens component of the third lens unit consists of one positive lens element.

8. A compact zoom lens system in accordance with claim 4, wherein the front lens component of the third lens unit consists of only a meniscus lens element and a negative lens element in the sequence from the object side, and the rear lens component of the third lens unit consists of only two positive lens elements.

9. A compact zoom lens system in accordance with claim 1, wherein the first lens unit consists of only the cemented lens component and a negative lens element.

10. A compact zoom lens system in accordance with claim 9, wherein the second lens unit consists of a cemented lens component consisting of a positive lens element and a negative lens element cemented with each other, and a single positive lens element.

11. A compact zoom lens system in accordance with claim 10, wherein the second lens unit consists of the single positive lens element and the cemented lens component in the sequence from the object side.

12. A compact zoom lens system in accordance with claim 9, wherein the second lens unit consists of only two cemented lens components, each of which consists of a positive lens element and a negative lens element cemented with each other.

13. A compact zoom lens system in accordance with claim 9, wherein the front lens component of the third lens unit consists of a positive menicus lens element and a negative lens element in the sequence from the object side, and the rear lens component of the third lens unit consists of only one or two positive lens elements.

14. A compact zoom lens system comprising from the object side to the image side:
a first lens unit of a negative refractive power having a negative lens element and a positive lens element cemented with each other, said first lens unit being shiftable along an optical axis of the lens system in a zooming operation;
a second lens unit of a positive refractive power being shiftable along the optical axis of the lens system in the zooming operation; and
a third lens unit of a positive refractive power being stationary along the optical axis of the lens system in the zooming operation;
wherein the lens system fulfills the following conditions:

$$0.48 < |\phi_I|/\phi_{II} < 0.85 \text{ (where, } \phi_I < 0\text{)}$$

$$0.20 < |\phi_I| f_w < 0.4$$

$$\Delta\nu > 18$$

wherein, $\phi_I$ and $\phi_{II}$ designate refractive powers of the first lens unit and the second lens unit respectively; $f_w$ designates a compound focal length of the whole lens system at a shortest focal length condition; and $\Delta\nu$ is a difference between the Abbe number of the negative lens element and the Abbe number of the positive lens element in the first lens unit.

15. A compact zoom lens system in accordance with claim 14, wherein the first lens unit consists of a cemented lens component consisting of a negative lens element and a positive lens element cemented with each other, and wherein the lens system fulfills the following conditions:

$$0.48 < |\phi_I|/\phi_{II} < 0.83$$

$$0.2 < |\phi_I| f_w < 0.34$$

$$-0.7 < R_{2R}/R_{1P} < 0.1$$

wherein, R designates a radius of curvature, and the first affix thereof represents the lens number counted from the object side, and the second affix thereof P shows the object side surface and the second affix R shows the image side surface.

16. A compact zoom lens system in accordance with claim 15, wherein said second lens unit consists of two positive lens elements, one of which is a positive cemented lens component consisting of a negative lens element and a positive lens element cemented with each other, and the other of which consists of a single lens element, and wherein the lens system fulfills the following conditions:

$$0.1 < F_P/F_N < 0.7$$

$$\nu_N < 30$$

wherein, $F_P$ represents a focal length of the single lens element; $F_N$ represents a focal length of the cemented lens component; and $\nu_N$ represents an Abbe number of the negative lens element in the cemented lens component of the second lens unit.

17. A compact zoom lens system in accordance with claim 16, wherein said third lens unit has a front lens component which consists of a positive meniscus lens element and a negative lens element in the sequence from the object side and has a negative refractive power as a whole, and a rear lens component which consists of one or two positive lens elements and has a positive refractive power as a whole, and wherein the lens system fulfills the following conditions:

$$0.1 < |\phi_A| f_w < 0.7 \text{ (where, } \phi_A < 0\text{)}$$

$$0.6 < r_A/f_w < 1.3$$

wherein, $\phi_A$ represents a composite refractive power of the front lens component of the third lens unit, and $r_A$ is a radius of curvature of the lens surface nearest to the object side in the third lens unit.

18. A compact zoom lens system comprising from the object side to the image side:

a first lens unit of a negative refractive power having a negative lens element and a positive lens element cemented with each other, said first lens unit being shiftable along an optical axis of the lens system in a zooming operation;

a second lens unit of a positive refractive power having two positive lens components, at least one of which consists of a positive lens element and a negative lens element cemented with each other, said second lens unit being shiftable along the optical axis of the lens system in the zooming operation; and a third lens unit of a positive refractive power having, from the object side, a front lens component of a negative refractive power having, from the object side, a positive meniscus lens element and a negative lens element, and a rear lens component of a positive refractive power;

wherein the lens system fulfills the following conditions:

$0.6 < |\phi_I|/\phi_{II} < 0.8$ (where, $\phi_I < 0$)

$0.1 < \phi_I^P/\phi_I < 0.45$ $-0.3 < \phi_{II}^P/\phi_{II} < 0.3$ $0.25 < |\phi_A|f_w < 0.6$ (where, $\phi_A < 0$)

$0.6 < D/f_w < 1.2$ wherein, $\phi_I$ and $\phi_{II}$ represent refractive powers of the first lens unit and the second lens unit respectively; $\phi_I^P$ and $\phi_{II}^P$ represents refractive powers of the surfaces nearest to the object side of the first lens unit and the second lens unit, respectively; $f_w$ represents a compound focal length of the whole lens system at a shortest focal length condition; $\phi_A$ represents a composite refractive power of the front lens component of the third lens unit; and D represents an axis distance from the object side surface of the meniscus lens to the image side surface of the negative lens in the front lens component in the third lens unit.

19. A compact zoom lens system in accordance with claim 18, wherein the rear lens component of said third lens unit consists of a positive lens element whose strong refractive surface faces to the image side and a biconvex lens element, and wherein the lens system fulfills the following conditions:

$N_B > 1.67$ $0.4 < f_{B2}/f_{B1} < 0.85$ wherein, $N_B$ represents an average of refractive indices of materials of two lens elements of the rear lens component of the third lens unit; and $f_{B1}$ and $f_{B2}$ represent focal lengths of the both lens elements, respectively.

20. A compact zoom lens system comprising from the object side to the image side:

a first lens unit of a negative refractive power having two negative lens components, one of which consists of a cemented negative lens component consisting of a negative lens element and a positive lens element cemented with each other, said first lens unit being shiftable along an optical axis of the lens system in a zooming operation;

a second lens unit of a positive refractive power having two positive lens components, one of which consists of a positive lens element and a negative lens element cemented with each other, said second lens unit being shiftable along the optical axis of the lens system in the zooming operation; and a third lens unit of a positive refractive power;

wherein the lens system fulfills the following conditions:

$0.6 < |\phi_I|/\phi_{II} < 0.85$ (where, $\phi_I < 0$)

$0.2 < |\phi_I|f_w < 0.4$ wherein, $\phi_I$ and $\phi_{II}$ represent refractive powers of the first lens unit and the second lens unit respectively; and $f_w$ represents a compound focal length of the whole lens system at a shortest focal length condition.

21. A compact zoom lens system in accordance with claim 20, wherein said first lens unit consists of a negative lens element whose strong refractive surface faces to the image side and a cemented negative lens component consisting of a positive lens element and a negative lens element cemented with each other in the sequence from the object side, and wherein the lens system fulfills the following conditions:

$(N_{1P} + N_{2N})/2 > 1.72$ $0.5 < f_{2R}/f_{2P} < 1.1$ wherein, $N_{1P}$ and $N_{2N}$ represent refractive powers of the positive lens element in the cemented negative lens component in the first lens unit and the negative lens element in the cemented positive lens element in the second lens unit, respectively; $f_{2R}$ and $f_{2P}$ represent focal lengths of the two positive lens components located at the object side and at the image side in the second lens unit, respectively.

22. A compact zoom lens system in accordance with claim 21, wherein said third lens unit has a front lens component which consists of a positive meniscus lens element and a negative lens element in the sequence from the object side and has a negative refractive power, and a rear lens component which consists of one or two positive lens elements and has a positive refractive power, and wherein the lens system fulfills the following condition:

$0.2 < |\phi_A|f_w < 0.8$ (where, $\phi_A < 0$)

wherein, $\phi_A$ is a composite refractive power of the front lens component of the third lens unit.

23. A compact zoom lens system in accordance with claim 22, wherein the rear lens component of said third lens unit consists of two positive lens elements and wherein the lens system fulfills the following conditions:

$0.8 < r_A/f_w < 1.5$ $0.35 < f_{BR}/f_{BP} < 0.85$ wherein, $r_A$ represents a radius of curvature of the lens surface nearest to the object side in the front lens component of the third lens unit; $f_{BP}$ and $f_{BR}$ represent focal lengths of the two positive lens elements in the rear lens component of the third lens unit located at the object side and at the image side respectively.

24. A compact zoom lens system comprising from the object side to the image side:

a first lens unit of a negative refractive power having two negative lens components, one of which consists of a negative lens element and a positive lens element cemented with each other, said first lens unit being shiftable along an optical axis of the lens system in a zooming operation;

a second lens unit of a positive refractive power having two positive lens components, each of which consists of a positive lens element and a negative lens element cemented with each other respectively, said second lens unit being shiftable along the optical axis of the lens system in the zooming operation; and a third lens unit of a positive refractive power;

wherein the lens system fulfills the following conditions:

$0.63 < |\phi_I|/\phi_{II} < 0.83$ (where, $\phi_I < 0$)

$0.22 < |\phi_I| f_w < 0.37$ $0.7 < f_{2P}/f_{2R} < 1.1$ $\overline{v}_{2P} - \overline{v}_{2N} > 22$ wherein, $\phi_I$ and $\phi_{II}$ represent refractive powers of the first lens unit and the second lens unit respectively; $f_w$ represents a compound focal length of the whole lens system at a shortest focal length condition; $f_{2P}$ and $f_{2R}$ represent focal lengths of the two positive lens elements of the second lens unit located at the object side and at the image side respectively; and $\overline{v}_{2P}$ and $\overline{v}_{2N}$ represent averages of Abbe numbers of two positive lens elements and two negative lens elements in the second lens unit.

25. A compact zoom lens system in accordance with claim 24, wherein said third lens unit has a front lens component which consists of a positive meniscus lens element and a negative lens element in the sequence from the object side and has a negative refractive power, and a rear lens component which consits of one or two positive lens elements and has a positive refractive power, and wherein the lens system fulfills the following condition:

$0.3 < |\phi_A| f_w < 0.8$ (where, $\phi_A < 0$)

wherein, $\phi_A$ represents a composite refractive power of the front lens component of the third lens unit.

26. A compact zoom lens system in accordance with claim 25, wherein the rear lens component of said third lens unit consists of two positive lens elements, and wherein the lens system fulfills the following conditions:

$0.4 < f_{BR}/f_{BP} < 0.85$ $-0.2 < R_{10R}/R_{10P} < 0.3$ (where, $R_{10R} < 0$)

wherein, $f_{BP}$ and $f_{BR}$ represent focal lengths of the two positive lens elements in the rear lens component of the third lens unit located at the object side and at the image side respectively; and, $R_{10P}$ and $R_{10R}$ represent radii of curvature of the object side surface and that of the image side surface in the positive lens element located at the object side.

27. A compact zoom lens system comprising from the object side to the image side;

a first lens unit of a negative refractive power having a negative lens component consisting of a negative lens element and a positive lens element cemented with each other, said first lens unit being shiftable along an optical axis of the lens system in a zooming operation;

a second lens unit of a positive refractive power having two positive lens components, each of which consists of a positive lens element and a negative lens element cemented with each other respectively, said second lens unit being shiftable along the optical axis of the lens system in the zooming operation; and a third lens unit of a positive refractive power having, from the object side, a front lens component of a negative refractive power and a rear lens component of a positive refractive power, said third lens unit being stationary along the optical axis of the lens system in the zooming operation;

wherein the lens system fulfills the following conditions:

$0.1 < |\phi_A| f_w < 0.8$ (where, $\phi_A < 0$)

$0.3 < r_A/f_w < 1.5$ wherein, $\phi_A$ represents a composite refractive power of the front lens component of the third lens unit; $r_A$ represents a radius of curvature of the lens surface nearest to the object side in the third lens unit; and $f_w$ represents a compound focal length of the whole lens system at a shortest focal length condition.

28. A compact zoom lens system in accordance with claim 27, wherein the rear lens component of the third lens unit consists of two positive lens elements, and wherein the lens system fulfills the following condition:

$0.35 < f_{BR}/f_{BP} < 0.85$ wherein, $f_{BP}$ and $f_{BR}$ represent focal lengths of two positive lens elements located at the object side and at the image side in the rear lens component of the third lens unit, respectively.

29. A compact zoom lens system in accordance with claim 28, wherein the lens system fulfills the following conditions:

$0.48 < |\phi_I|/\phi_{II} < 0.85$ $0.2 < |\phi_I| f_w < 0.4$ $\Delta v > 18$ wherein, $\phi_I$ and $\phi_{II}$ represent refractive powers of the first lens unit and the second lens unit respectively; $f_w$ represents a compound focal length of the whole lens system at a shortest focal length condition; and, $\Delta v$ represents a difference between an Abbe number of the negative lens element and an Abbe number of the positive lens element in the first lens unit.

* * * * *